US007248324B2

(12) United States Patent
Ono et al.

(10) Patent No.: US 7,248,324 B2
(45) Date of Patent: Jul. 24, 2007

(54) LIQUID CRYSTAL DISPLAY DEVICE

(75) Inventors: Kikuo Ono, Mobara (JP); Makoto Yoneya, Hitachinaka (JP); Tsunenori Yamamoto, Hitachi (JP); Junichi Hirakata, Chiba (JP); Yoshiaki Nakayoshi, Ooamishirasato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/939,941

(22) Filed: Sep. 14, 2004

(65) Prior Publication Data
US 2005/0030461 A1 Feb. 10, 2005

Related U.S. Application Data

(63) Continuation of application No. 10/070,538, filed as application No. PCT/JP00/06009 on Sep. 5, 2000, now abandoned.

(30) Foreign Application Priority Data
Sep. 7, 1999 (JP) ................................. 11-252763

(51) Int. Cl.
*G02F 1/1343* (2006.01)
(52) U.S. Cl. ........................ 349/141; 349/139; 349/143
(58) Field of Classification Search ................ 349/141, 349/139, 143, 144, 146
See application file for complete search history.

(56) References Cited

U.S. PATENT DOCUMENTS

| 5,745,207 | A | 4/1998 | Asada et al. |
| 5,870,160 | A | 2/1999 | Yanagawa et al. |
| 5,914,762 | A | 6/1999 | Lee et al. |
| 5,946,066 | A | 8/1999 | Lee et al. |
| 6,016,174 | A | 1/2000 | Endo et al. |
| 6,038,006 | A | 3/2000 | Sasaki et al. |
| 6,128,061 | A | 10/2000 | Lee et al. |
| 6,195,140 | B1 | 2/2001 | Kubo et al. |
| 6,233,034 | B1 | 5/2001 | Lee et al. |
| 6,256,081 | B1 * | 7/2001 | Lee et al. .................... 349/141 |
| 6,266,116 | B1 | 7/2001 | Ohta et al. |
| 6,281,957 | B1 * | 8/2001 | Oh et al. .................... 349/141 |
| 6,288,762 | B1 | 9/2001 | Sasaki et al. |

(Continued)

FOREIGN PATENT DOCUMENTS

JP 4-153623 5/1992

(Continued)

*Primary Examiner*—Dung T. Nguyen
*Assistant Examiner*—Thoi V. Duong
(74) *Attorney, Agent, or Firm*—Antonelli, Terry, Stout & Kraus, LLP.

(57) ABSTRACT

A liquid crystal display device having first and second substrates with a liquid crystal layer therebetween, a plurality of gate signal lines and a plurality of drain signal lines, a plurality of counter voltage signal lines, a plurality of pixel regions defined by neighboring gate signal lines and drain signal lines and a counter electrode and a pixel electrode being formed on the first substrate in each pixel region and enabling forming of an electric field therebetween. The counter electrode is of planar shape and, the pixel electrode is of planar shape with plurality of slits and is overlapped with the counter electrode with an insulating layer provided therebetween. Both the counter electrode and pixel electrode are made of a transparent conductor. The counter voltage signal line is made of metal and extends in center region in each pixel region and is directly connected to the counter electrode.

5 Claims, 50 Drawing Sheets

U.S. PATENT DOCUMENTS

| | | |
|---|---|---|
| 6,295,109 B1 | 9/2001 | Kubo et al. |
| 6,297,867 B1 | 10/2001 | Miyahara et al. |
| 6,330,047 B1 | 12/2001 | Kubo et al. |
| 6,456,351 B1 | 9/2002 | Kim et al. |
| 6,522,380 B2 | 2/2003 | Lee et al. |
| 6,608,662 B1 * | 8/2003 | Hiroshi .................. 349/141 |
| 6,654,814 B1 | 11/2003 | Britton et al. |

FOREIGN PATENT DOCUMENTS

| | | |
|---|---|---|
| JP | 7-36058 | 2/1995 |
| JP | 9-73101 | 3/1997 |
| JP | 2701698 | 10/1997 |
| JP | 9-318972 | 12/1997 |
| JP | 10-3092 | 1/1998 |
| JP | 10-268321 | 10/1998 |
| JP | 11-30784 | 2/1999 |
| JP | 11-202356 | 7/1999 |
| JP | 1999-0062389 | 7/1999 |
| KR | 1998-24279 | 7/1998 |
| KR | 1998-080560 | 11/1998 |
| KR | 1998-083766 | 12/1998 |
| KR | 1999-0063559 | 7/1999 |
| KR | 1999-0066507 | 8/1999 |

* cited by examiner

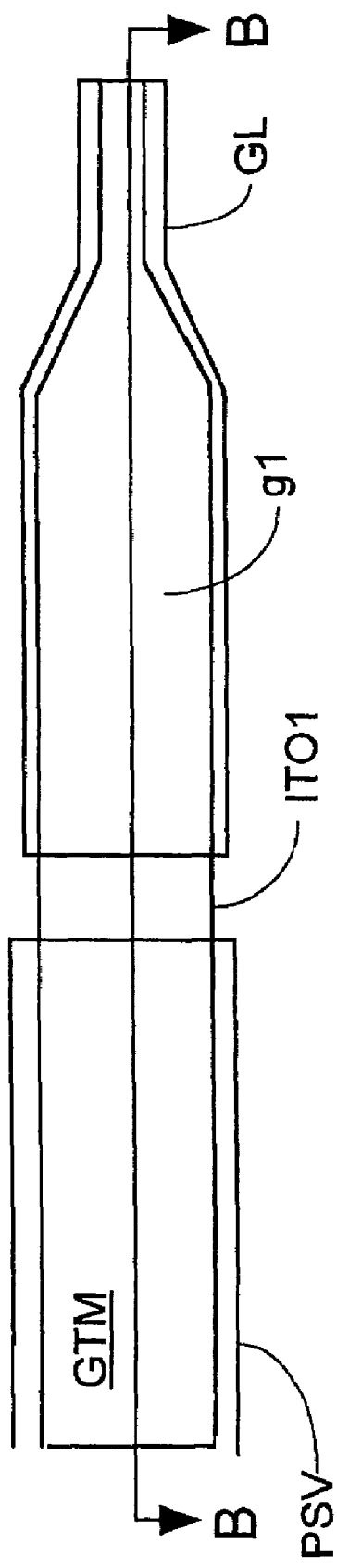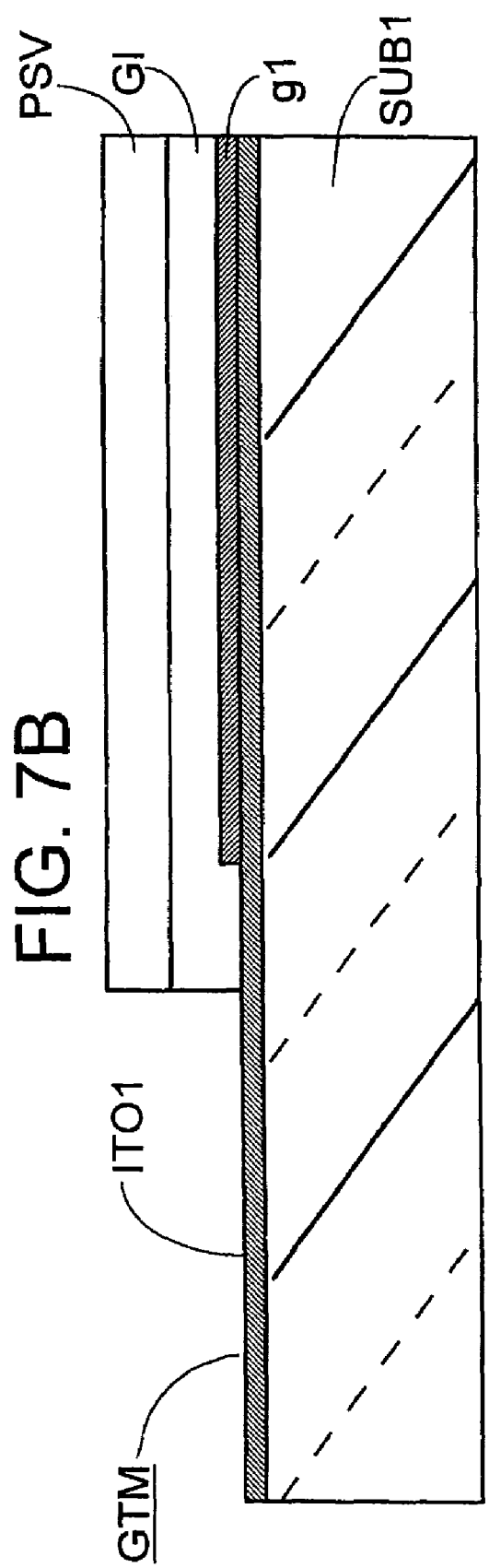

FIG. 42A
FIG. 42B
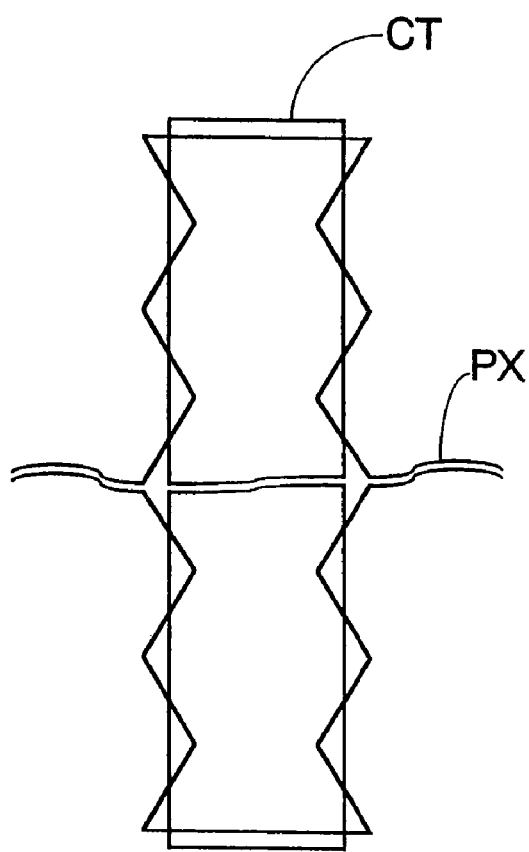
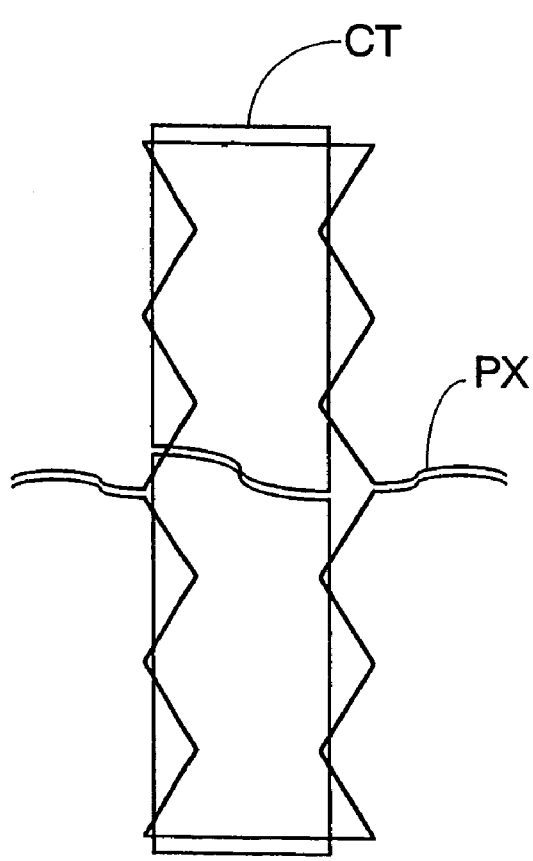

LIQUID CRYSTAL DISPLAY DEVICE

CROSS REFERENCE TO RELATED APPLICATION

This is a continuation of application Ser. No. 10/070,538, filed Mar. 7, 2002, now abandoned the subject matter of which is incorporated by reference herein and is a 371 of PCT/JP00/06009, filed Sep. 5, 2000.

TECHNICAL FIELD

The present invention relates to a liquid crystal display device, and, more particularly, to a so-called "lateral electric field type" liquid crystal display device.

BACKGROUND OF THE INVENTION

A liquid crystal display device, which is referred to as a "lateral electric field type", is constituted such that a pair of transparent substrates are arranged to face each other in an opposed manner with a liquid crystal being disposed therebetween, and pixel electrodes and counter electrodes, which generate an electric field (lateral electric field) parallel to the transparent substrate between the counter electrode and the pixel electrode, are formed on each pixel region on a liquid-crystal side of one of such transparent substrates.

With respect to light which passes through the region between the pixel electrode and the counter electrode, the quantity of light is controlled by driving the liquid crystal to which the above-mentioned electric field is applied.

Such a liquid crystal display device is a known display device having broad viewing angle characteristics, whose display is not changed even when viewed from a direction oblique to a display surface.

Heretofore, the above-mentioned pixel electrode and the above-mentioned counter electrode have been formed of a conductive layer which prevents the transmission of light therethrough. However, recently, a liquid crystal display device has been developed which has a constitution in which counter electrodes formed of a transparent material are formed on the whole pixel region, except for the periphery of the pixel region, and strip-like pixel electrodes, which extends in one direction and are arranged in parallel in the direction intersecting such one direction, are formed on the counter electrodes by way of an insulation film.

In the liquid crystal display device having the above-described constitution, a lateral electric field is generated between the pixel electrode and the counter electrode so that the liquid crystal display device can largely enhance the numerical aperture while still maintaining excellent broad viewing angle characteristics. Such a technique is described in, for example, in SID (Society for Information Display) 99 DIGEST: p202 to p205 or Japanese Laid-open Patent Publication 202356/1999.

SUMMARY OF THE INVENTION

Although liquid crystal display device can provide drastically improved viewing angle characteristics and an enhanced numerical aperture by adopting the above-mentioned liquid crystal driving method of the lateral electric field type, this approach also brings about various new technical problems to be solved.

For example, with respect to the liquid crystal display device having the above-mentioned constitution, although there has been an attempt to use a so-called multi-domain method which provides regions where the twisting directions of liquid crystal molecules become reverse to each other in each pixel of the liquid crystal display device and offsets the difference of coloring which is generated when the display region is viewed from the left and right directions, it has been found that the liquid crystal display device needs various improvements from the viewpoint of the display quality.

The present invention has been made in view of such considerations, and it is an object of the present invention to enhance the performance of display operation (driving performance of liquid crystal molecules) of the liquid crystal display device of the above-mentioned so-called lateral electric field type and to improve the display quality of such a liquid crystal display device.

Typical examples of features and aspects of the novel liquid crystal display device disclosed in the present application are summarized as follows.

An example of the novel liquid crystal display device is characterized in that a pixel electrode and a counter electrode, which are arranged by way of an insulation film, are formed on a pixel region at a liquid-crystal side of one of the transparent substrates which are arranged to face each other in an opposed manner by way of liquid crystal, and an electric field having a component parallel to the transparent substrates is generated between these electrodes. One of the pixel electrode and the counter electrode is constituted of a transparent electrode which is formed on a region disposed around the other electrode and is not superposed on the other electrode, and the insulation film has a multi-layered structure (structure in which the insulation films are laminated at least in two layers).

In the liquid crystal display device having such a constitution, although the pixel electrode and the counter electrode, which are arranged by way of the insulation film, form a capacitive element at a portion where these electrodes are superposed on each other, when the superposed area becomes large, the capacitive element takes a value which exceeds a necessary value. Accordingly, by providing the insulation film disposed between the pixel electrode and the counter electrode with a multi-layered structure, it is possible to decrease the capacitance value of the capacitive element to a desired value.

Another example of the novel liquid crystal display device is characterized in that a pixel electrode and a counter electrode, which are arranged by way of an insulation film are formed on a rectangular pixel region at a liquid-crystal side of one transparent substrate of a pair of transparent substrates which are arranged to face each other in an opposed manner by way of liquid crystal, and an electric field having a component parallel to the transparent substrates is generated between these electrodes. The counter electrode is constituted of a transparent electrode which is formed on a region disposed around the pixel electrode and not superposed on the pixel electrode, and the pixel electrode comprises a plurality of electrodes which are arranged in parallel in the direction perpendicular to an extension direction of the pixel electrode. The plurality of electrodes consist of first electrodes having bent portions which change the extension direction and a second electrode which is extended linearly at least at a portion of a periphery of the pixel region.

In the liquid crystal display device having such a constitution, with respect to the pixel electrode, besides the first electrodes, the second electrode which is extended linearly is newly mounted on at least a portion of the periphery of the pixel region, that is, a portion (a dead space) where a lateral electric field is hardly generated since the first electrodes have the bent portions, whereby the lateral electric field is also generated between the second electrode and the counter electrode. Accordingly, the generation of a dead space can be suppressed so that the pixel region can be substantially increased.

These and other objects, features and advantageous effects according to the present invention will be more explicitly described by relating the description of the mode for carrying out the invention to the attached drawings.

BRIEF DESCRIPTION OF THE DRAWINGS

FIG. 7A is a top plan view and FIG. 7B is a cross-sectional view showing one embodiment of a gate signal terminal of the liquid crystal display device according to the present invention.

FIGS. 42A and 42B are diagrams showing another embodiment of the pixel region of the liquid crystal display device according to the present invention.

BEST MODE FOR CARRYING OUT THE INVENTION

A liquid crystal display device according to the present invention will be explained in more detail in conjunction with various embodiments hereinafter.

Embodiment 1

<<Constitution of Pixel>>

Figure 1:
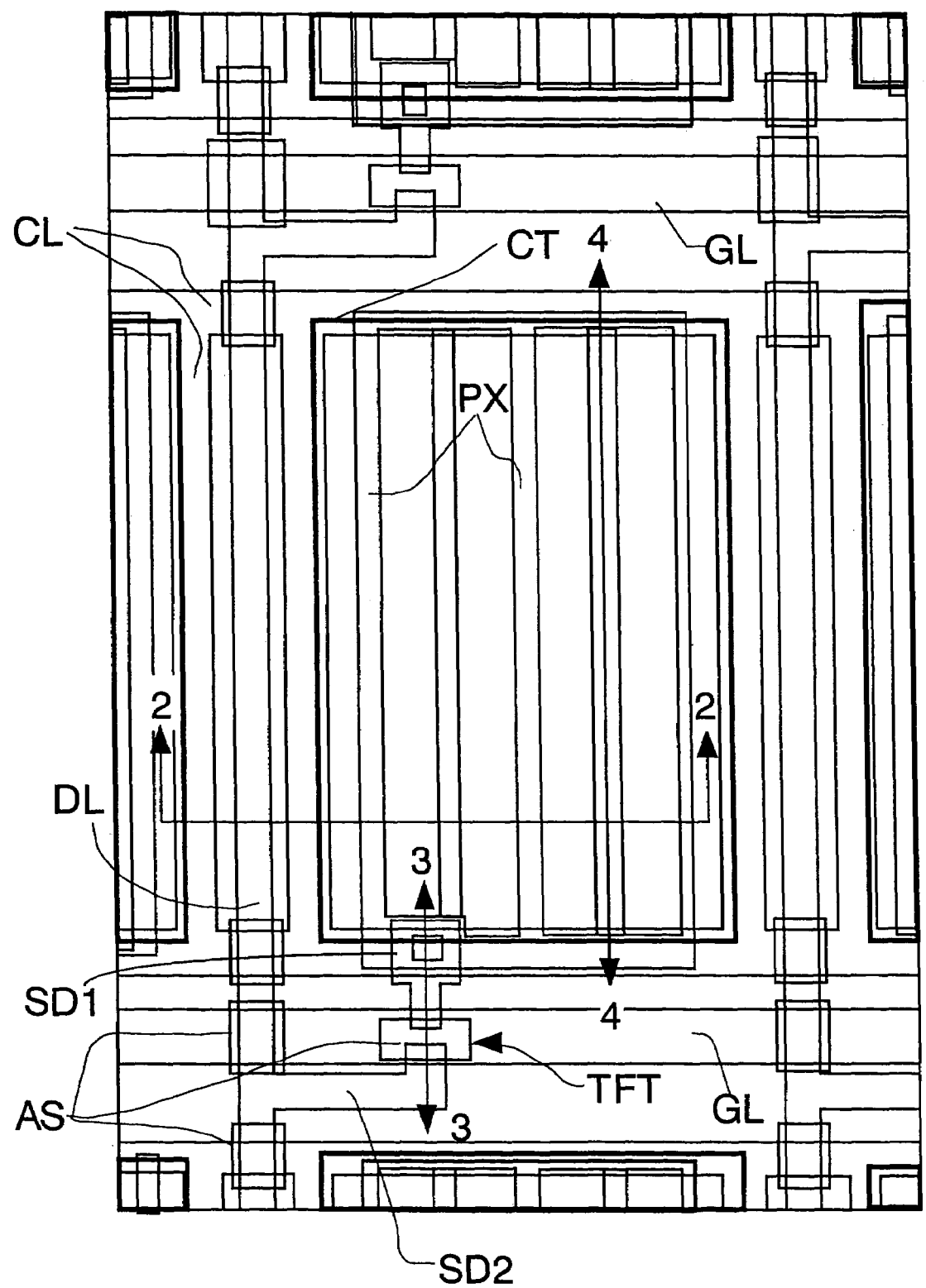
FIG. 1 is a plan view showing one embodiment of a pixel region of a liquid crystal display device according to the present invention.

FIG. 1 is a plan view of a pixel region of a liquid crystal display device (panel) according to the present invention as viewed from a liquid-crystal side of one transparent substrate of respective transparent substrates which are arranged to face each other in an opposed manner while sandwiching liquid crystal therebetween.

Figure 2:
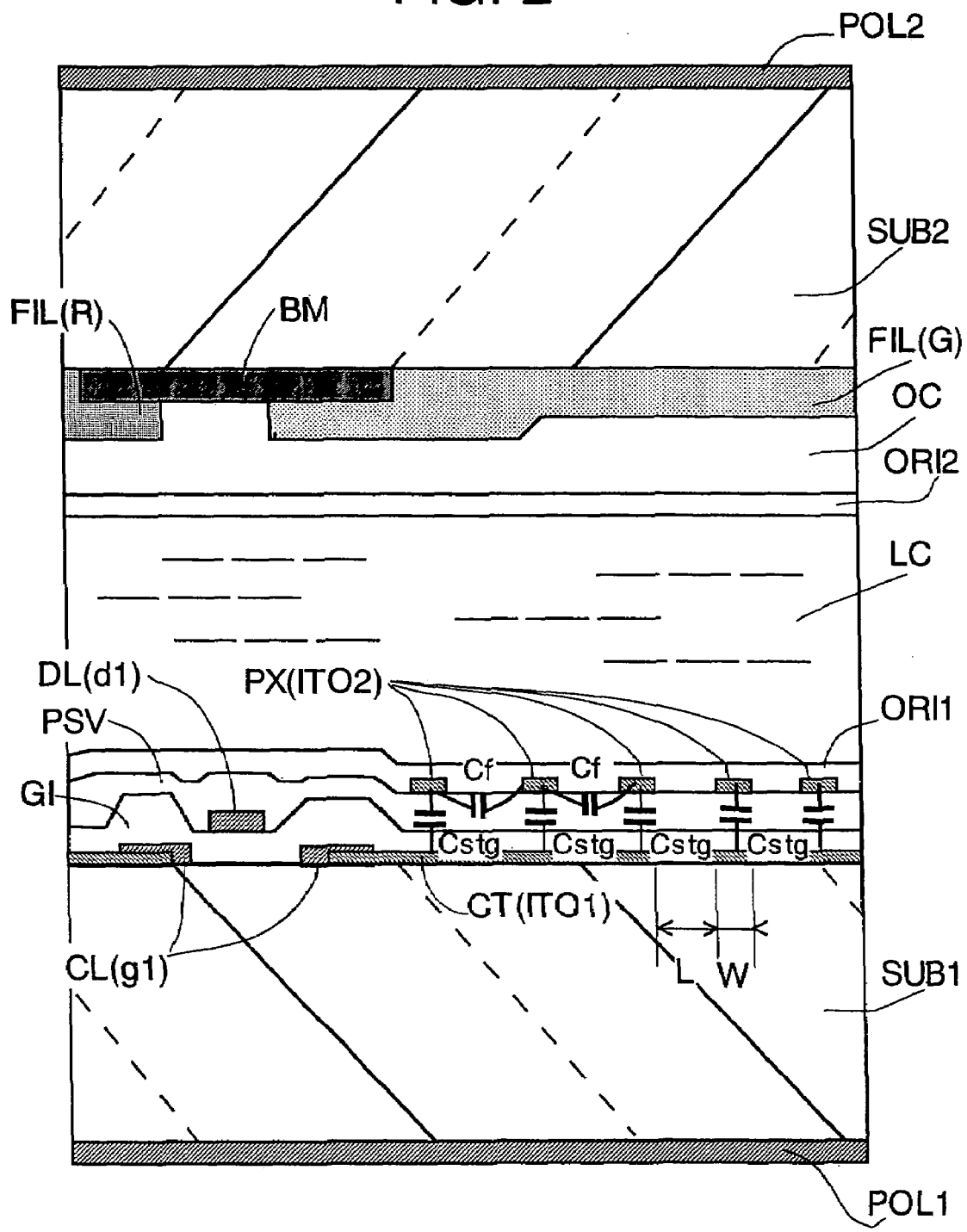
FIG. 2 is a cross-sectional view taken along a line 2—2 of FIG. 1.
Figure 3:
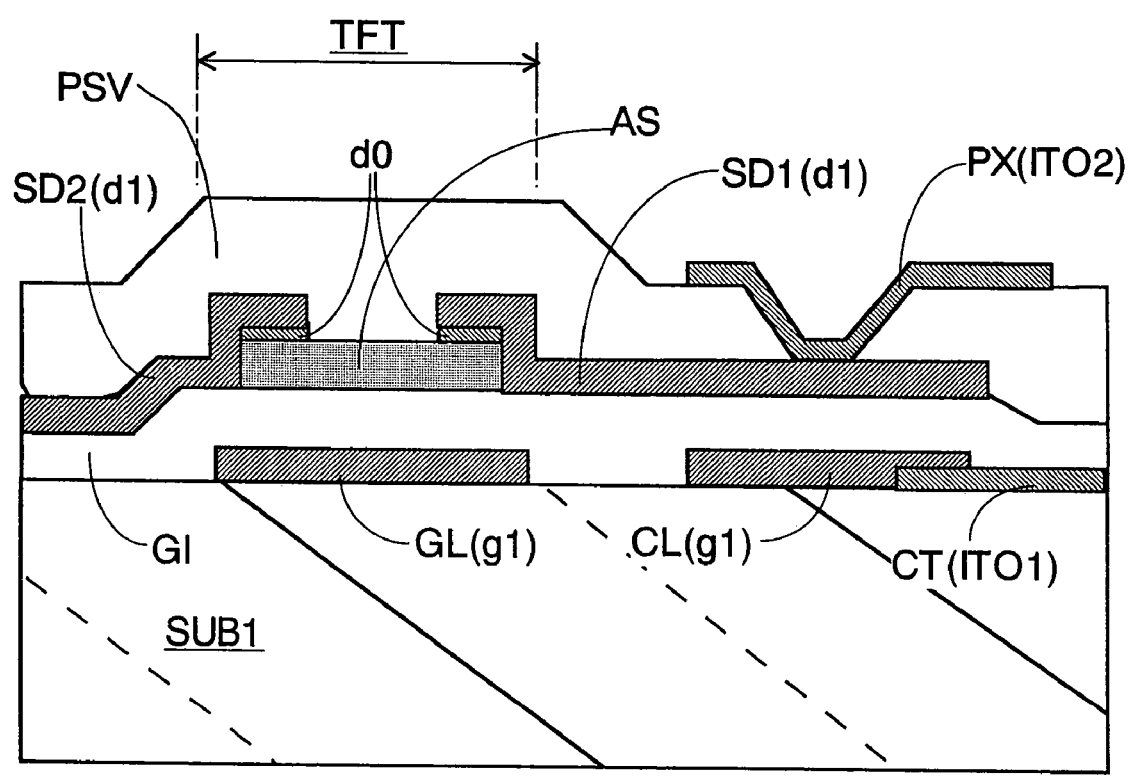
FIG. 3 is a cross-sectional view taken along a line 3—3 of FIG. 1.
Figure 4:
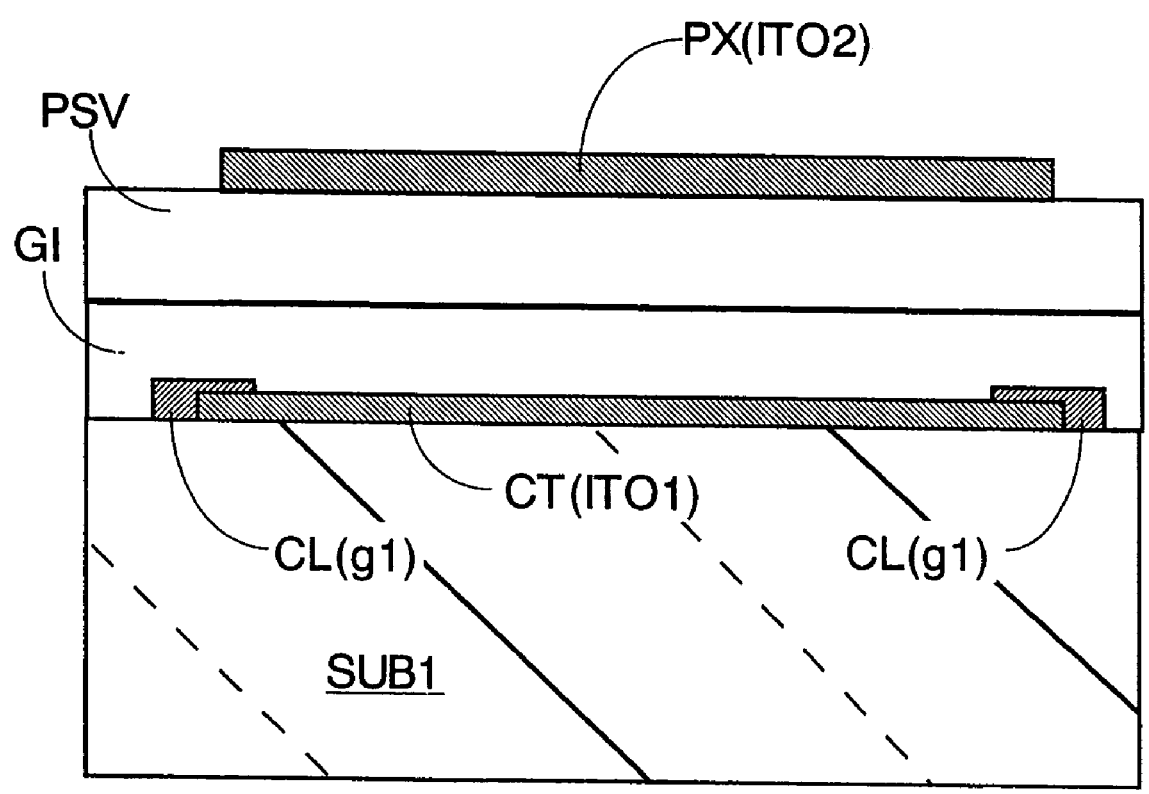
FIG. 4 is a cross-sectional view taken along a line 4—4 of FIG. 1.

A cross-sectional view taken along a line 2—2 of FIG. 1 is shown in FIG. 2, a cross-sectional view taken along a line 3—3 of FIG. 1 is shown in FIG. 3, and a cross-sectional view taken along a line 4—4 in FIG. 1 is shown in FIG. 4.

First of all, in FIG. 1, gate signal lines GL, which extend in the x direction in the drawing and are arranged in parallel in the y direction in the drawing, are formed of chromium (Cr), for example. Rectangular regions are formed by these gate signal lines GL and drain signal lines DL, which will be explained later, and these regions constitute pixel regions.

In the pixel region, an electric field is generated between counter electrodes CT and pixel electrodes PX, which counter electrodes CT are formed on the whole area of the pixel region except for the periphery thereof. The counter electrodes CT are formed of transparent conductive bodies, such as ITO1 (Indium-Tin-Oxide), for example.

With respect to the counter electrodes CT, a counter voltage signal line CL, which is connected to the counter electrode CT, is formed such that the counter voltage signal line CL frames the whole area of the periphery of the counter electrode CT, and the counter voltage signal lines CL are integrally formed with counter voltage signal lines CL that are formed in the same manner as the counter electrode CT on the left and right pixel regions in the drawing (respective pixel regions arranged along the gate signal lines GL).

In this case, the connection of both counter voltage signal lines CL in the pixel regions is performed at upper portions and lower portions of the pixel regions, respectively. Such a connection is made to minimize portions where the counter voltage signal line CL and the drain signal line DL, which will be explained later, are superposed, so as to reduce the capacitance generated between them.

The counter voltage signal lines CL are made of opaque material, such as chromium (Cr). In such a case, an electric field which functions as a noise is generated between the drain signal line DL and a peripheral portion of the counter electrode CT, which is disposed close to the drain signal line DL, so that the light transmissivity of the liquid crystal may not be obtained as desired. However, since such a portion is shielded from light due to the counter voltage signal line CL, the drawback in terms of display quality can be resolved.

This implies that the drawback derived from the electric field (noise) which is generated between the gate signal line GL and a peripheral portion of the counter electrode CT, which is disposed close to the gate signal line GL, also can be resolved.

Further, as mentioned above, by making the material of the counter voltage signal line CL equal to the material of the gate signal line GL, these signal lines can be formed in the same step so that any increase in man-hours for fabricating can be obviated.

Here, it is needless to say that the above-mentioned counter voltage signal lines CL are not limited to Cr and may be formed of, for example, Al or a material containing Al. However, in this case, it is more advantageous to position the counter voltage signal line CL as an upper layer with respect to the counter electrode CT. This is because a selective etchant (for example, HBr) for an ITO film which constitutes the counter electrode CT easily dissolves Al.

Further, it is advantageous to interpose a metal of a high melting point, such as Ti, Cr, Mo, Ta, W, at least on a contact surface between the counter voltage signal line CL and the counter electrode CT. This is because ITO, which constitutes the counter electrode CT, oxidizes Al in the counter voltage signal line CL, thus forming a high resistance layer. Accordingly, in one embodiment, when the counter voltage signal lines CL are formed of Al or a material containing Al, it is preferable to adopt a multi-layered structure which uses the above-mentioned metal of a high melting point as a first layer.

Then, on an upper surface of the transparent substrate on which the counter electrodes CT, the counter voltage signal lines CL and the gate signal lines GL are formed, an insulation film GI, which is made of SiN, for example, is formed such that the insulation film GI covers them.

The insulation film GI functions as an interlayer insulation film of the counter voltage signal lines CL and the gate signal lines GL with respect to the drain signals DL, functions as a gate insulation film in regions where thin film transistors TFT are formed, and functions as a dielectric film in regions where capacitive elements Cstg are formed.

Then, a thin film transistor TFT is formed in a superposed manner on a portion (left lower portion in the drawing) of the gate signal line GL, and a semiconductor layer AS, which is made of a-Si, for example, is formed on the insulation film GI at the portion.

By forming a source electrode SD1 and a drain electrode SD2 on an upper surface of the semiconductor layer AS, a MIS type transistor having an inverse stagger structure, which uses a portion of the gate signal line GL as a gate electrode, is formed. Here, the source electrode SD1 and the drain electrode SD2 are simultaneously formed with the drain signal line DL.

That is, the drain signal lines DL, which extend in the y direction and are arranged in parallel in the x direction in FIG. 1, are formed, and portions of these drain signal lines DL extend over the surface of the semiconductor layer AS so as to form the drain electrodes SD2 of the thin film transistors TFT.

Further, the source electrodes SD1 are formed at the time of forming the drain signal lines DL, and these source electrodes SD1 also extend to the inside of the pixel region so as to integrally form contact portions which serve to connect the source electrodes SD1 with pixel electrodes PX.

Here, as shown in FIG. 3, a contact layer d0 doped with n-type impurity, for example, is formed on interfaces between the semiconductor layer AS and the above-mentioned source electrode SD1 and the drain electrode SD2. The contact layer d0 is formed such that an n-type impurity doping layer is formed on the whole area of the surface of the semiconductor layer AS, the source electrode SD1 and the drain electrode SD2 are formed, and thereafter, using these respective electrodes as masks, the n-type impurity doping layer formed on the surface of the semiconductor layer AS, which is exposed from respective electrodes, is etched.

In this embodiment, the semiconductor layer AS is formed not only on the region where the thin film transistor TFT is formed, but also on portions where the gate signal lines GL and the counter voltage signal lines CL intersect the drain signal lines DL. Such a provision is made to strengthen the function of the semiconductor layer AS as the interlayer insulation film.

On the surface of the transparent substrate on which the thin film transistors TFT are formed in this manner, a protective film PSV, which is made of SiN, for example, is formed such that the protective film PSV also covers the thin film transistors TFT. The protective film PSV is provided for avoiding the direct contact of the thin film transistors TFT with the liquid crystal LC.

Further, on an upper surface of the protective film PSV, pixel electrodes PX are formed using transparent conductive films made of ITO2 (Indium-Tin-Oxide), for example. The pixel electrodes PX are superposed on the regions where the above-mentioned counter electrode CT is formed. In this embodiment, five pieces of pixel electrodes PX are formed and these pixel electrodes PX are respectively extended in the y direction while being equally spaced apart from each other, wherein these pixel electrodes PX are connected with each other at both ends thereof by means of layers made of the same material which are respectively extended in the x direction.

In this embodiment, the distance L between the neighboring pixel electrodes PX is set to a value in a range of 1 to 15 μm, for example, and the width W of the pixel electrode PX is set to a value in a range of 1 to 10 μm, for example.

Here, the material layers at lower ends of respective pixel electrodes PX are connected to contact portions of the source electrodes SD1 of the above-mentioned thin film transistors TFT through contact holes formed in the protective film PSV, while the material layers at upper ends of respective pixel electrodes PX are formed in a superposed manner on the above-mentioned counter voltage signal lines CL.

Due to such a constitution, at portions where the counter electrode CT and respective pixel electrodes PX are superposed, capacitive elements Cstg, which use the lamination film formed of the insulation film GI and the protective film PSV as the dielectric film, are formed.

The capacitive elements Cstg are provided for storing video signals in the pixel electrodes PX for a relatively long time even if the thin film transistor TFT is turned off after the video signals from the drain signal line DL are applied to the pixel electrode PX through the thin film transistor TFT.

Here, the capacitance of the capacitive element Cstg is proportional to the superposed area between the counter electrode CT and each pixel electrode PX, and hence, there is a fear that the area is increased relatively and is set to a value which exceeds a necessary value. However, since the dielectric film adopts the laminated structure formed of the insulation film GI and the protective film PSV, there is no fear of such an eventually.

That is, since the insulation film GI serves as the gate insulation film of the thin film transistor TFT, the film thickness can not be increased. However, there is no such a restriction with respect to the protective film psv. Accordingly, by setting the protective film PSV to a given film thickness (film thickness of only the protective film PSV being 100 nm to 4 μm, for example) together with the insulation film GI, it is possible to reduce the capacitance of the capacitive element Cstg to a given value.

It is needless to say that the protective film PSV is not limited to SiN, and the protective film PSV may be formed of synthetic resin, for example. In this case, since the protective film PSV is formed by coating, it is possible to obtain an advantageous effect in that, even when the film thickness is to be increased, the fabricating is facilitated.

Then, on the surface of the transparent substrate on which the pixel electrodes PX and the counter electrodes CT are formed in this manner, an orientation film ORI1 is formed such that the orientation film ORI1 also covers the pixel electrode PX and the counter electrodes CT. The orientation film ORI1 is a film which is directly brought into contact with the liquid crystal LC and determines the initial orientation direction of the liquid crystal LC.

Although the pixel electrodes PX are constituted as transparent electrodes in the above-mentioned embodiments, the pixel electrodes PX are not always transparent and may be formed of an opaque metal material, such as Cr. This is because, although the numerical aperture is slightly decreased in such a case, this gives rise to no problem at all with respect to the driving of the liquid crystal LC.

Although the use of chromium (Cr) for the gate signal lines GL, the counter voltage signal lines CL and the drain signal lines DL has been proposed in the above-mentioned embodiments, it is needless to say that other metal of a high melting point, such as Mo, W, Ti, Ta or an alloy of two or more kinds of these metals or a lamination film of two or more kinds of these metals or alloys, can be used.

Further, with respect to the transparent conductive film, although the use of ITO as the transparent conductive film has been proposed, it is needless to say that a similar advantageous effect can be obtained by using IZO (Indium-Zinc-Oxide).

<<Filter Substrate>>

The transparent substrate having such a constitution is referred to as a TFT substrate and the transparent substrate which is arranged to face the TFT substrate in an opposed manner by way of the liquid crystal LC is referred to as a filter substrate.

With respect to the filter substrate, as shown in FIG. 2, on a liquid-crystal-side surface, first of all, a black matrix BM is formed, such that respective pixel regions are defined, and in opening portions of the black matrix BM, which substantially define the pixel regions, filters FIL are formed such that the filters FIL cover the opening portions.

Then, an overcoat film OC, which is formed of a resin film, for example, is formed such that the overcoat film OC covers the black matrix BM and the filters FIL, and an orientation film ORI2 is formed on an upper surface of the overcoat film.

<<Overall Constitution of Liquid Crystal Display Panel>>

Figure 5:
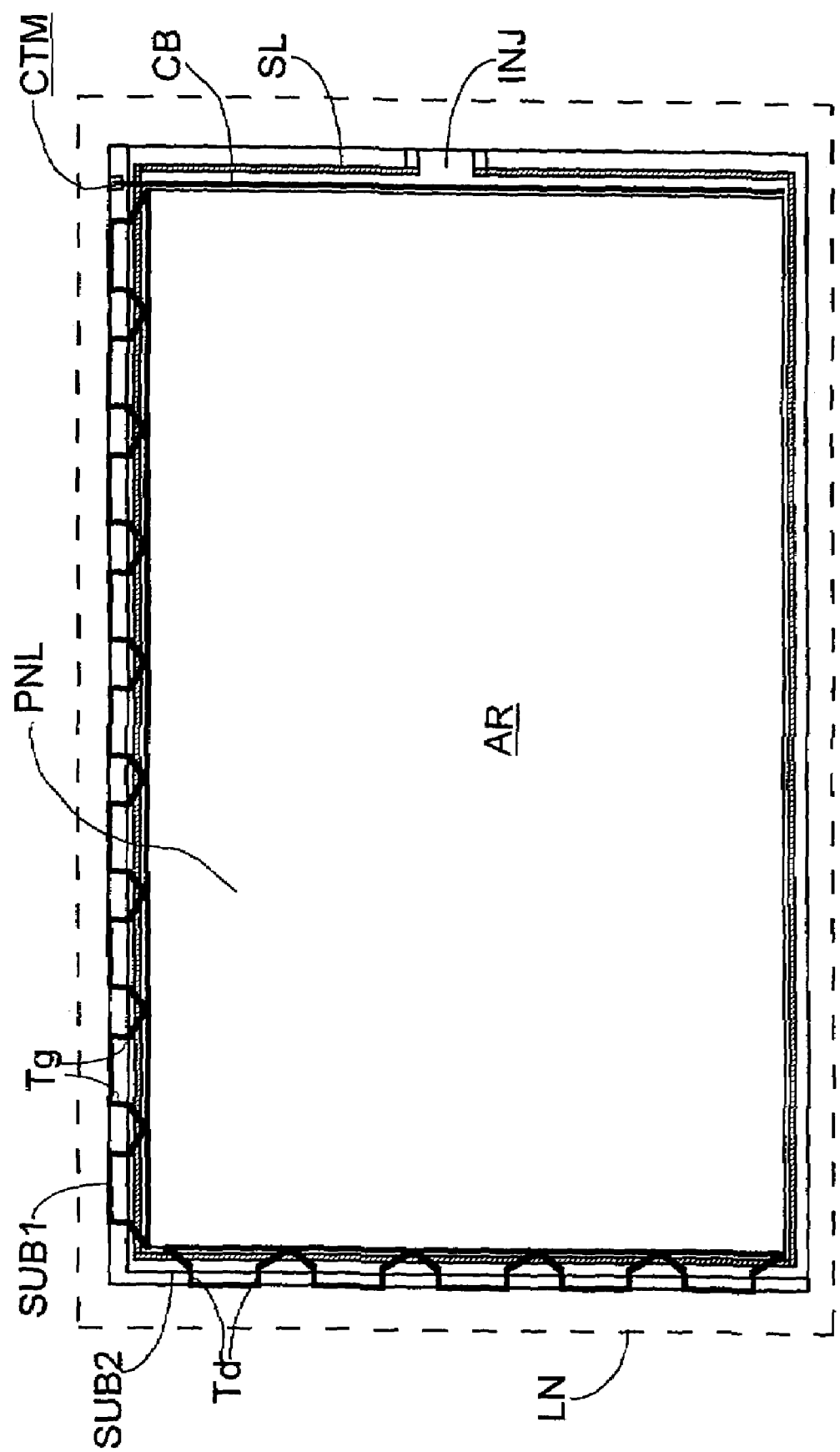
FIG. 5 is a plan view showing an external appearance of a liquid crystal display panel which is incorporated into the liquid crystal display device according to the present invention.

FIG. 5 is an overall view of a liquid crystal display panel showing a display region AR which is constituted of a mass of respective pixel regions arranged in a matrix array.

The transparent substrate SUB2 is formed so as to be slightly smaller than the transparent substrate SUB1, and the transparent substrate SUB2 is arranged such that a right side and a lower side thereof as seen in the drawing become substantially coplanar with corresponding sides of the transparent substrate SUB1.

Due to such a constitution, regions which are not covered with the transparent substrate SUB2 are formed on the left side and the upper side of the transparent substrate SUB1, as seen in the drawing. On these regions, gate signal terminals Tg, which are provided for supplying scanning signals to respective gate signal lines GL, and drain signal terminals Td, which are provided for supplying video signals to respective drain signal lines DL, are respectively formed.

The transparent substrate SUB2 is fixed to the transparent substrate SUB1 by means of sealing material SL, which is formed on a periphery of the transparent substrate SUB2. This sealing material SL also functions as a seal-in material which hermetically fills the liquid crystal LC between respective transparent substrates SUB1, SUB2.

Figure 6:
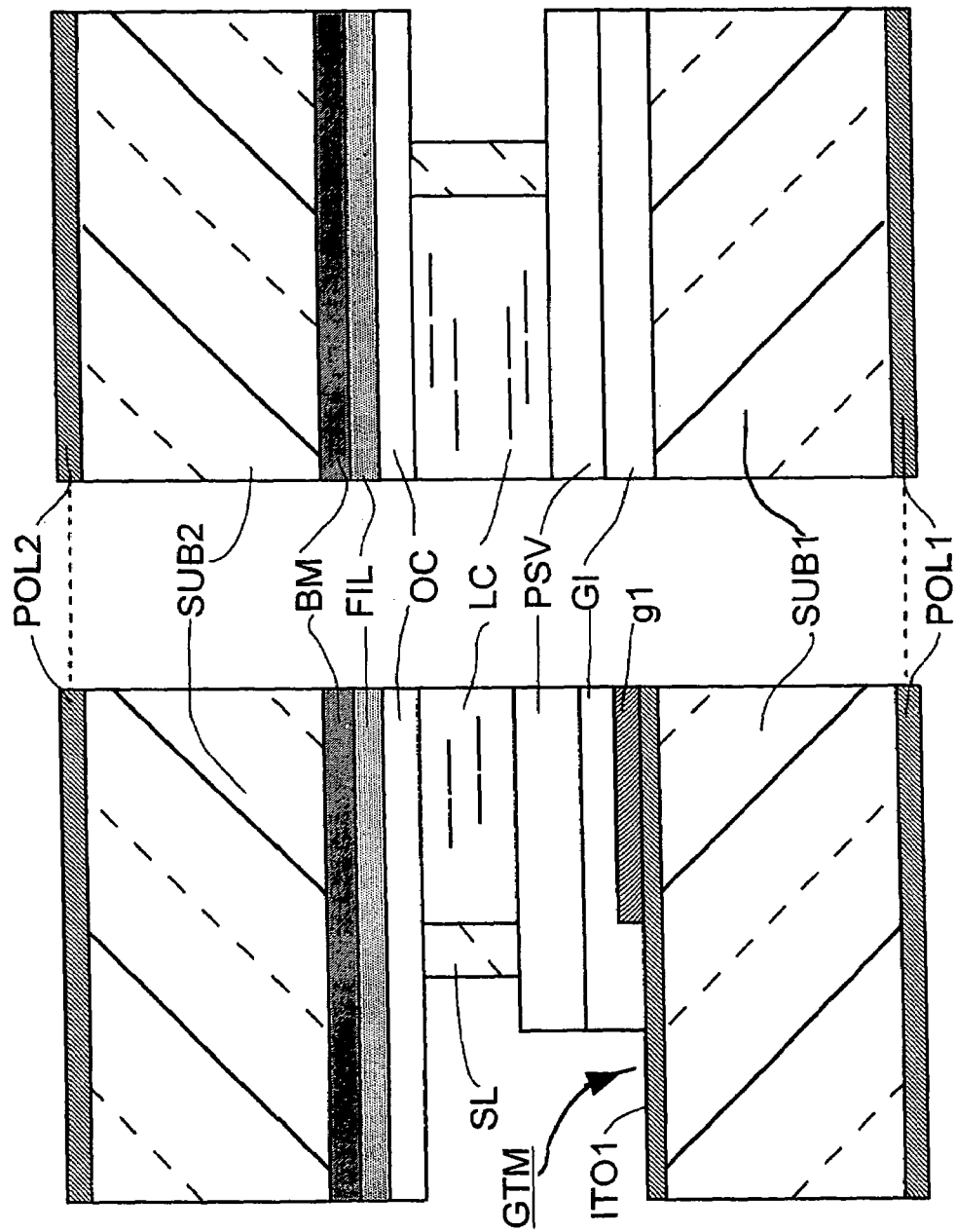
FIG. 6 is a cross-sectional view showing the constitution of a seal member which is provided for fixing respective transparent substrates of the liquid crystal display panel and for sealing liquid crystal in a space defined by respective transparent substrates.

FIG. 6 shows that the liquid crystal LC which is interposed between respective transparent substrates SUB1, SUB2 is hermetically sealed by means of the sealing material SL. A liquid-crystal filling opening INJ is formed in a portion (a middle right side in FIG. 5) of the sealing material SL, and this liquid-crystal filling opening INJ is sealed by a liquid crystal sealing agent (not shown in the drawing) after the liquid crystal is filled through the liquid crystal filling opening INJ.

<<Gate Signal Terminals>>

FIGS. 7A and 7B show the gate signal terminal GTM which is provided for supplying scanning signals to each gate signal line GL, wherein FIG. 7A is a plan view and FIG. 7B is a cross-sectional view taken along a line B—B of FIG. 7A.

First of all, the gate signal terminal GTM, which is formed of the ITO film ITO1, for example, is formed on the transparent substrate SUB1. The gate signal terminal GTM is simultaneously formed with the counter electrode CT. The reason why the ITO film ITO1 is used as the material of the gate signal terminal GTM is to make the generation of electrolytic corrosion difficult.

Then, the gate signal line GL is formed such that the gate signal line GL covers the gate-signal-line-GL-side end portion of the gate signal terminal GTM. Further, the insulation film GI and the protective film PSV are sequentially laminated, such that these films cover the gate signal terminal GTM and the gate signal line GL, and a portion of the gate signal terminal GTM is exposed through openings formed in the protective film PSV and the insulation film GI. Here, the above-mentioned insulation film GI and protective film PSV are formed as extension portions thereof in the display region AR.

<<Drain Signal Terminals>>

Figure 8A:
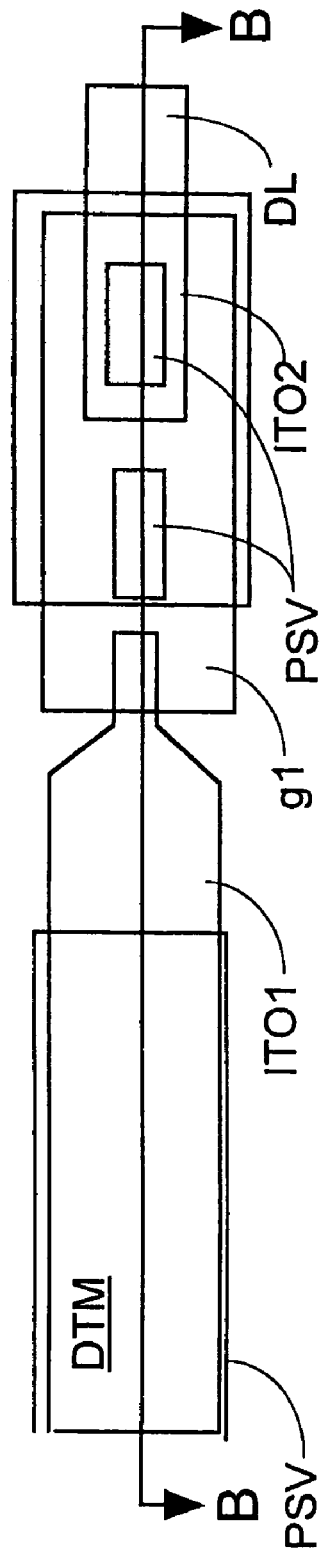
FIG. 8A is a top plan view and FIG. 8B is a cross-sectional view showing one embodiment of a drain signal terminal of the liquid crystal display device according to the present invention.
Figure 8B:
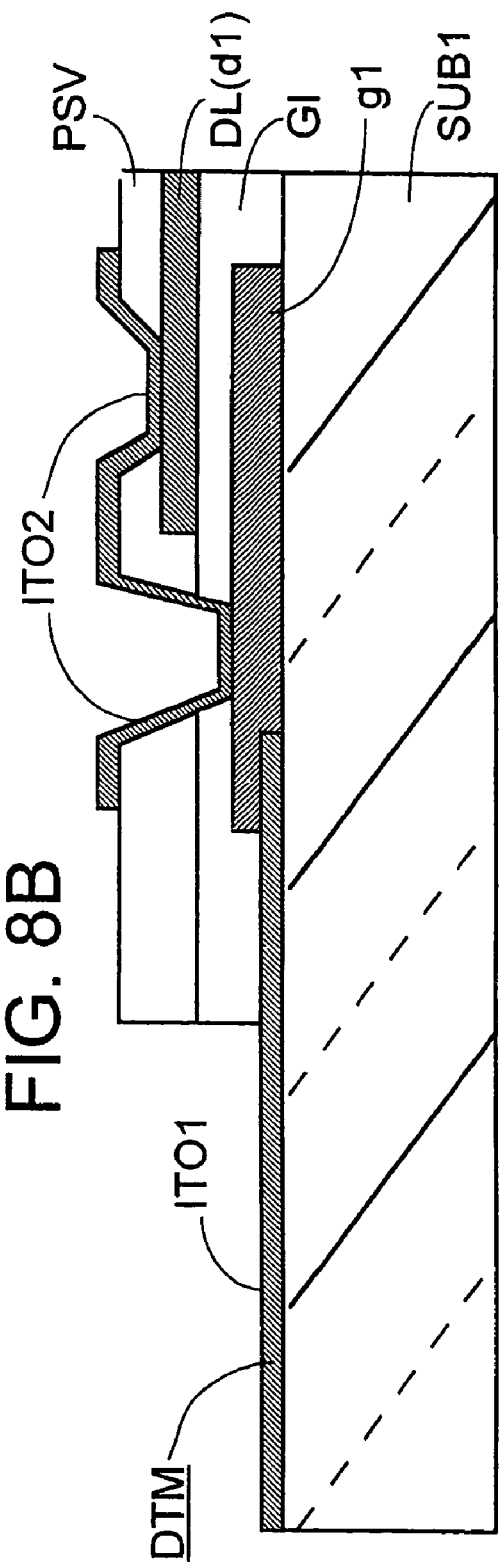

FIGS. 8A and 8B show the drain signal terminal DTM, which is provided for supplying video signals to each drain signal line DL, wherein FIG. 8A is a plan view and FIG. 8B is a cross-sectional view taken along a line B—B of FIG. 8A.

First of all, the drain signal terminal DTM, which is formed on the transparent substrate SUB1, is constituted of the ITO film ITO01, which exhibits a reliable characteristic against electrolytic corrosion, and the ITO film ITO is simultaneously formed with the counter electrode CT.

Then, although the drain signal terminal DTM is connected with the drain signal line DL, which is formed on the insulation film GI, a drawback arises when the drain signal terminal DTM is connected with the drain signal line DL by forming the contact hole in the insulation film GI. That is, the insulation film GI made of SiN, which is formed on the ITO film, becomes a whitely muddy state at a portion thereof which is brought into contact with the ITO film, so that when the contact hole is formed in the portion, the contact hole is formed in an inversely-tapered shape, whereby there still remains a possibility that the connection of the drain signal line DL becomes defective.

Accordingly, as shown in the drawing, a metal layer gl made of Cr, for example, is formed on an end portion of the drain signal terminal DTM in a superposed manner, and the contact hole is formed on the insulation film GI formed on the metal layer gl.

Then, in forming the contact hole, the man-hours for fabricating are decreased by forming the contact hole after forming the protective film PSV on the insulation film GI. Accordingly, the drain signal line DL and the metal layer gl are connected through the ITO film ITO, which is formed simultaneously with the pixel electrode PX through the contact hole formed in the protective film PSV.

Here, the case in which Cr is used as the metal layer gl is shown, however the metal layer gl may be made of Al or a material which contains Al. In this case, since the metal layer gl is liable to be oxidized on a contact surface with the ITO film as mentioned above, it is possible to obtain a favorable connection by making the metal layer gl have a three-layered structure which forms metal layers of a high melting point on upper and lower surfaces of the metal layer gl, such as Ti/Al/Ti.

<<Counter Voltage Signal Terminals>>

Figure 9A:
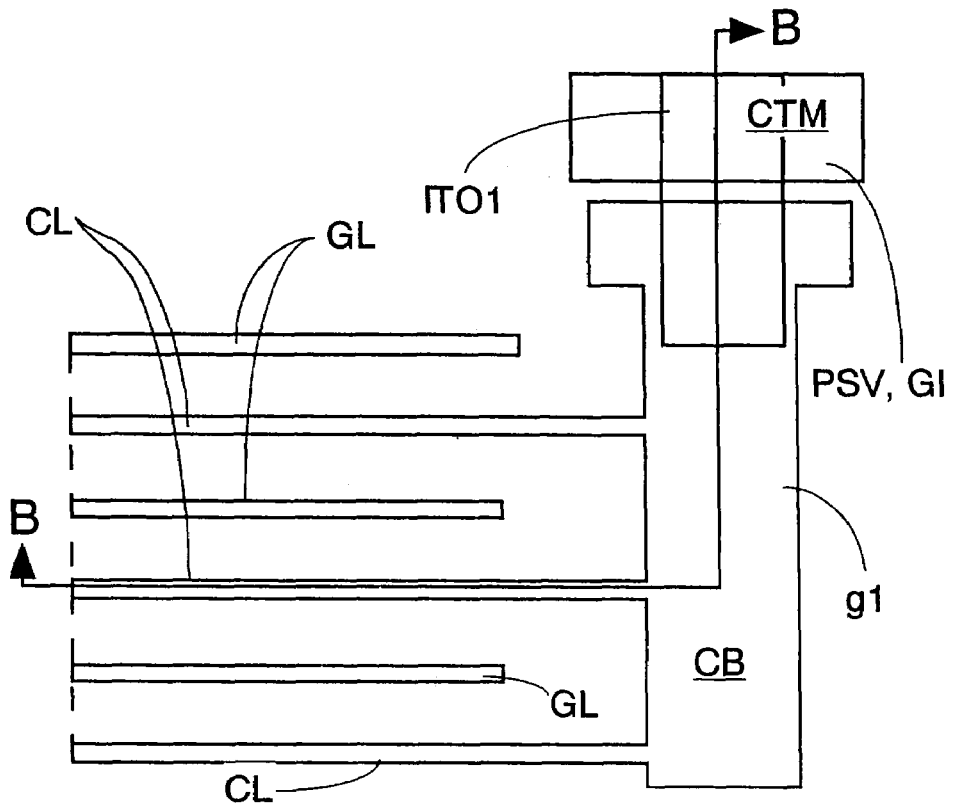
FIG. 9A is a top plan view and FIG. 9B is a cross-sectional view showing one embodiment of a counter voltage signal terminal of the liquid crystal display device according to the present invention.
Figure 9B:
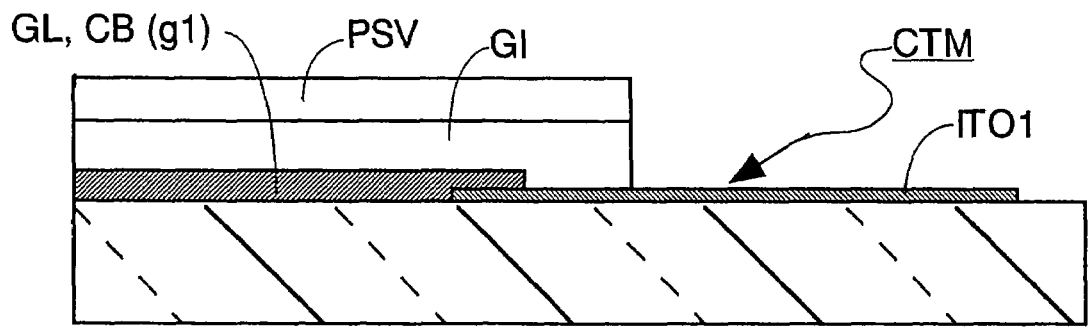

FIGS. 9A and 9B show the counter voltage signal terminal CTM, which is provided for supplying counter voltage signals to the counter voltage signal lines CL, wherein FIG. 9A is a plan view and FIG. 9B is a cross-sectional view taken along a line B—B of FIG. 9A.

The counter voltage signal terminal CTM, which is formed on the transparent substrate SUB1, is also formed of the ITO film ITO1 having reliable characteristics against electrolytic corrosion and is simultaneously formed with the counter electrode CT.

Then, the counter voltage signal lines CL are formed such that the counter voltage signal line CL cover the counter voltage signal terminal CTM at a counter-voltage-signal-line-CL-side end portion. Further, the insulation film GI and the protective film PSV, which are formed as the extension portions in the display region AR, are sequentially laminated on these signal lines so as to cover these signal lines, and a portion of the counter voltage signal terminal CTM is exposed through openings formed in the protective film PSV and the insulation film GI.

<<Equivalent Circuit>>

Figure 10:
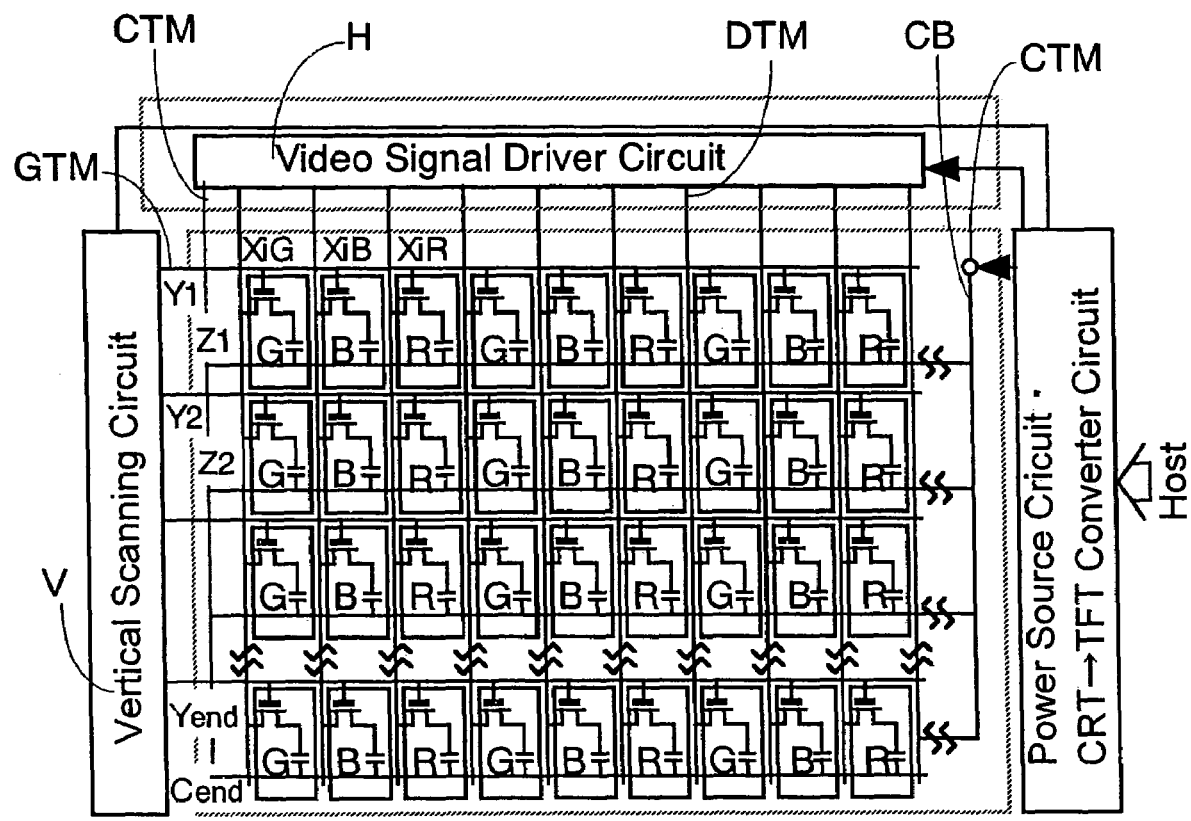
FIG. 10 is an equivalent circuit diagram showing one embodiment of the liquid crystal display device according to the present invention.

FIG. 10 shows an equivalent circuit of a liquid crystal display panel along with exteriorly mounted circuits of the liquid crystal display panel.

In FIG. 10, scanning signals (voltage signals) are sequentially supplied to respective gate signal lines GL, which extends in the x direction and are arranged in parallel in the y direction, from a vertical scanning circuit V.

Thin film transistors TFT of respective pixel regions which are arranged along the gate signal lines GL to which the scanning signals are supplied, are turned on by the scanning signals.

Video signals are supplied from a video signal driver circuit H to respective drain signal lines DL at the timing which matches the above operation and the video signals are applied to the pixel electrodes PX through the thin film transistors of respective pixel regions.

In each pixel region, counter voltages are applied to the counter electrode CT which is formed along with the pixel electrodes PX through the counter voltage signal line CL, so as to generate an electric field between them.

Then, the light transmissivity of the liquid crystal LC is controlled by an electric field (a lateral electric field) which has a component parallel to the transparent substrate SUB1.

In the drawing, respective symbols R, G, B indicate respective pixel regions at which a red filter, a green filter and a blue filter are respectively formed on respective pixel regions.

<<Timing Chart of Pixel Display>>

Figure 11:
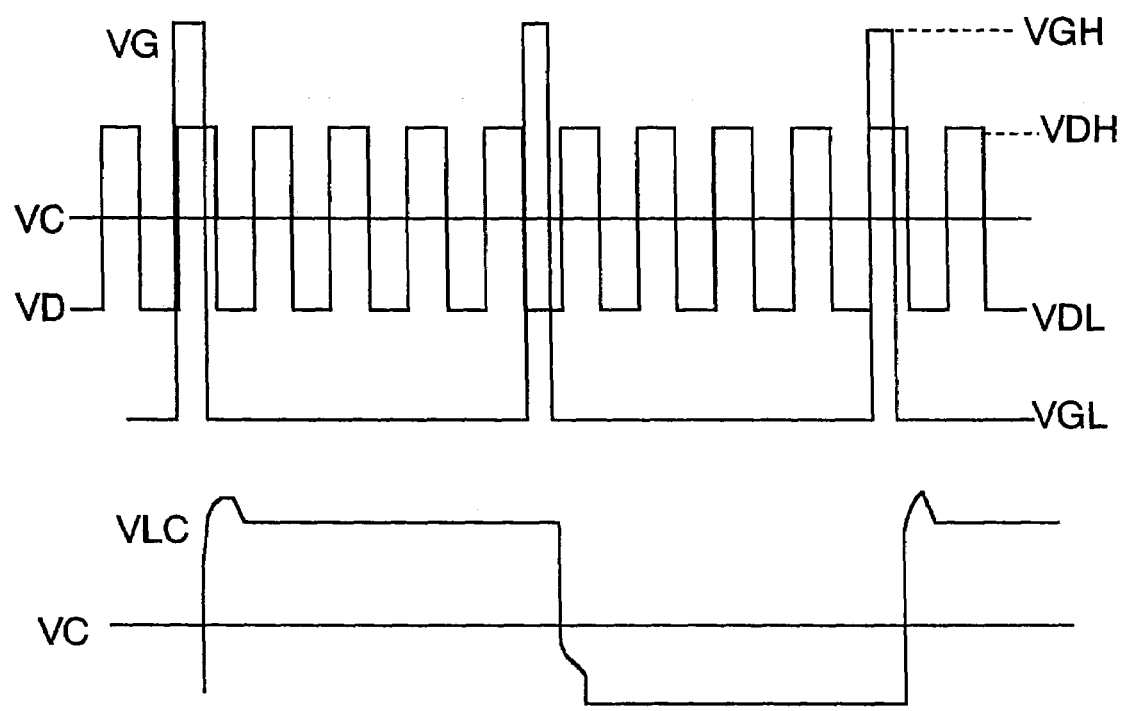
FIG. 11 is a timing chart showing one embodiment of the driving of the liquid crystal display device according to the present invention.

FIG. 11 is a timing chart of respective signals supplied to the liquid crystal display panel. In the drawing, VG indicates the scanning signal supplied to the gate signal line GL, VD indicates video signal supplied to the drain signal line DL, and VC indicates the counter voltage signal supplied to the counter voltage signal line CT. FIG. 11 is a drive waveform diagram showing a general line inversion (a dot inversion) with the potential of the counter voltage signal VC set at a fixed value.

<<Liquid Crystal Display Panel Module>>

Figure 12:
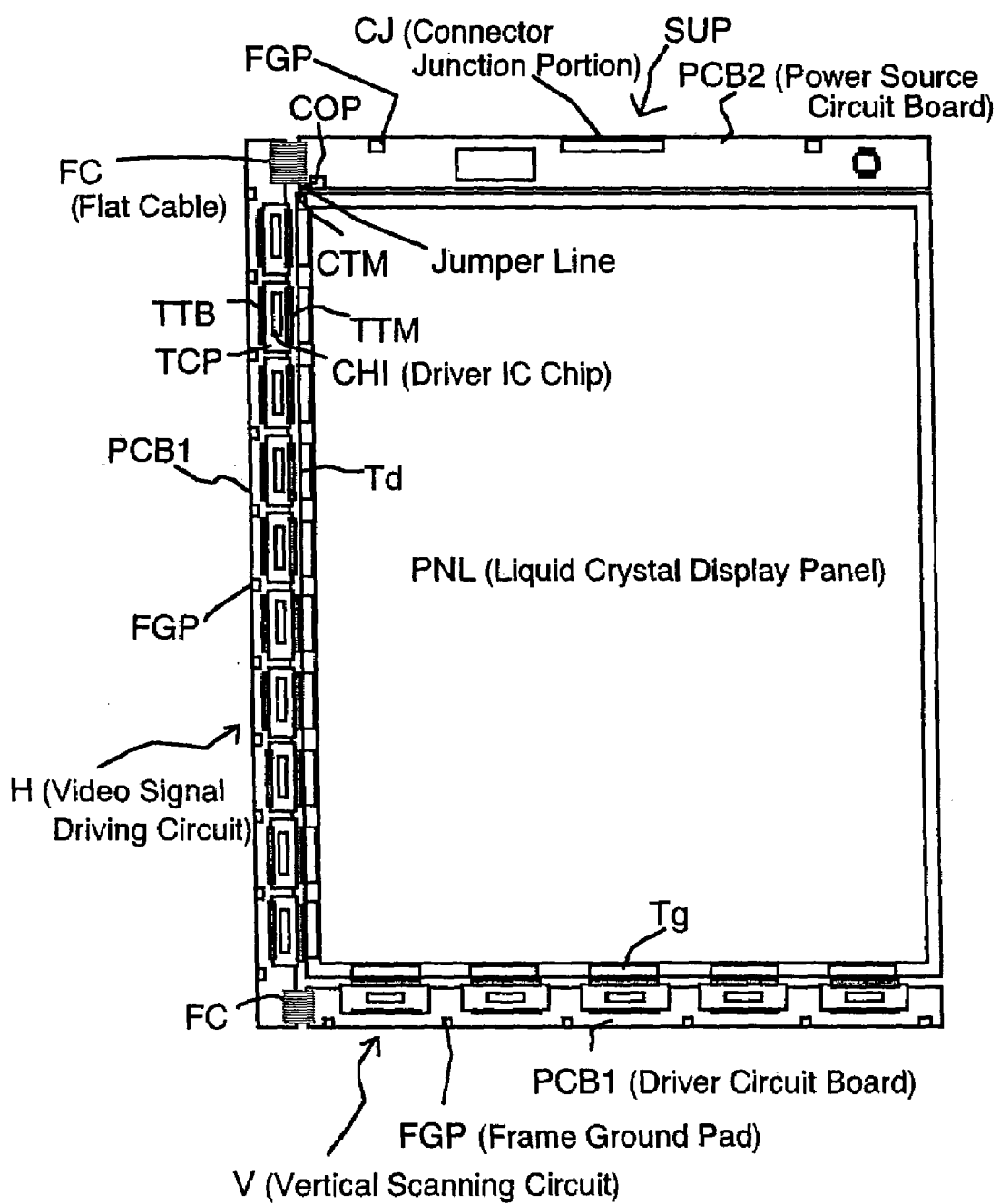
FIG. 12 is a plan view of the liquid crystal display device according to the present invention in a state wherein external circuits are connected to the liquid crystal display panel.

FIG. 12 is a plan view which shows a module structure on which the exterior circuits are mounted on the liquid crystal display panel PNL shown in FIG. 5. In the drawing, to the periphery of the liquid crystal display panel, the vertical scanning circuit V, the video signal driver circuit H and a power supply circuit board PCB2 are connected.

The vertical scanning circuit V is constituted of a plurality of driver IC chips which are formed in a film carrier system, and output bumps thereof are connected to the gate signal terminals GTM of the liquid crystal display panel, while input bumps thereof are connected to terminals on a flexible substrate.

The video signal driver circuit H, in the same manner, is also constituted of a plurality of driver IC chips which are formed in a film carrier system, and output bumps thereof are connected to the drain signal terminals DTM of the liquid crystal display panel, while input bumps thereof are connected to terminals on the flexible substrate.

The power supply circuit board PCB2 is connected to the video signal driver circuit H through a flat cable FC, and the video signal driver circuit H is connected to the vertical scanning circuit V through a flat cable FC.

The present invention is not limited to the above-mentioned constitution, and it is needless to say that the present invention is applicable to a so-called COG (Chip On Glass) system in which semiconductor chips which constitute respective circuits are directly mounted on the transparent substrate SUB1, and respective input and output bumps of the semiconductor chips are connected to terminals (or wiring layers) which are formed on the transparent substrate SUB1.

<<Fabricating Method>>

Figure 13:
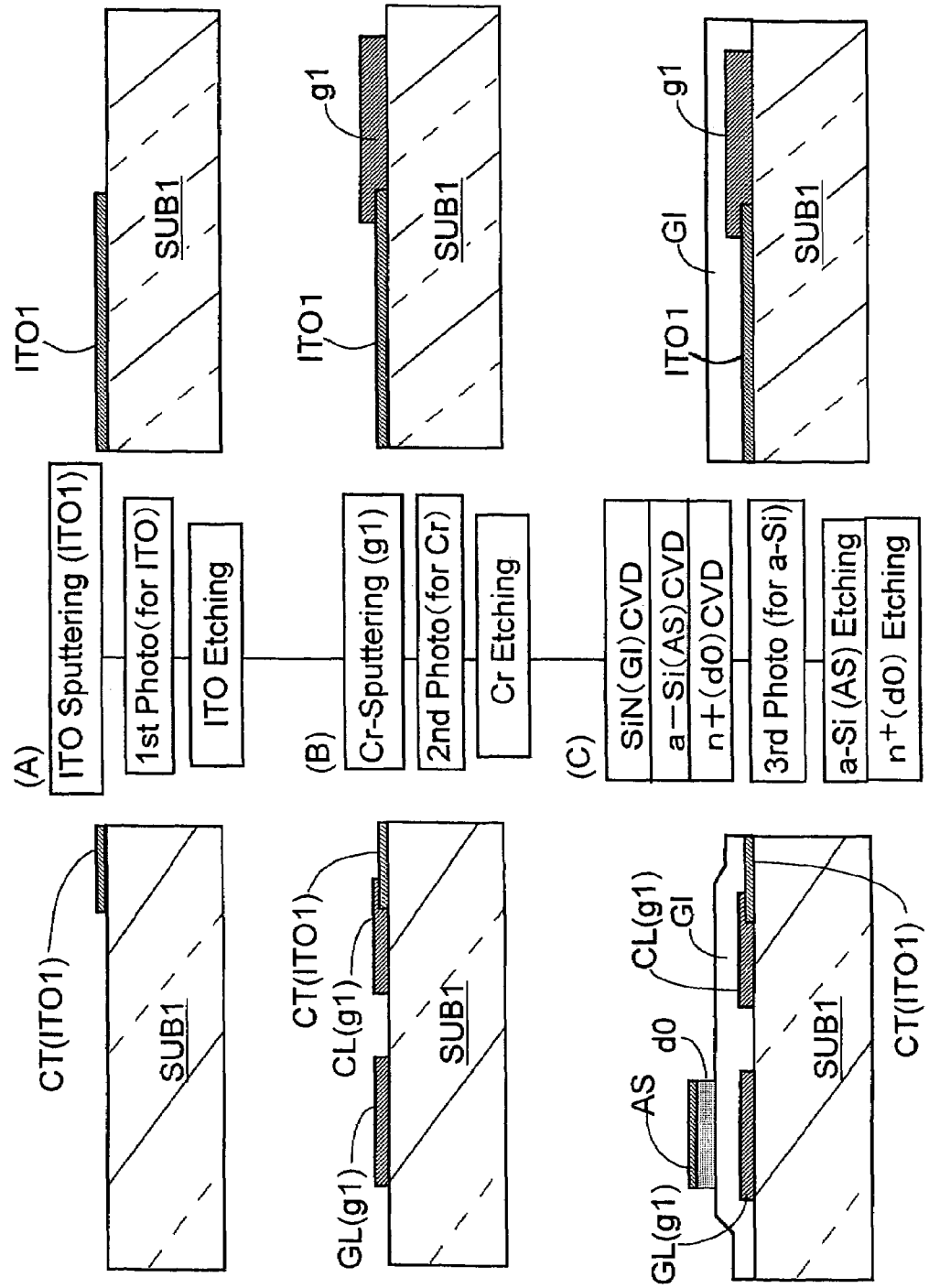
FIG. 13 is a flow chart showing one embodiment of a method of fabrication of the liquid crystal display device according to the present invention.
Figure 14:
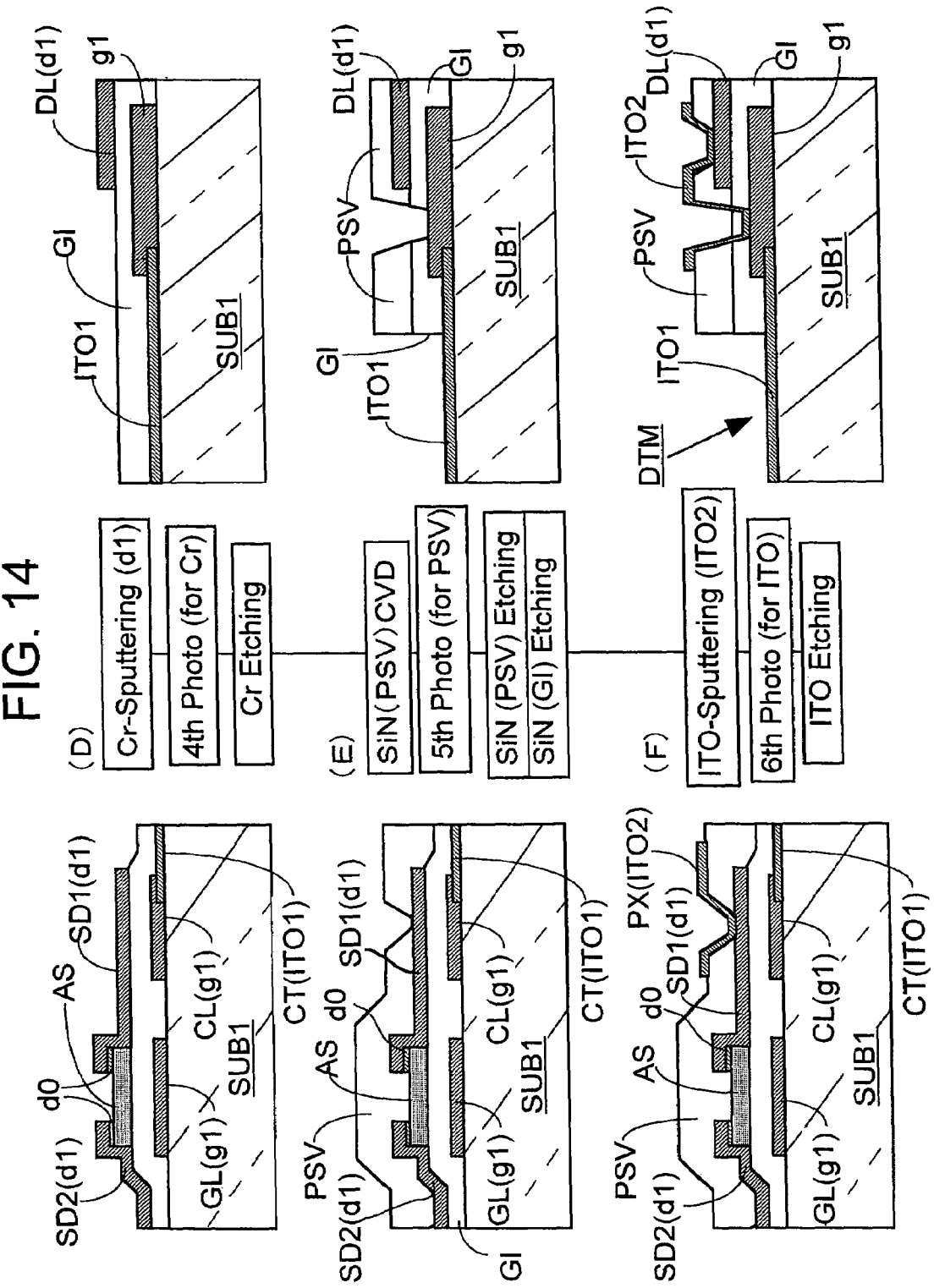
FIG. 14 is a flow chart showing one embodiment of a method of fabrication of the liquid crystal display device according to the present invention, wherein the flow chart illustrates steps which follow the steps illustrated in FIG. 13.

FIG. 13 and FIG. 14 are flow charts showing one embodiment of a method of fabrication of the above-mentioned TFT substrate.

The fabrication is completed through photolithography steps (A) to (F). In respective drawings consisting of FIG. 13 and FIG. 14, the left side indicates the pixel region and the right side indicates the drain-signal-terminal forming region in the drawing.

Hereinafter, the fabricating method will be explained in the order of the steps thereof.

Step (A)

The transparent substrate SUB1 is prepared and an ITO film is formed on the whole area of the surface thereof by sputtering, for example. Then, the ITO film is selectively etched by a photolithography technique so as to form the counter electrode CT on the pixel region and the drain signal terminal DTM on the drain-signal-terminal forming region.

Step (B)

A Cr film is formed on the whole area of the surface of the transparent substrate SUB1. Then, the Cr film is selectively etched by a photolithography technique so as to form the gate signal line GL and the counter voltage signal line CL on the pixel region and the conductive layer gi which constitutes an intermediate connector on the drain-signal-terminal forming region.

Step (C)

A SiN film is formed on the whole area of the surface of the transparent substrate SUB1 by a CVD method, for example, thus forming the insulation film GI.

Further, an a-Si layer and an a-Si layer doped with n-type impurity are sequentially formed on the whole area of the surface of the insulation film GI by a CVD method, for example. Then, the a-Si layer is selectively etched using a photolithography technique so as to form the semiconductor layer AS of the thin film transistor TFT on the pixel region.

Step (D)

A Cr film is formed on the whole area of the surface of the transparent substrate SUB1 by a sputtering method, for example, and the Cr film is selectively etched by a photolithography technique so as to form the drain signal line DL and the source electrode SD1 and the drain electrode SD2 of the thin film transistor TFT on the pixel region and the extension portions of the drain signal lines DL on the drain-signal-terminal forming region.

Step (E)

A SiN film is formed on the whole area of the surface of the transparent substrate SUB1 by a CVD method, for example, thus forming the protective film PSV. Then, the protective film PSV is selectively etched by a photolithography technique so as to form the contact hole which exposes a portion of the drain electrode SD2 of the thin film transistor TFT on the pixel region and the contact hole which penetrates the protective film PSV and reaches the insulation film GI disposed below the protective film PSV and exposes a portion of the conductive layer gl on the drain-signal-terminal forming region.

Step (F)

An ITO film ITO2 is formed on the whole area of the surface of the transparent substrate SUB1 by a sputtering method, for example. Then, the ITO film is selectively etched by a photolithography technique so as to form the pixel electrode PX which is connected to the drain electrode SD2 of the thin film transistor TFT through the contact hole on the pixel region and the connection layer which connects the drain signal line DL and the above-mentioned conductive layer g1 on the drain-signal-terminal forming region.

In the above-mentioned fabricating method, the step (A) and the step (B) can be reversed. That is, the counter electrode CT can be connected to the gate signal line GL from above. In this case, it is necessary to form the cross-sectional shape of the gate signal line GL into a gentle tapered shape.

On the other hand, in this system, since the counter electrodes CT are disposed below the gate signal lines GL and the counter voltage signal lines CL, a favorable connection can be obtained irrespective of the cross-sectional shape of the gate signal lines GL.

On the other hand, although the SiN film is used as the gate insulation film GI in this embodiment, the whitely muddy state of the ITO can be surely prevented, so that an insulation film containing oxygen, such as $SiO_2$ or SiON, may be used at least as the gate insulation film GI which is brought into contact with ITO.

Embodiment 2

<<Constitution of Pixel>>

Figure 15:
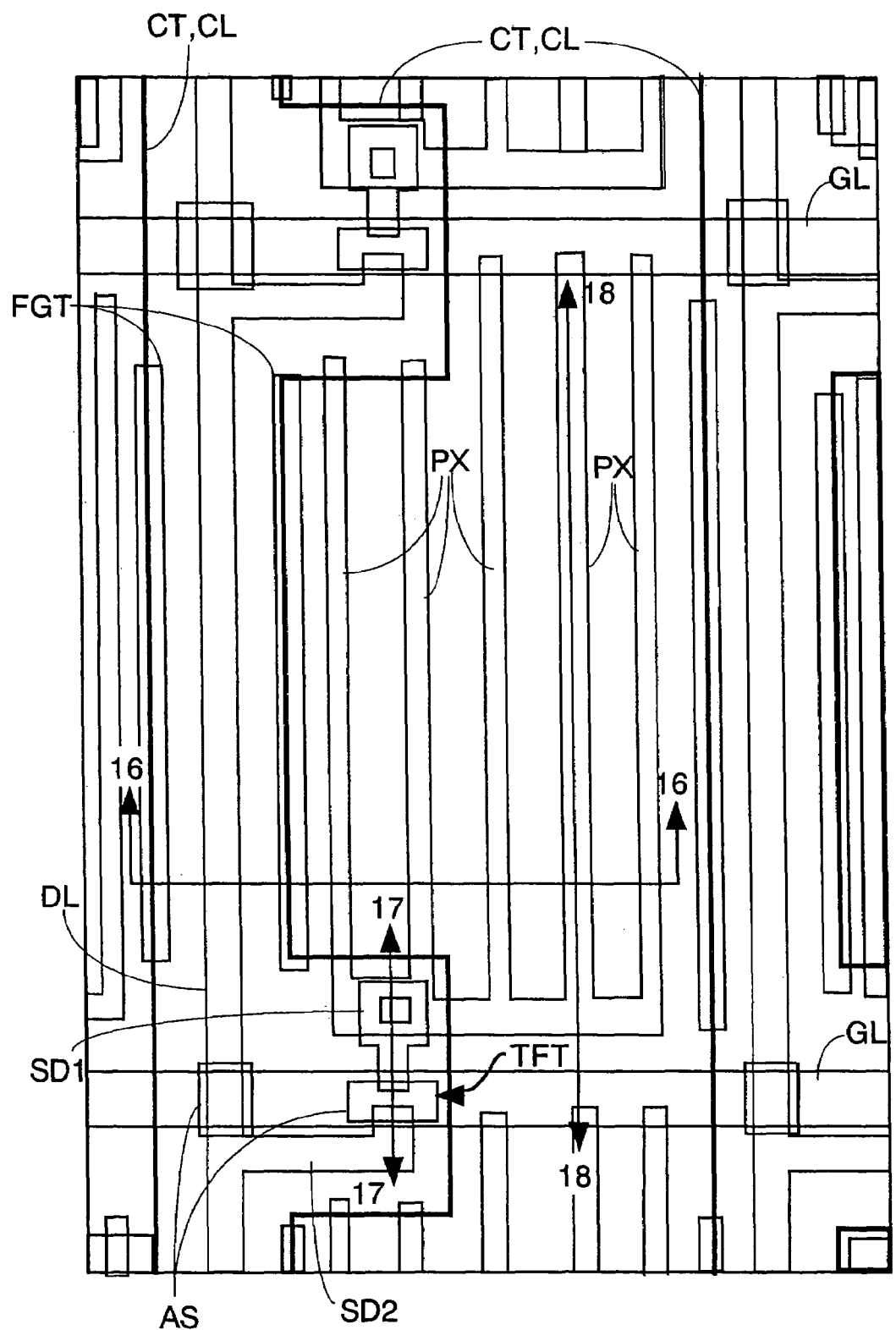
FIG. 15 is a plan view showing another embodiment of the pixel region of the liquid crystal display device according to the present invention.
Figure 16:
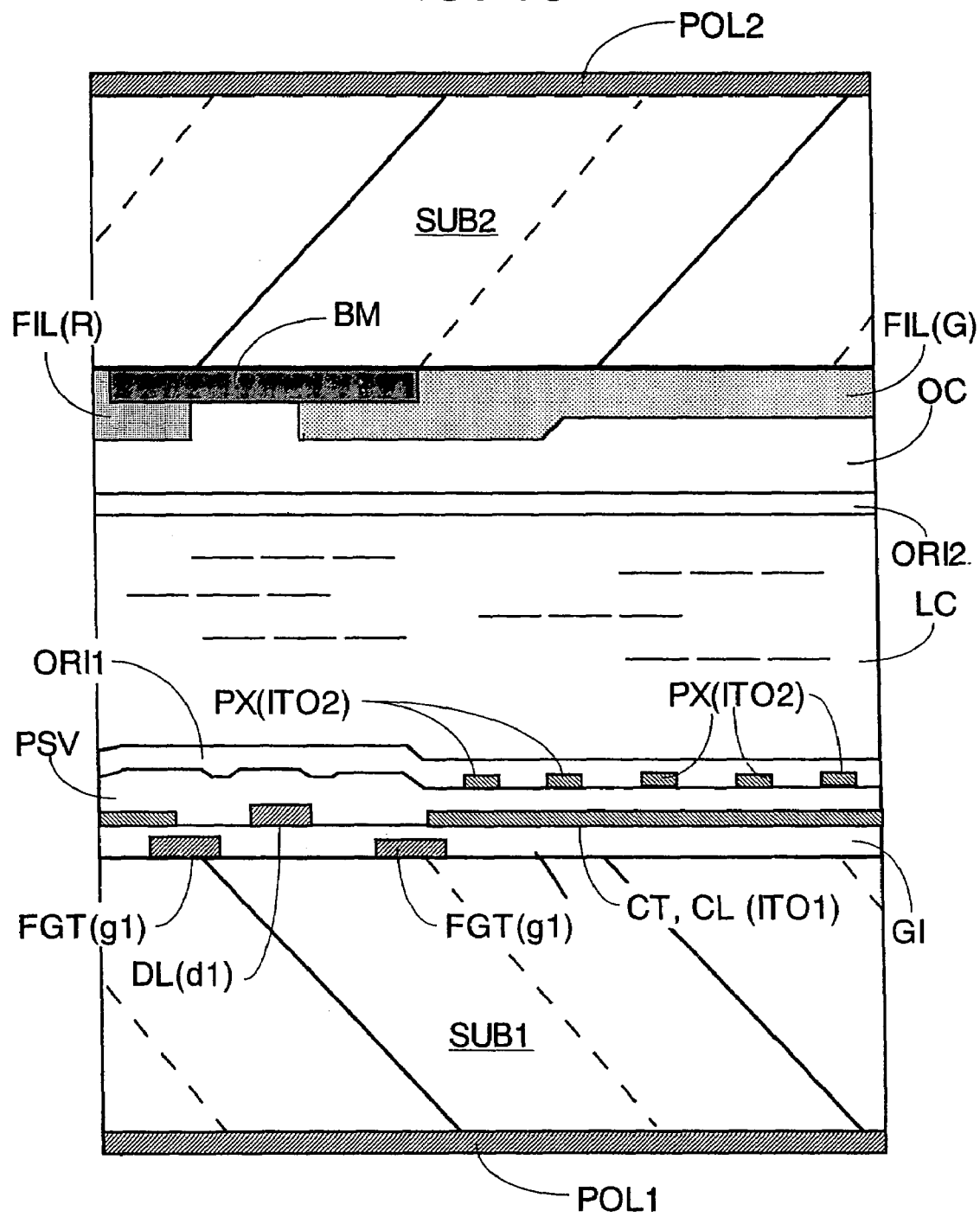
FIG. 16 is a cross-sectional view taken along a line 16—16 of FIG. 15.
Figure 17:
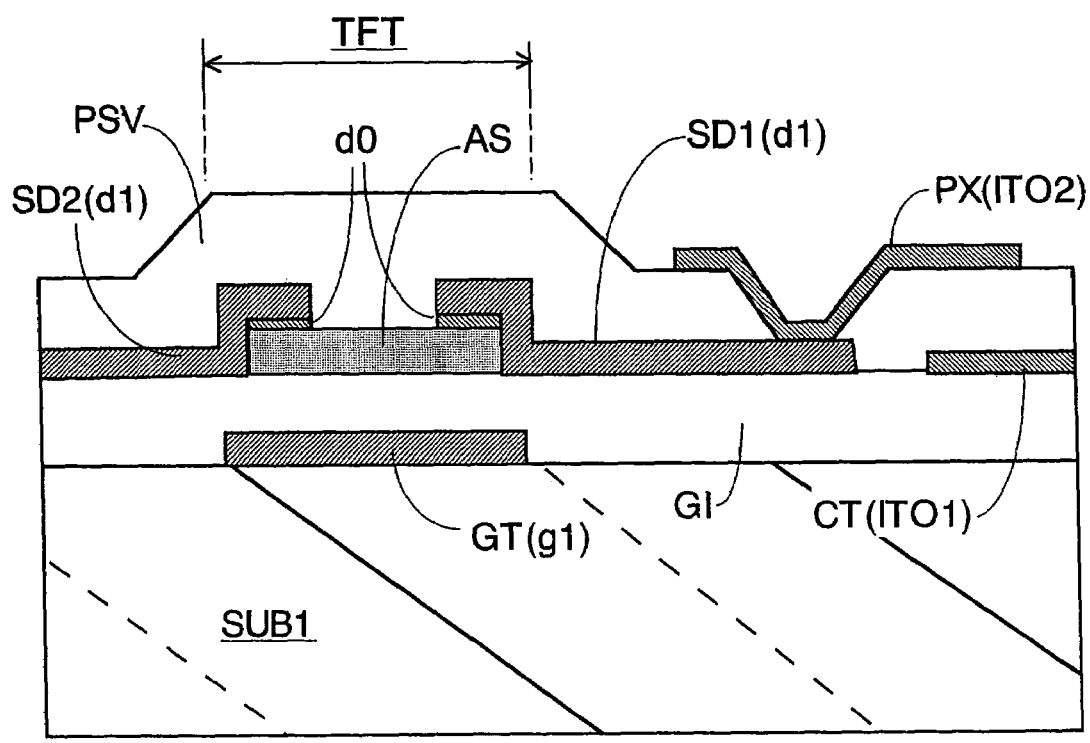
FIG. 17 is a cross-sectional view taken along a line 17—17 of FIG. 15.
Figure 18:
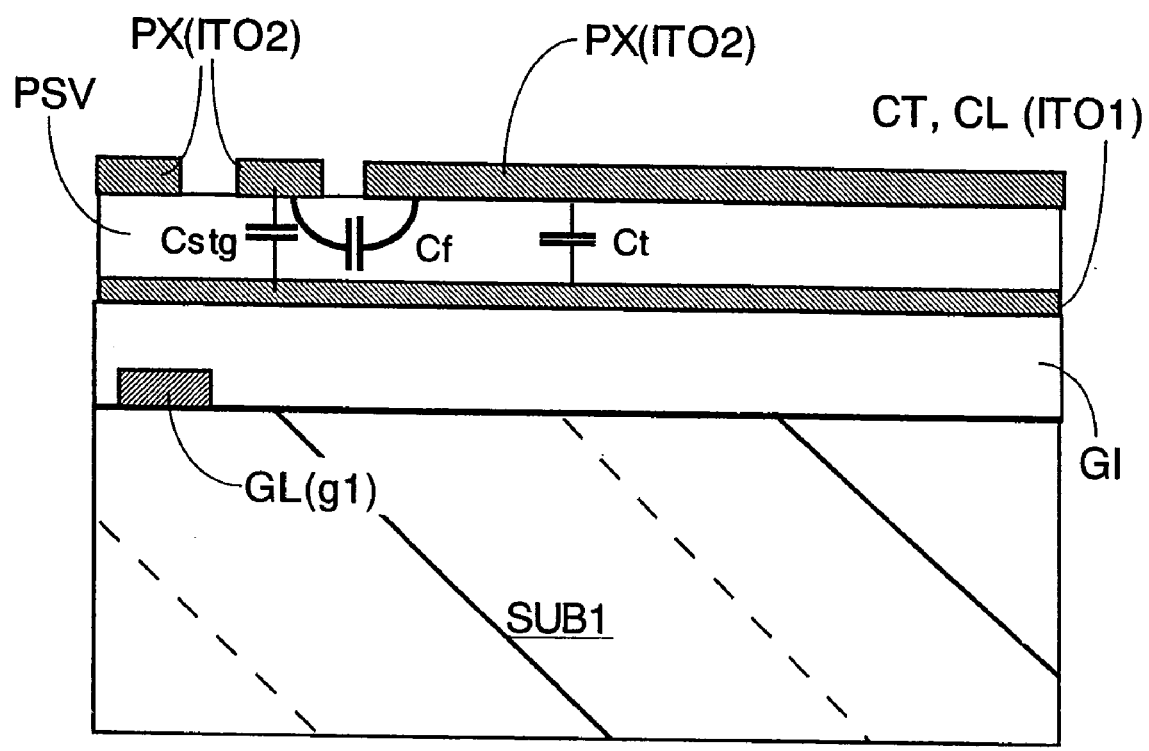
FIG. 18 is a cross-sectional view taken along a line 18—18 of FIG. 15.

FIG. 15 is a plan view showing another embodiment of a liquid crystal display device according to the present invention; and, FIG. 16, FIG. 17 and FIG. 18 are respectively a cross-sectional view taken along a line 16—16 of FIG. 15, a cross-sectional view taken along a line 17—17 of FIG. 15 and a cross-sectional view taken along a line 18—18 of FIG. 15.

FIG. 15 corresponds to FIG. 1, which shows the embodiment 1, wherein the same symbols as used in FIG. 1 indicate identical elements.

The constitution of this embodiment, which differs from the constitution of the first embodiment, is that, first of all, counter electrodes CT which are formed of transparent electrodes, are formed on an insulation film GI, and the counter electrodes CT and the drain signal lines DL are formed on the same layer. This implies that the counter electrodes CT are formed as layers which are different from gate signal lines GL. Then, conductive films FGT, which are formed on a side portion of the counter electrode CT at a position close to the drain signal lines DL, are formed on the same layer as the gate signal lines GL, wherein the conductive films FGT are formed such that the conductive films FGT are not electrically connected with the counter electrodes CT.

Accordingly, as in the case of the embodiment 1, the conductive films FGT do not function as portions of the counter voltage signal lines CL and exclusively function as light shielding materials which prevent the leaking of light or the like due to liquid crystal derived from an electric field generated between the drain signal lines DL and the counter electrodes CT.

Such a constitution brings about an advantageous effect in that the distance between the drain signal line DL and the counter electrode CT can be narrowed, so that the numerical aperture can be enhanced.

However, it is needless to say that the conductive films FGT are not formed in such a manner and are formed on the same layer with the counter electrodes CT, and they are formed such that the conductive films FGT are partially connected with side portions of the counter electrode CT in the vicinity of the drain signal lines DL.

Then, in respective pixel regions, the counter electrodes CT of respective pixel regions, which are arranged along the drain signal lines DL (in the direction perpendicular to the gate signal lines GL), are connected to each other. That is, the counter electrodes CT of respective pixel regions are integrally formed with each other astride the region where the gate signal line GL is formed. In other words, the counter electrodes CT of respective pixel regions, which are arranged along the drain signal lines DL, are formed in a strip shape along the drain signal lines DL, and these respective strip-like counter electrodes CT are divided by regions where the drain signal lines DL are formed.

These counter electrodes CT are formed on the layer different from the layer for the gate signal lines GL, and hence, the counter electrodes CT can be formed without being connected with the gate signal lines GL. By supplying counter voltage signals to the counter electrodes CT, which are formed in such a strip shape, from the outside of a display region, which is formed as a mass of pixel regions, it is possible to obtain an advantageous effect in that it is unnecessary to specifically form the counter voltage signal lines CL shown in the embodiment 1.

Accordingly, by disposing the pixel electrodes PX closer to the gate signal lines GL or by extending the pixel electrodes PX to an extent that the pixel electrodes PX are superposed on the gate signal lines GL (see FIG. 15), it is possible to make the pixel electrodes PX have a function of the pixel region also is in the vicinity of the gate signal lines GL. This brings about an advantageous effect in that, in the vicinity of the gate signal lines GL, it is sufficient to make the gate signal lines GL per se have the function of the black matrix (in other words, the black matrix which covers the gate signal lines GL and portions in the vicinity of the gate signal lines GL being no more necessary) so that the numerical aperture can be largely enhanced.

In the above-mentioned embodiment, among respective pixel regions, the counter electrodes CT of respective pixel regions, which are arranged along the drain signal lines DL, are commonly constituted. However, it is needless to say that the counter electrodes CT of respective pixel regions which are arranged along the gate signal lines GL are also commonly constituted.

In this case, it is necessary that the counter electrodes CT are formed on a layer which is different from the layer for the drain lines DL, and it is applicable to the constitution of the embodiment 1.

<<Fabricating Method>>

Figure 19:
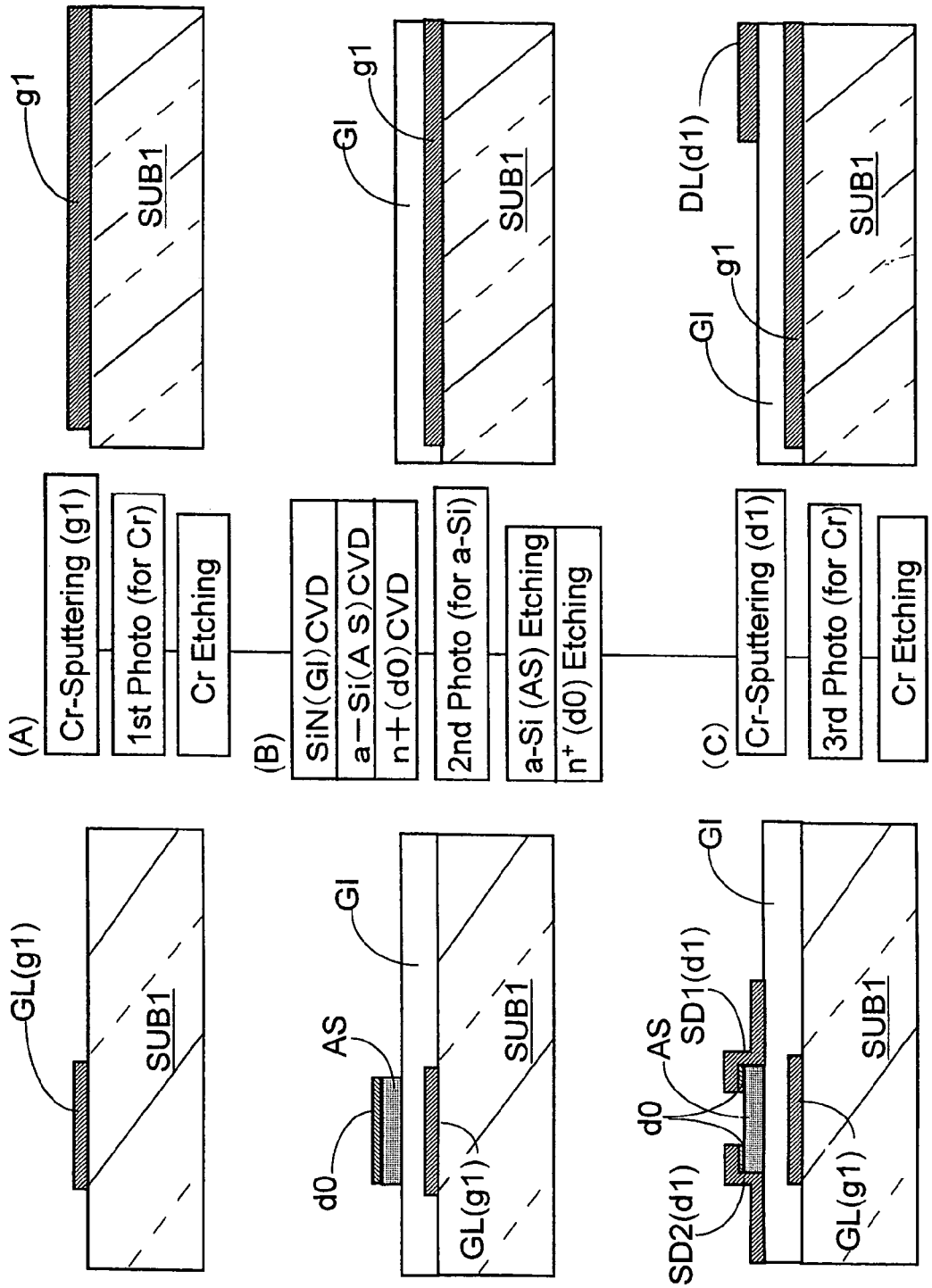
FIG. 19 is a flow chart showing another embodiment of the method of fabrication of the liquid crystal display device according to the present invention.
Figure 20:
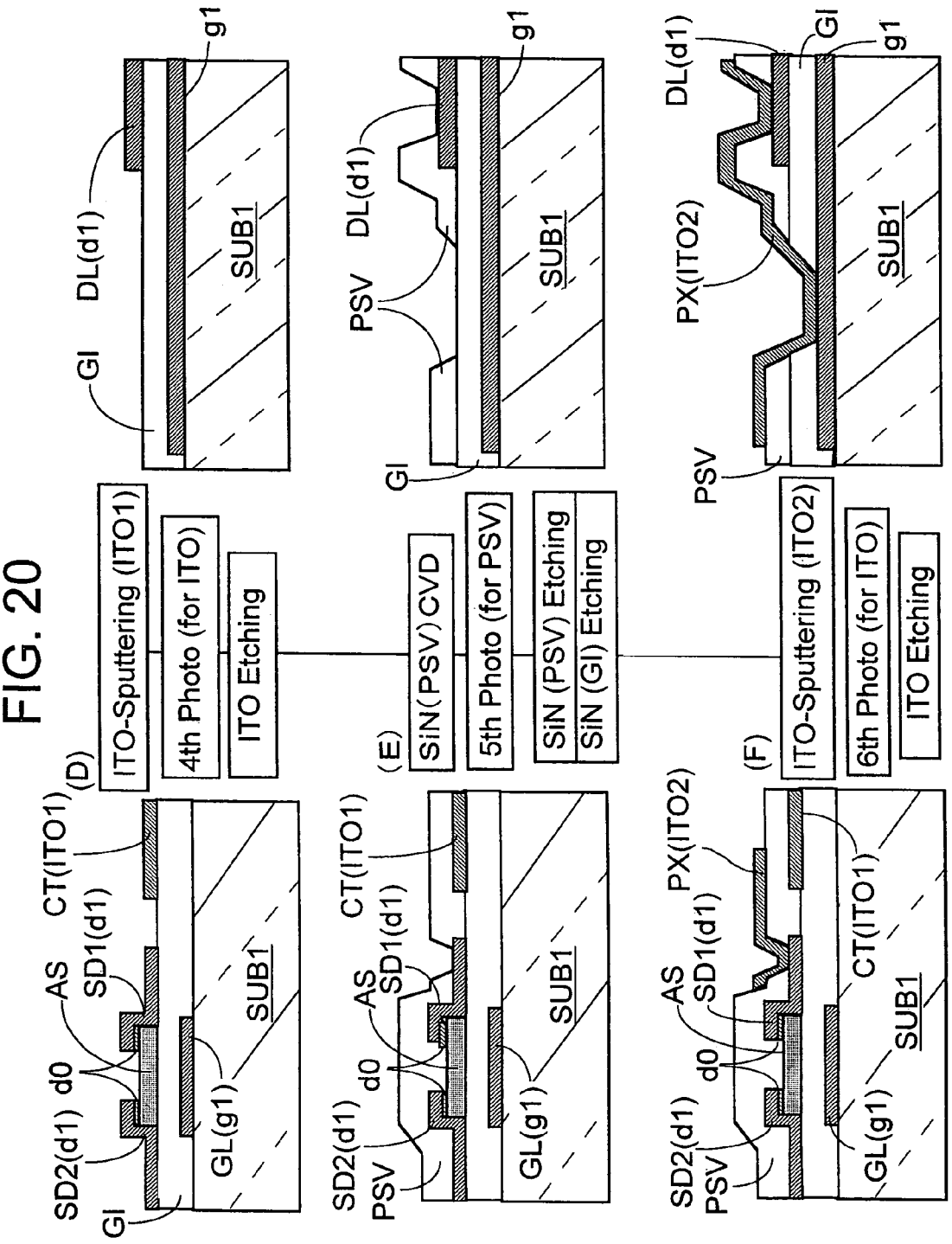
FIG. 20 is a flow chart showing another embodiment of the method of fabrication of the liquid crystal display device according to the present invention, wherein the flow chart illustrates steps which follow the steps illustrated in FIG. 19.

FIG. 19 and FIG. 20 are flow charts showing one embodiment of the method of fabrication of the liquid crystal display device described in the above-mentioned embodiment. These drawings are similar to FIG. 13 and FIG. 14.

In comparison with the embodiment 1, this embodiment differs from the embodiment 1 in the fabrication steps corresponding to the difference in constitution whereby the counter electrodes CT are formed on an upper surface of the insulation film GI and the pixel electrodes PX are formed on the counter electrodes CT by way of the protective film PSV.

Embodiment 3

Figure 21:
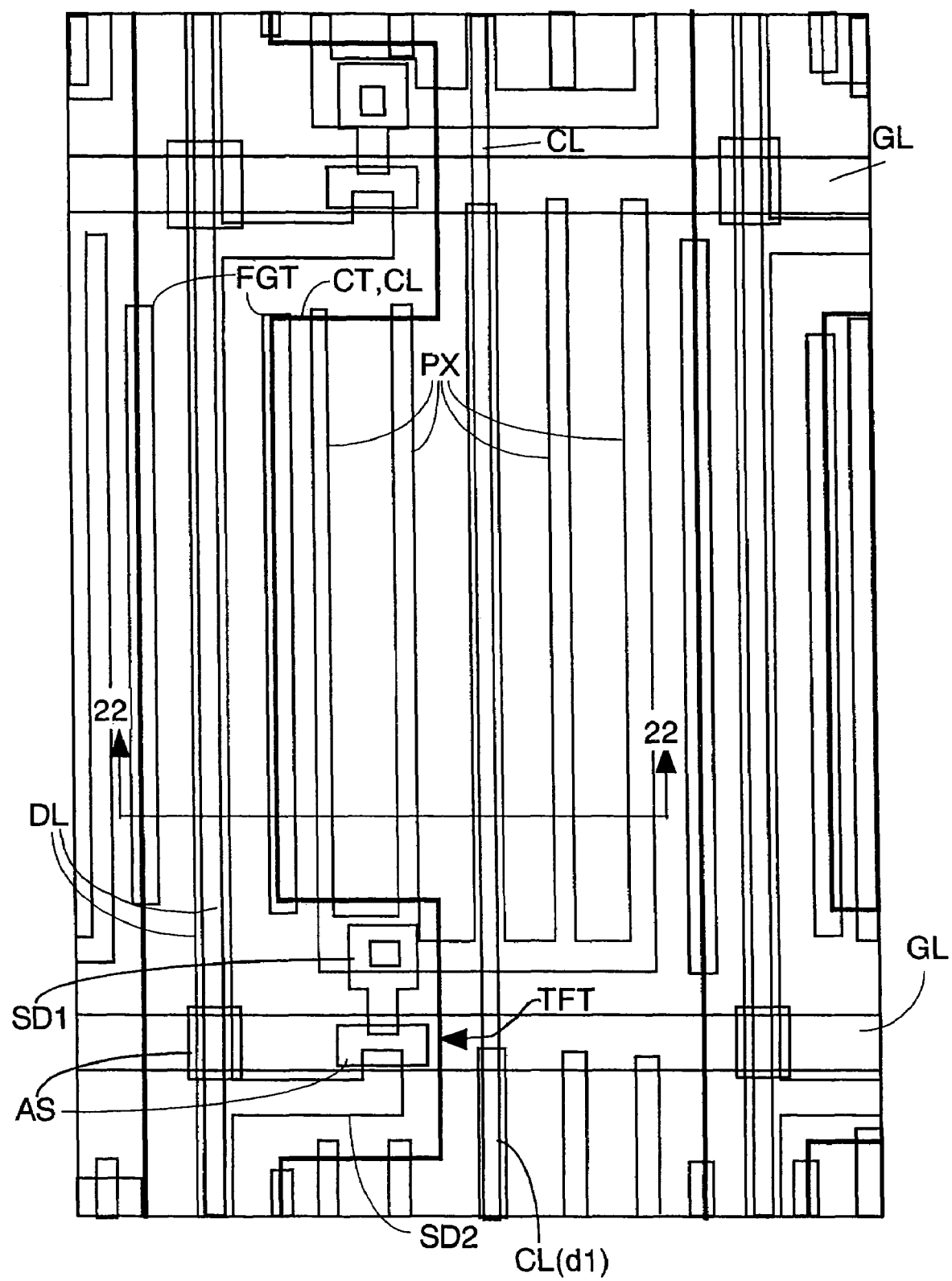
FIG. 21 is a plan view showing another embodiment of the pixel region of the liquid crystal display device according to the present invention.
Figure 22:
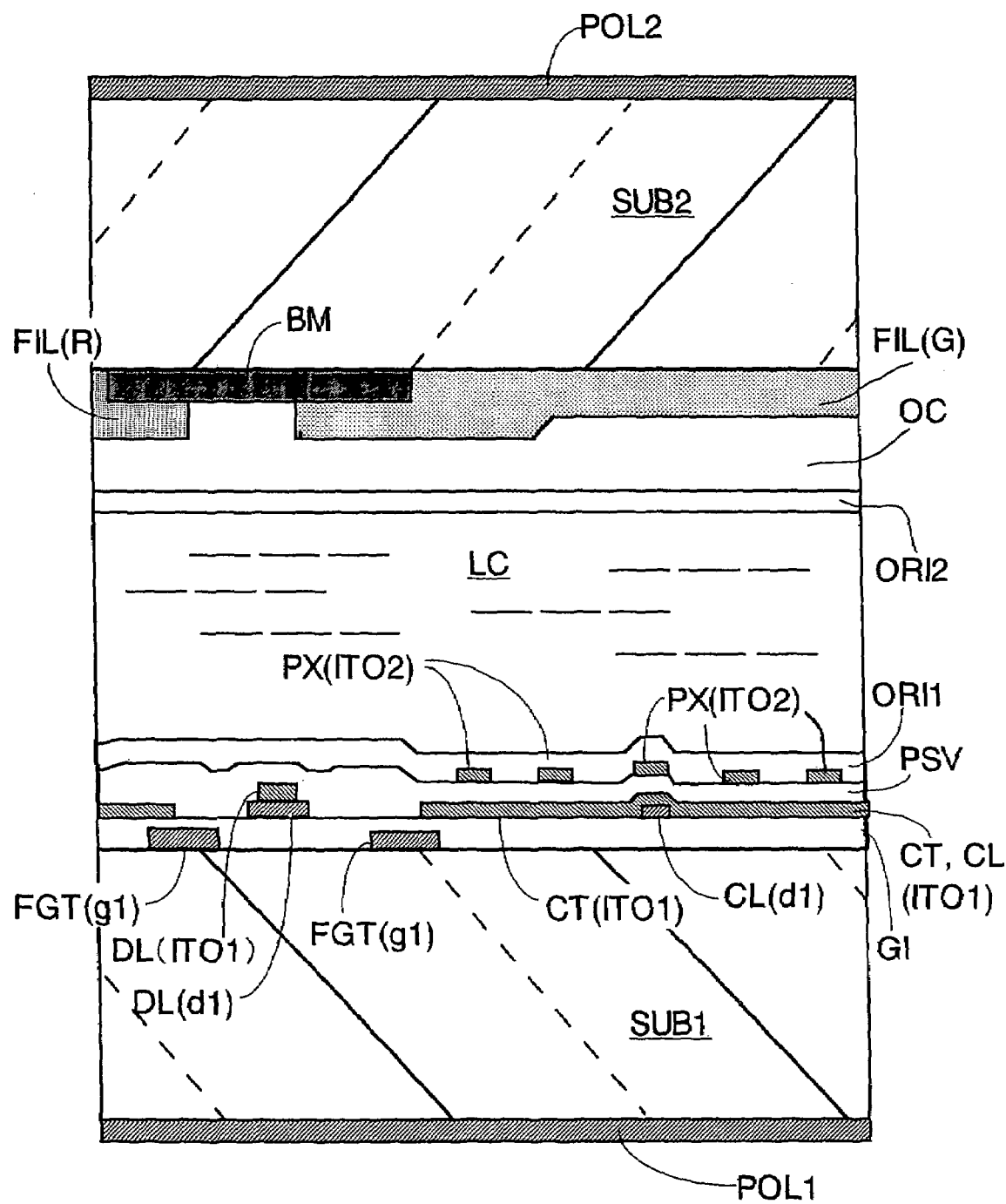
FIG. 22 is a cross-sectional view taken along a line 22—22 of FIG. 21.

FIG. 21 is a plan view showing another embodiment of a liquid crystal display device according to the present invention, and it is similar to FIG. 15. FIG. 22 is a cross-sectional view taken along a line 22—22 of FIG. 21.

In FIG. 21, the same symbols as used in FIG. 15 indicate the same parts.

The portion of this embodiment which differs from the constitution shown in FIG. 15 is that, first of all, in the inside of respective pixel regions which are arranged along drain signal lines DL, counter voltage signal lines CL, which run substantially in parallel with the drain signal lines DL, are formed.

The counter voltage signal lines CL are formed right below (or maybe right above) counter electrodes CT. In other words, the counter voltage signal lines CL are formed such that the counter voltage signal lines CL are connected to the counter voltages CT and have the function of decreasing the electric resistance of the counter electrodes CT per se.

The counter voltage signal lines CL are simultaneously formed with the drain signal lines DL, for example, and are formed of the same material as the drain signal lines DL. Accordingly, the counter voltage signal lines CL are constituted of conductive layers having an electric resistance smaller than that of ITO, which constitutes the counter electrodes CT.

The counter voltage signal line CL runs at the center of the pixel region so as to divide the pixel region substantially in half. This is because the counter voltage signal line CL is formed such that the short-circuiting of the counter voltage signal line CL and the drain signal lines DL, which are disposed at both sides of the pixel region, can be surely avoided.

Further, the counter voltage signal line CL is formed in a superposed manner on one of the pixel electrodes PX, which are formed such that the pixel electrodes PX extend in the y direction, as seen in the drawing.

In view of the fact that the portions on which the pixel electrodes PX are formed constitute portions which cannot avoid the reduction of the light transmissivity, this embodiment is provided to minimize the reduction of the light transmissivity on the whole pixel region by positioning the counter voltage signal line CL on the portion.

In this embodiment, the ITO film ITO is formed on an upper surface of the drain signal line DL by lamination and even when the drain signal line DL is formed in a disconnected state, the disconnection can be repaired by the ITO film ITO1.

Since the ITO film ITO can be simultaneously formed at the time of forming the counter electrode CT, it is possible to obtain an advantageous effect in that the increase of man-hours for fabrication can be avoided.

Embodiment 4

Figure 23:
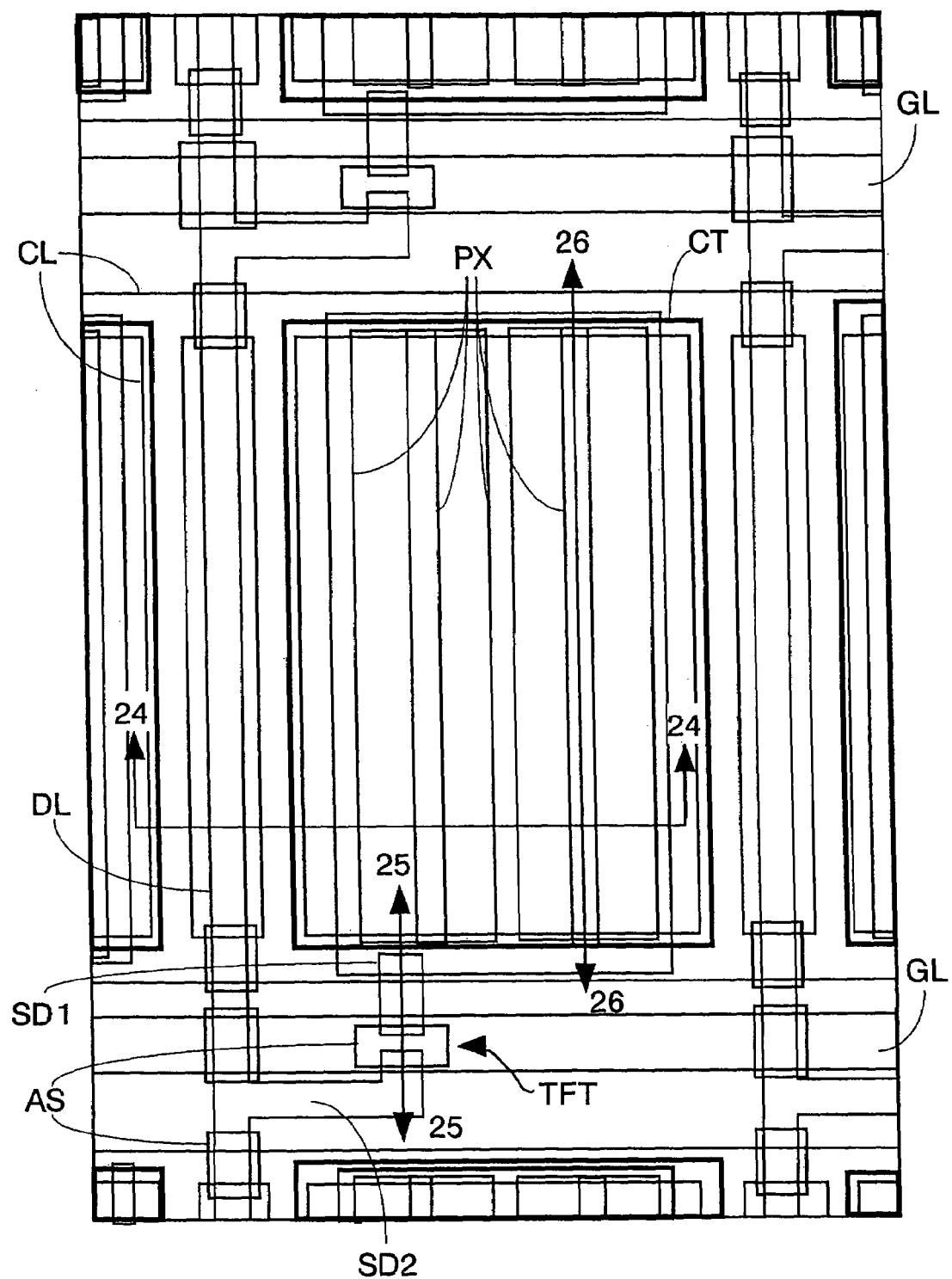
FIG. 23 is a plan view showing another embodiment of the pixel region of the liquid crystal display device according to the present invention.
Figure 24:
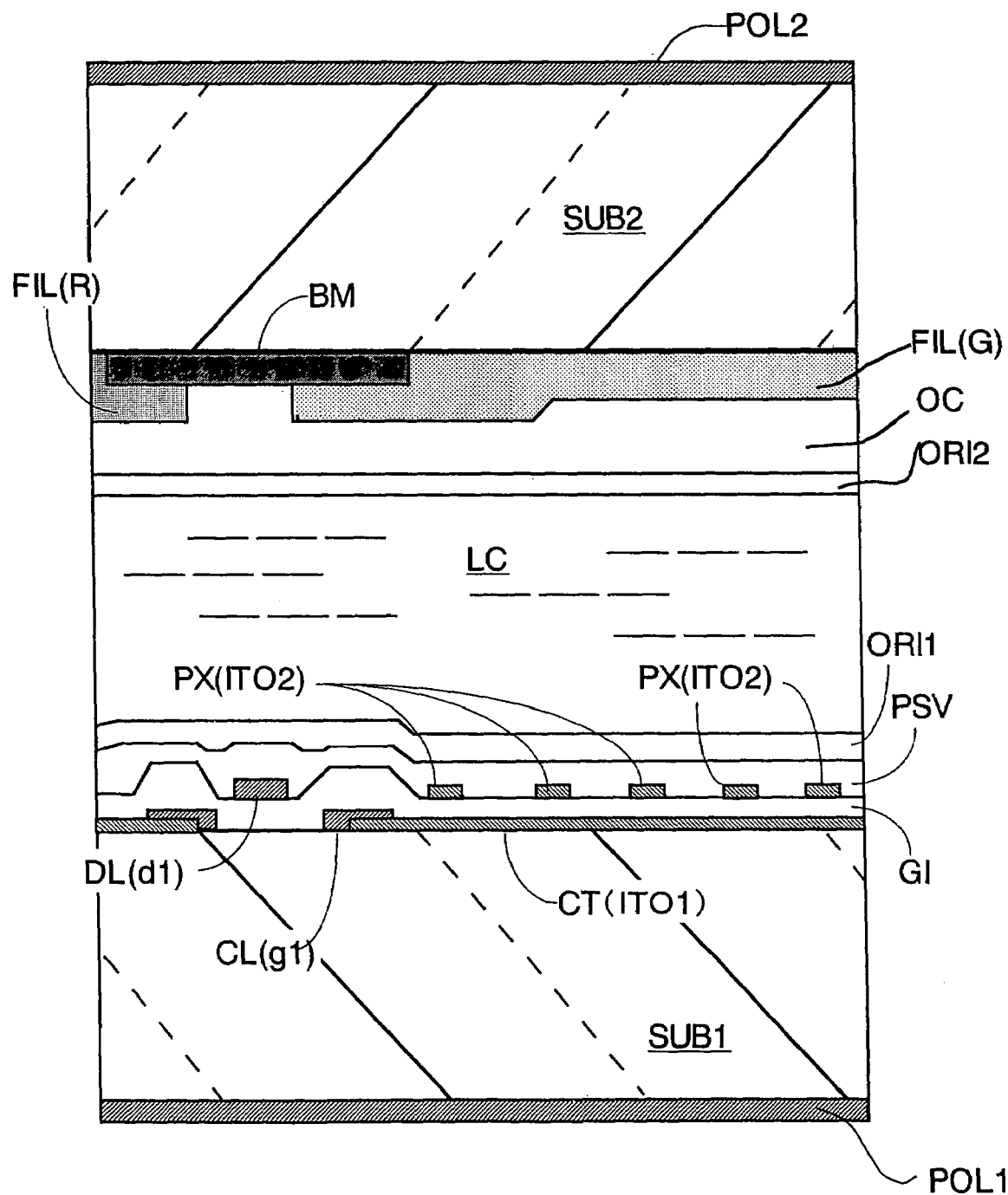
FIG. 24 is a cross-sectional view taken along a line 24—24 of FIG. 23.
Figure 25:
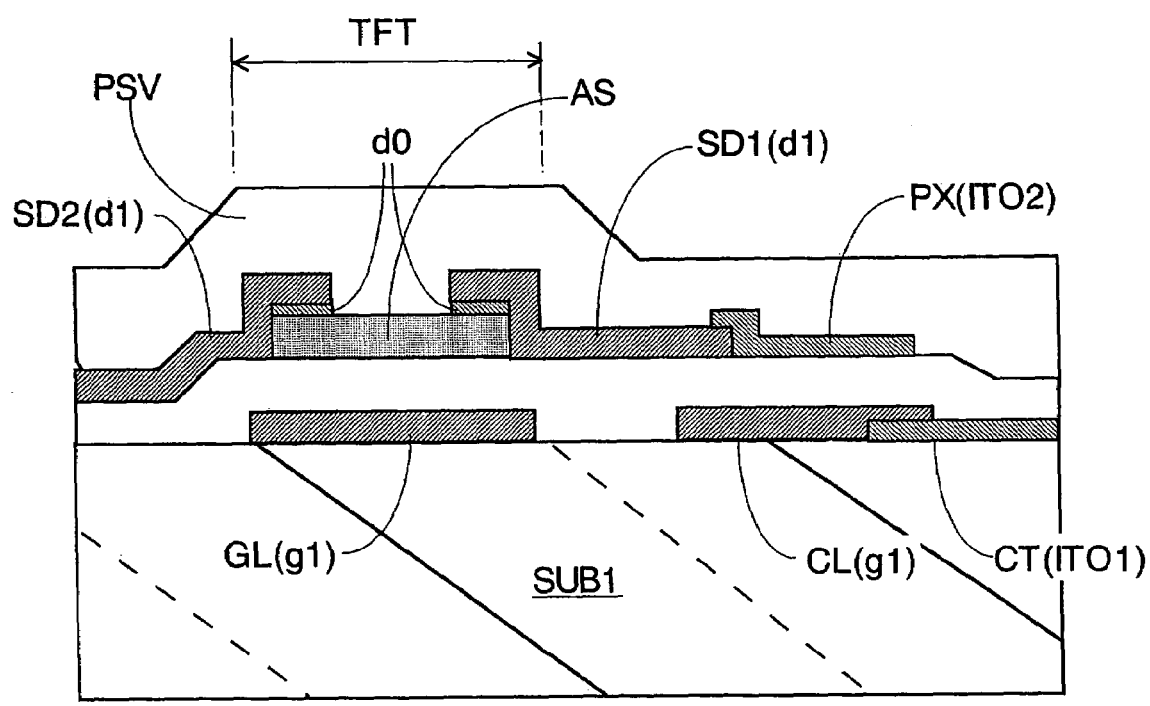
FIG. 25 is a cross-sectional view taken along a line 25—25 of FIG. 23.
Figure 26:
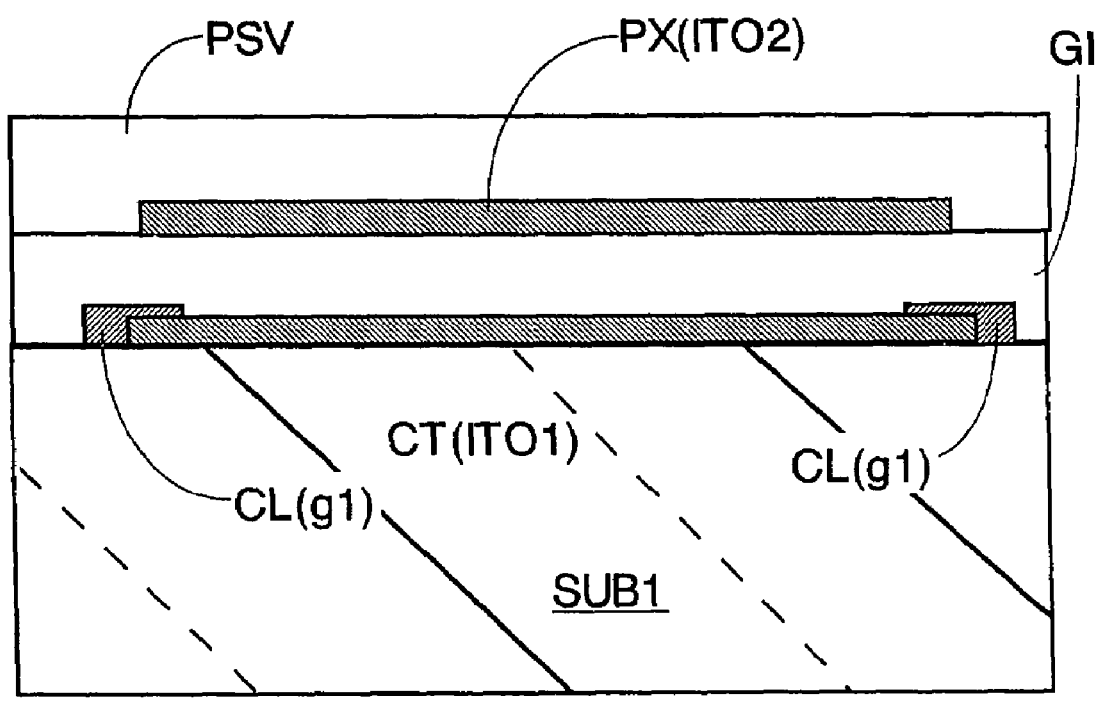
FIG. 26 is a cross-sectional view taken along a line 26—26 of FIG. 23.

FIG. 23 is a plan view showing another embodiment of a liquid crystal display device according to the present invention; and, FIG. 24, FIG. 25 and FIG. 26 are respectively a cross-sectional view taken along a line 24—24 of FIG. 23, a cross-sectional view taken along a line 25—25 of FIG. 23 and a cross-sectional view taken along a line 26—26 of FIG. 23.

FIG. 23 is a view which is similar to FIG. 1, wherein symbols which are the same as those used in FIG. 1 indicate the same parts.

The difference between the constitution of FIG. 23 and the constitution of FIG. 1 is that pixel electrodes PX are formed on an insulation film GI and counter electrodes CT are formed by way of the insulation film GI. That is, the liquid-crystal-side pixel electrodes PX are arranged by way of a protective film PVS (and an orientation film ORI1).

Due to such a constitution, lines of electric force in the liquid crystal LC are increased due to the voltage division effect derived from the protective film PVS, so that material having a low resistance can be selected as material of the liquid crystal LC, whereby it is possible to achieve an advantageous effect that the display with a small residual image can be obtained.

Further, due to such a constitution, as shown in FIG. 25, a source electrode SD1 of a thin film transistor TFT and the pixel electrode PX can be directly connected; and, hence, the cumbersomeness of connection through a contact hole formed in a protective film or the like, for example, can be resolved.

Embodiment 5

Figure 27:
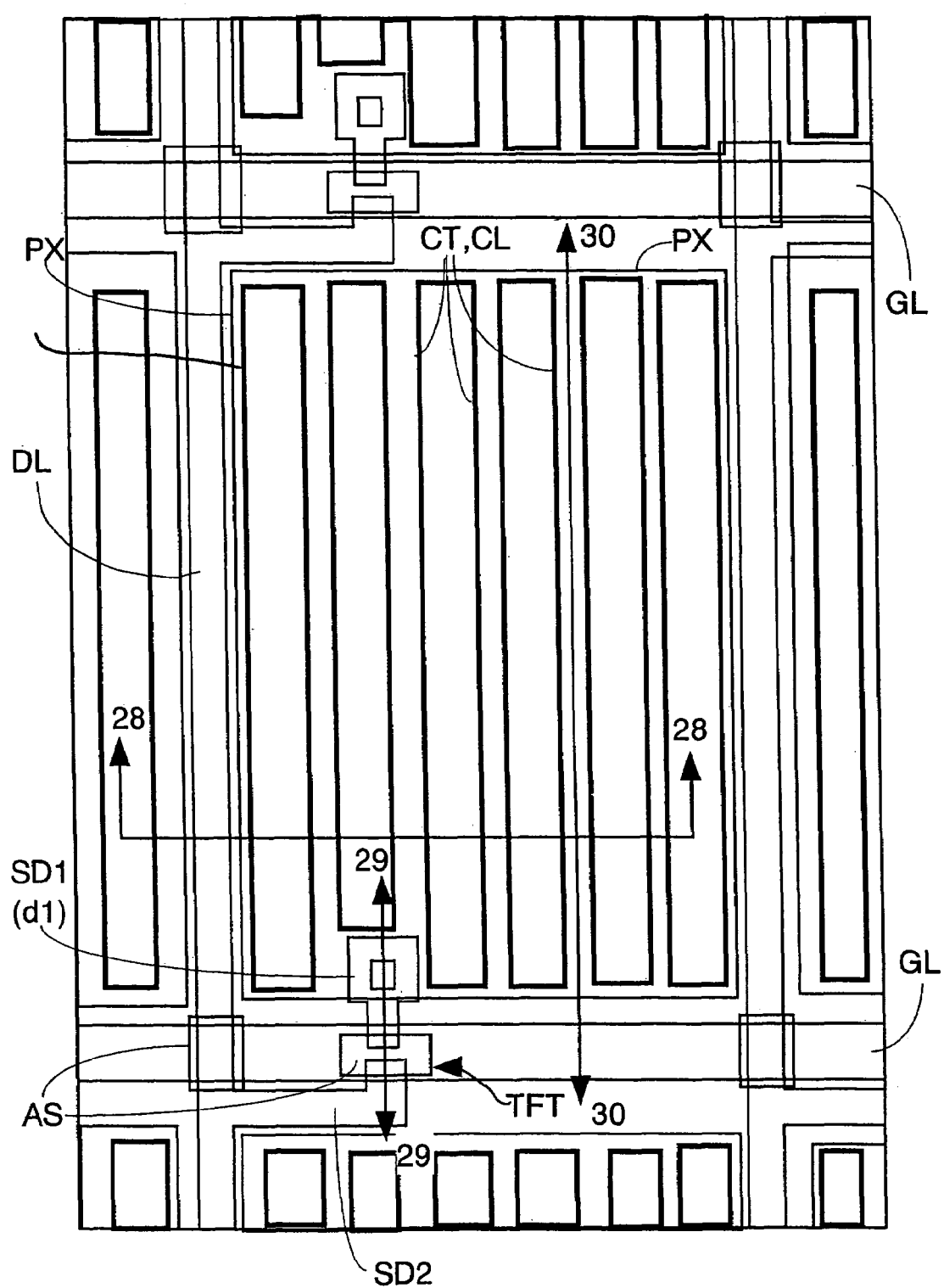
FIG. 27 is a plan view showing another embodiment of the pixel region of the liquid crystal display device according to the present invention.
Figure 28:
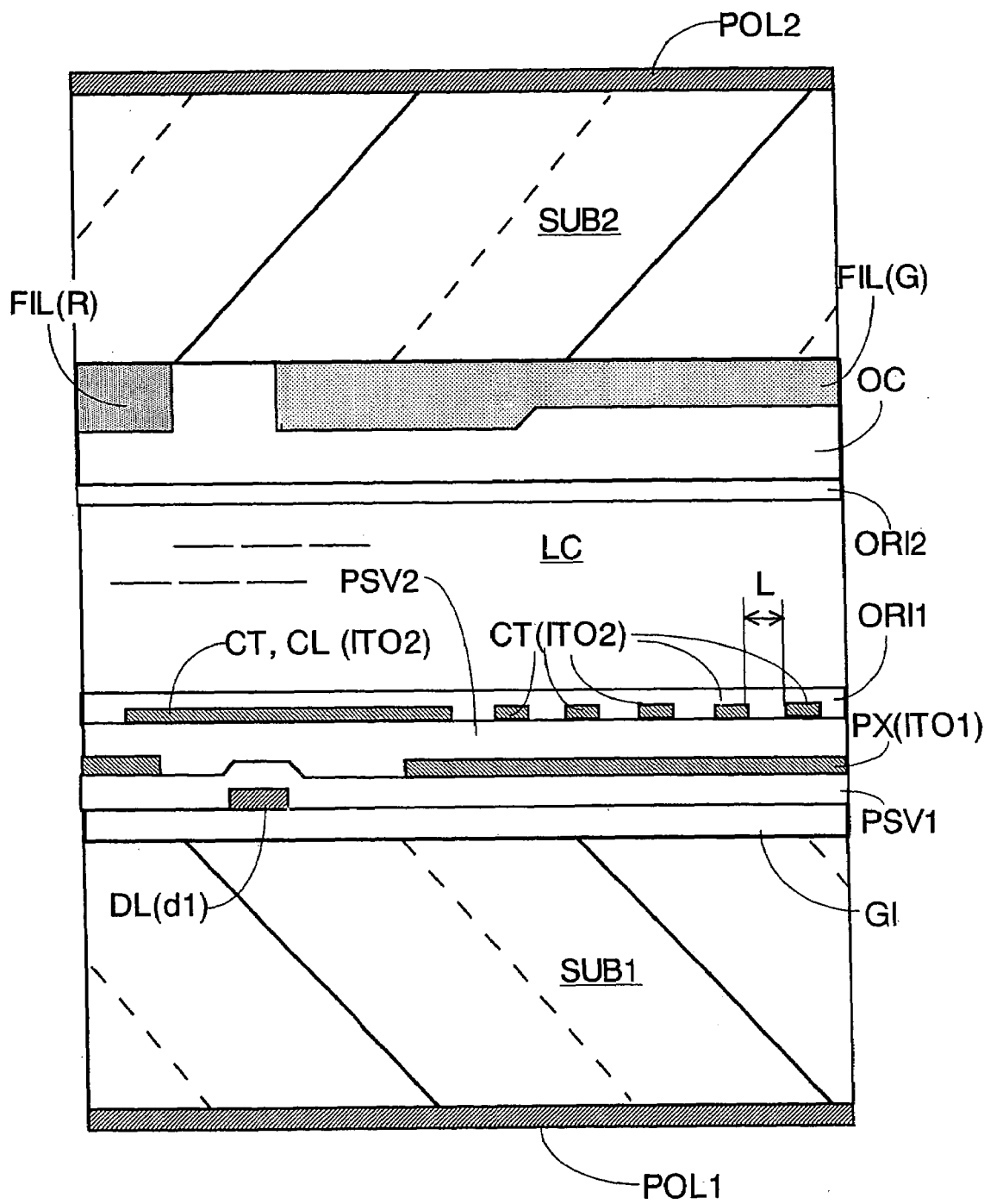
FIG. 28 is a cross-sectional view taken along a line 28—28 of FIG. 27.
Figure 29:
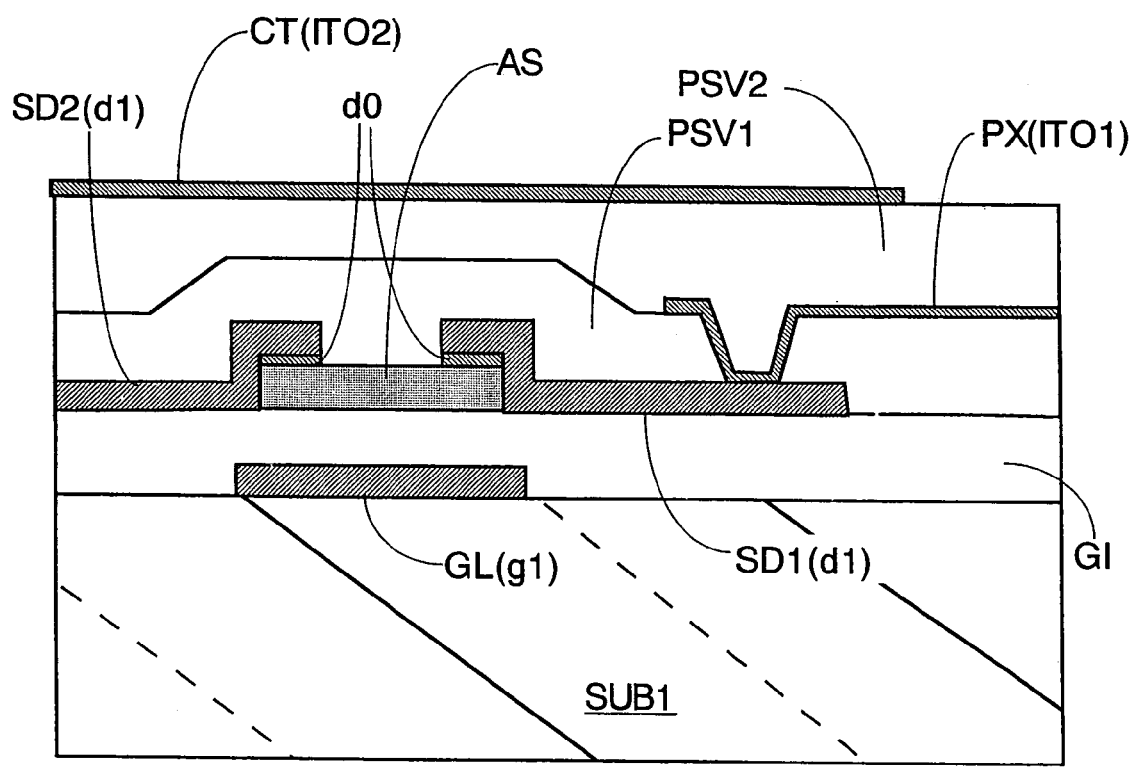
FIG. 29 is a cross-sectional view taken along a line 29—29 of FIG. 27.
Figure 30:
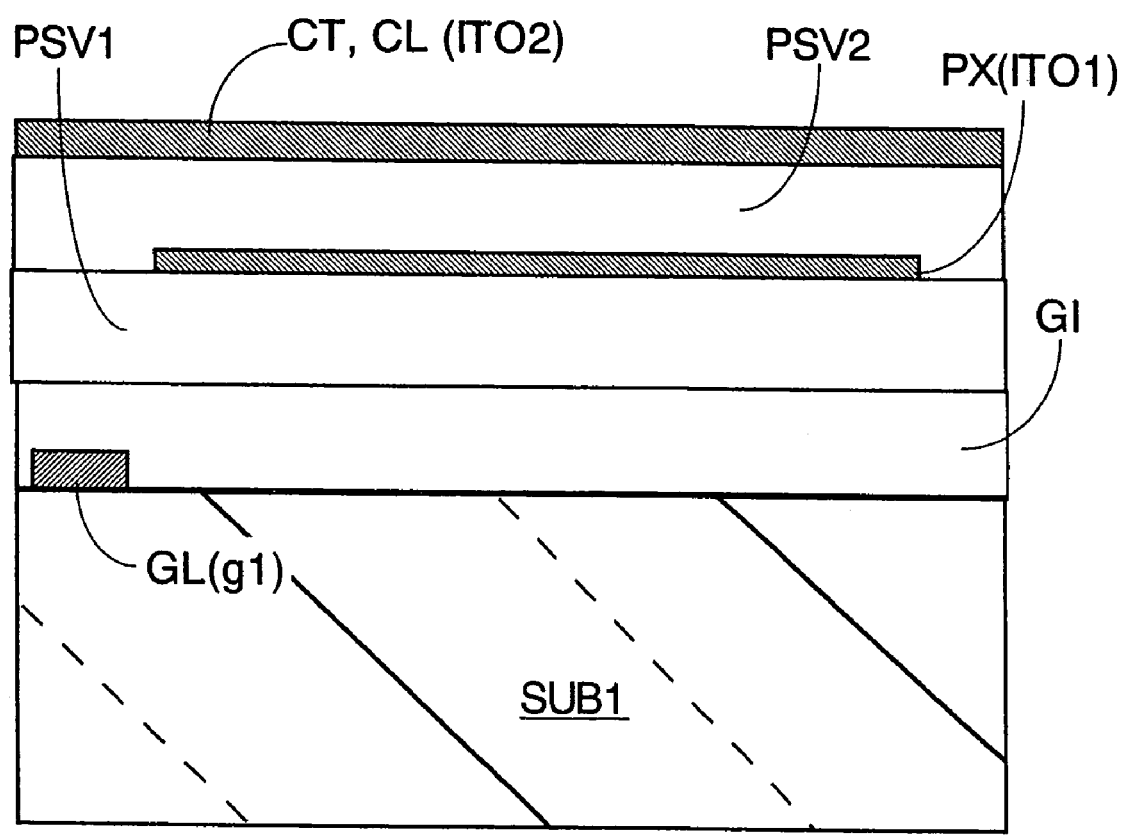
FIG. 30 is a cross-sectional view taken along a line 30—30 of FIG. 27.

FIG. 27 is a plan view showing another embodiment of a liquid crystal display device according to the present invention; and, FIG. 28, FIG. 29 and FIG. 30 are respectively a cross-sectional view taken along a line 28—28 of FIG. 27, a cross-sectional view taken along a line 29—29 of FIG. 27 and a cross-sectional view taken along a line 30—30 of FIG. 27.

FIG. 27 is similar to FIG. 1, wherein symbols which are the same as those used in FIG. 1 indicate the same parts.

FIG. 27 shows a constitution which differs from the constitution shown in FIG. 1 in that, first of all, pixel electrodes PX are positioned as lower layers and counter electrodes CT are positioned as upper layers by way of an insulation layer.

As shown in FIG. 28, a first protective film PSV1 is formed on an upper surface of an insulation film GI, and the pixel electrode PX is formed on the first protective film PSV1.

The pixel electrode PX is constituted of a transparent electrode which is formed on a major portion excluding a periphery of the pixel region, wherein the pixel electrode PX is connected with a source electrode SD2 of a thin film transistor TFT, which is formed as a layer below the first protective film PSV1 through a contact hole.

Then, a second protective film PSV2 is formed such that the second protective film PSV2 also covers the pixel electrode PX in such a manner, and the counter electrode CT is formed on an upper surface of the second protective film PSV2.

The counter electrodes CT is formed of a plurality of strip-like electrodes which extends in the y direction and are arranged in parallel in the x direction in the drawing in a region where the counter electrode CT is superposed on the pixel electrode PX. These electrodes are formed such that the electrodes have the respective ends thereof connected with conductive layers which are integrally formed with respective counter electrodes CT over other whole areas, excluding regions between respective counter electrodes CT.

In other words, the counter electrodes CT are formed such that, among the conductive layers (ITO) which are formed so as to cover at least a display region, a plurality of strip-like openings, which extend in the y direction and are arranged in the x direction in parallel in the drawing, are formed in the conductive layers in the inside of regions which are superposed on the pixel electrodes PX.

This implies that conductive layers, other than the conductive layers which function as the counter electrodes CT, can be utilized as the counter voltage signal lines CL. In this case, it is possible to obtain an advantageous effect in that the overall electric resistance of the conductive layers can be largely decreased.

Further, the conductive layers, other than the conductive layers which function as the counter electrodes CT, can be formed in a state where the conductive layers cover the gate signal lines GL and the drain signal lines DL. This implies that the conductive layers, other than the conductive layers which function as the counter electrodes CT, are given a function as a conventional black matrix layer.

An electric field (a lateral electric field) which has a component parallel to a transparent substrate for controlling the light transmissivity of liquid crystal can be generated between the conductive layer which functions as the counter electrode CT and the pixel electrode PX and cannot be generated at portions other than these portions.

Accordingly, as shown in FIG. 28, it is unnecessary to form the black matrix layer on the transparent substrate SUB2 side so that it is possible to obtain an advantageous effect that man-hours for fabrication can be decreased.

In this case, by adopting a so-called normally black liquid crystal which can generate a black display in a state in which an electric field is not applied to the liquid crystal, it is possible to strengthen the function of the conductive layer as a black matrix.

Further, it is inevitable that the gate signal lines GL or the drain signal lines DL generate capacitance between these signal lines and the above-mentioned conductive films. Accordingly, among the first protective film PSV1 and the second protective film PSV2, which are interposed between these signal lines and the conductive films, by constituting the second protective film PSV2, for example, using a resin film which can be formed by coating and by making such a resin film have a relatively large film thickness, the capacitance can be decreased. For example, when a SiN film having a relative dielectric constant of 7 and a film thickness of 100 to 900 nm is used as the first protective film PSV1, it is proper to use an organic film having a relative dielectric constant of 3 to 4 and a film thickness of 1000 to 3000 nm as the second protective film PSV2.

Further, when the relative dielectric constant of the second protective film PSV2 is set to be equal to or less than ½ of the relative dielectric constant of the first protective film PSV1, it has been confirmed that no defects appear in practical products irrespective of the film thickness. Still further, when the film thickness of the second protective film PSV2 is set to twice or more of the film thickness of the first protective film PSV1, it has been confirmed that no defects appear in practical products irrespective of the relative dielectric constant.

Embodiment 6

Figure 31:
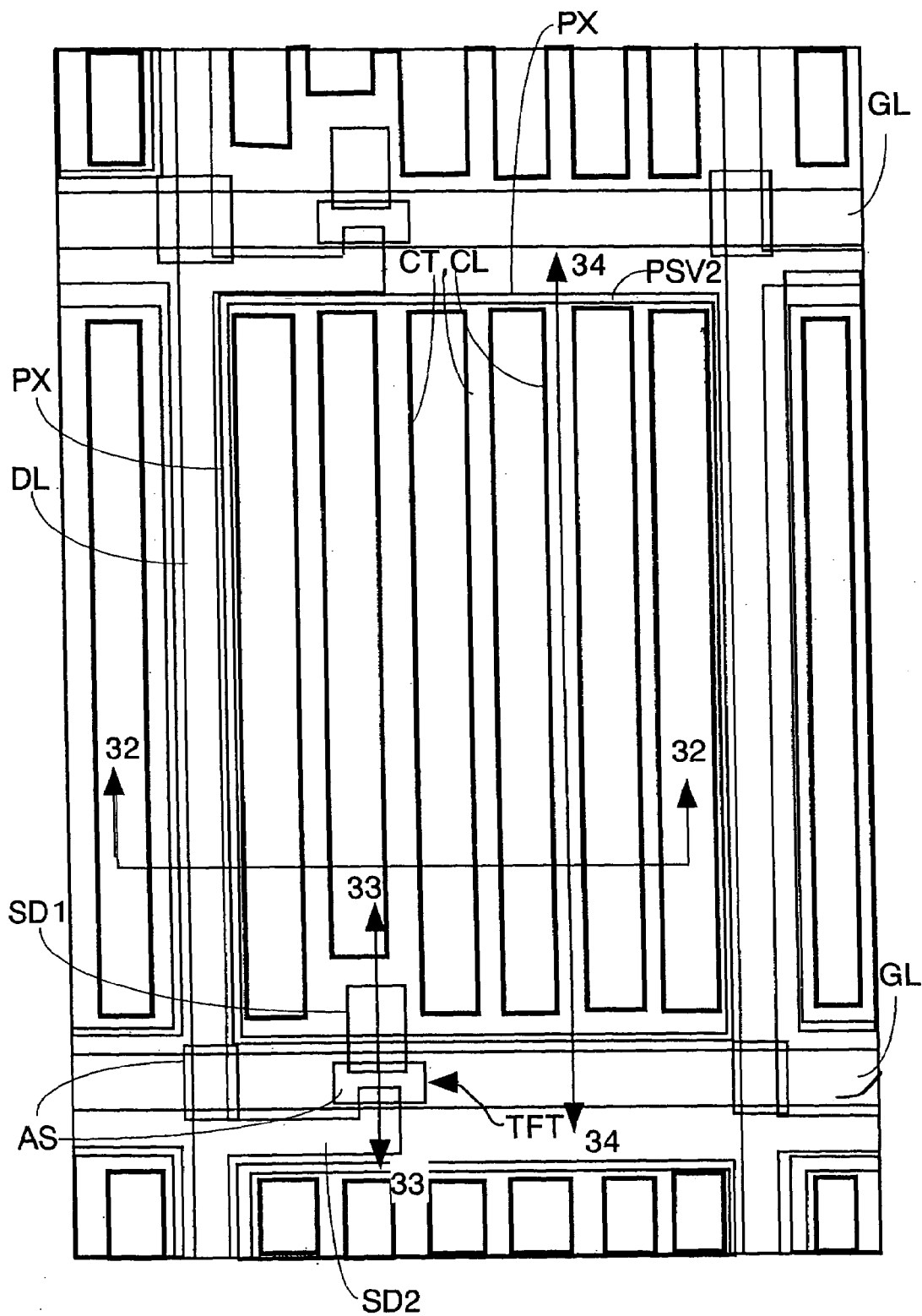
FIG. 31 is a plan view showing another embodiment of the pixel region of the liquid crystal display device according to the present invention.
Figure 32:
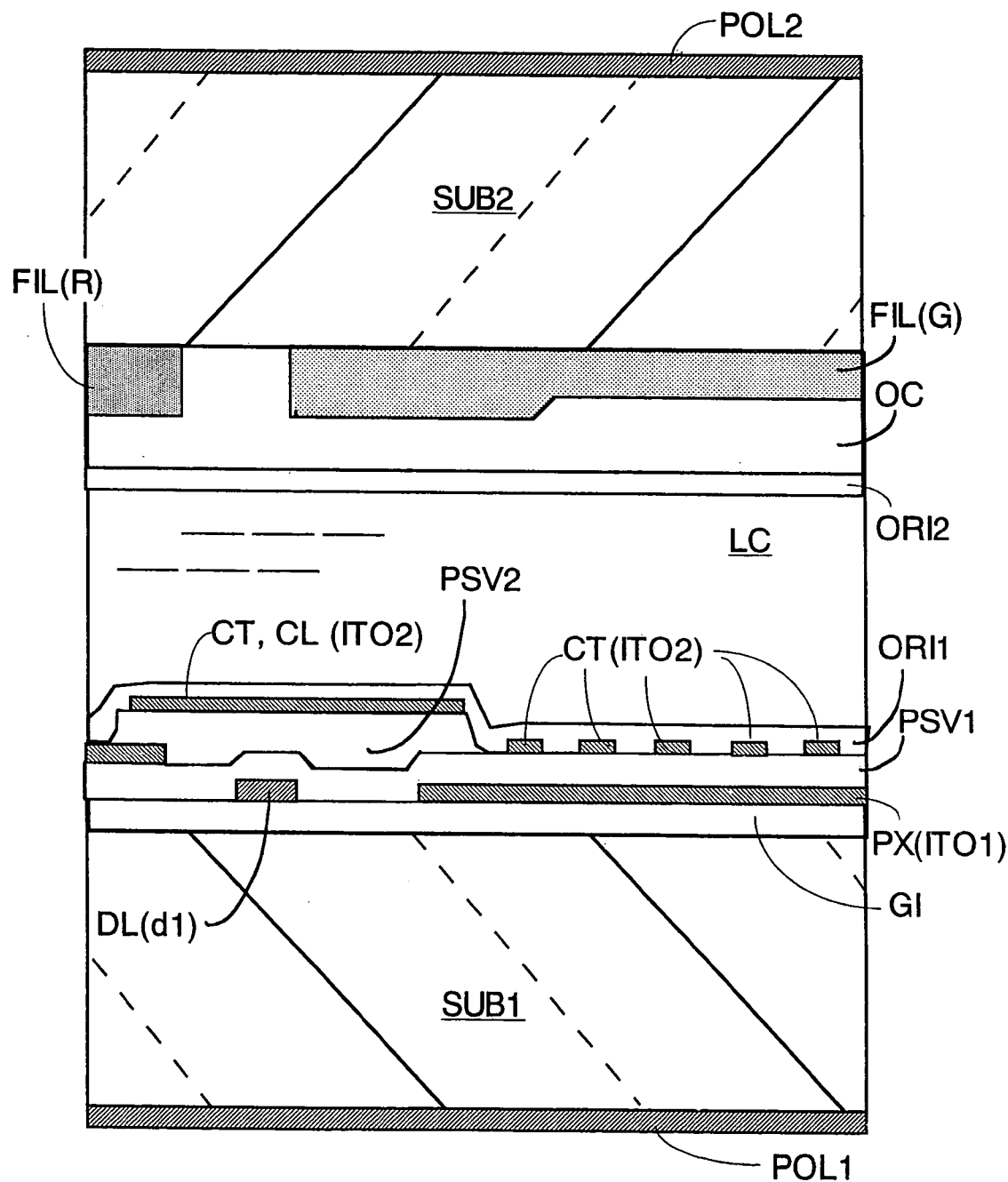
FIG. 32 is a cross-sectional view taken along a line 32—32 of FIG. 31.
Figure 33:
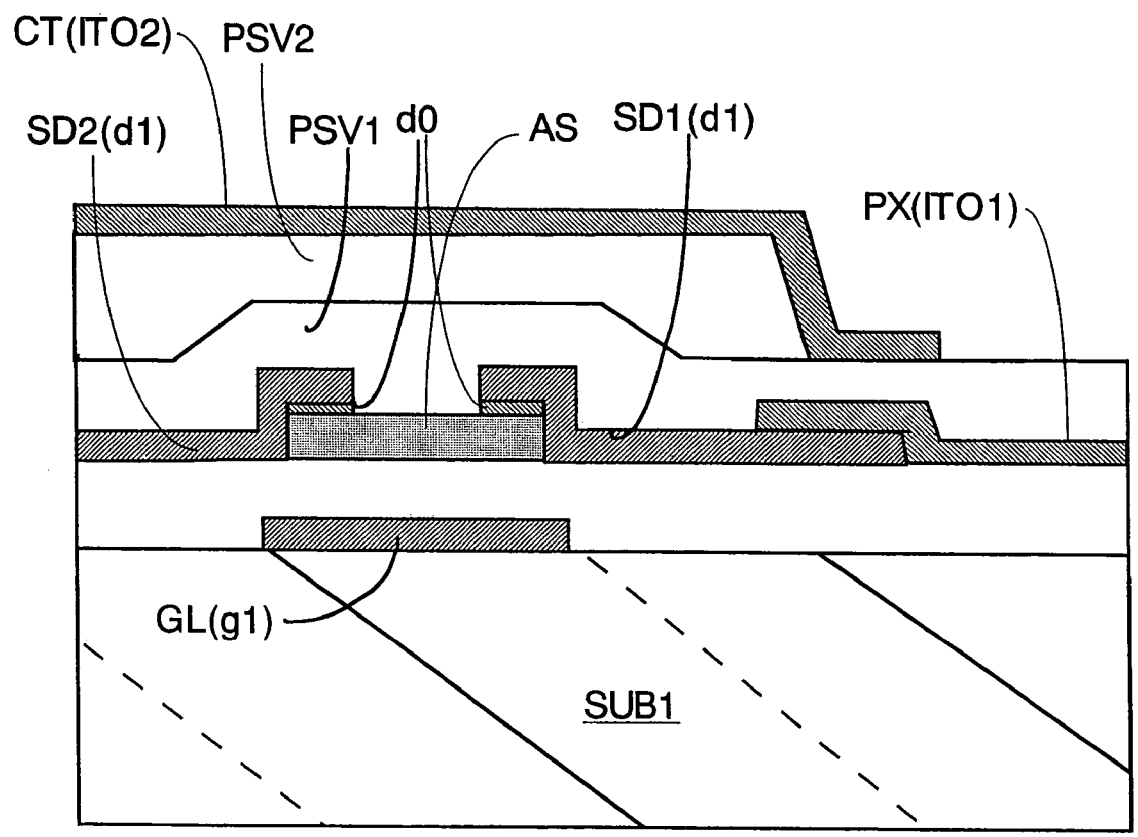
FIG. 33 is a cross-sectional view taken along a line 33—33 of FIG. 31.
Figure 34:
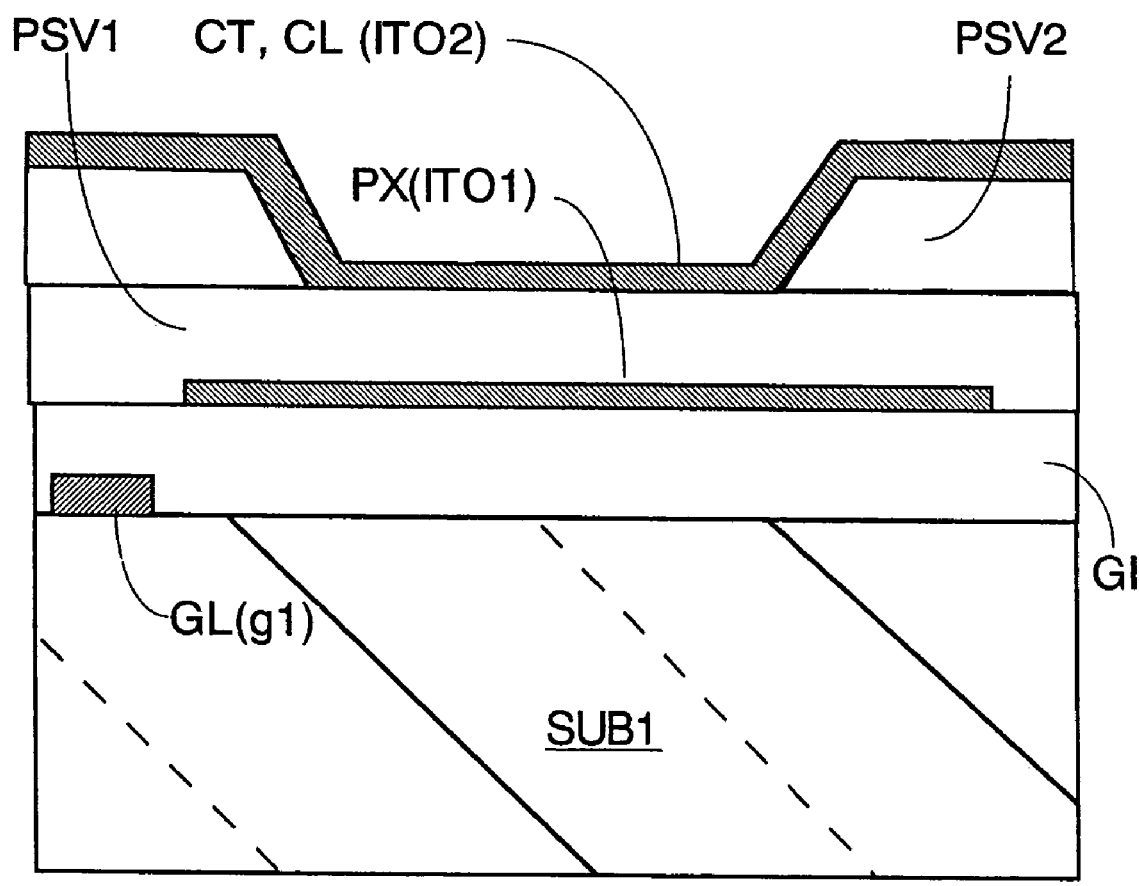
FIG. 34 is a cross-sectional view taken along a line 34—34 of FIG. 31.

FIG. 31 is a plan view showing another embodiment of a liquid crystal display device according to the present invention, and FIG. 32 is a cross-sectional view taken along a line 32—32 of FIG. 31.

FIG. 31 shows a further improved constitution compared to the constitution of the embodiment 5, and symbols which are the same as the symbols used in FIG. 27 to FIG. 30 indicate identical elements.

The constitution of the embodiment 6 differs from that of the embodiment 5 in that, first of all, pixel electrodes PX are formed on an insulation film GI and counter electrodes CT are formed on a first protective film PSV1, which is formed on the pixel electrodes PX. In other words, the pixel electrodes px and the counter electrodes CT are formed on different layers by way of the first protective film PSV1.

On the other hand, on other regions than the pixel regions, the second-protective film PSV2 is formed. The second protective film PSV2 is formed such that, for example, the second protective film PSV2 is formed over the whole area of at least the display region, and, thereafter, portions thereof which correspond to the pixel regions are selectively etched.

Further, on a surface of the remaining second protective film PSV2, a conductive layer is formed. This conductive layer is integrally formed with the counter electrodes CT. In the same manner as the fifth embodiment, the conductive film is formed on the whole area of at least the display region and, thereafter, in the conductive layer within regions which are superposed on the pixel electrodes PX, a plurality of strip-like openings which extend in the y direction and are arranged in parallel in the x direction are formed, thus forming the counter electrodes CT.

In the liquid crystal display device having such a constitution, it is possible to obtain the following advantageous effects. That is, by interposing the first protective film PSV1 and the second protective film PSV2 between the gate signal lines GL or the drain signal lines DL and the above-mentioned conductive layer, the capacitance which is generated between the signal lines and the conductive layer can be decreased, while by interposing only the first protective film PSV1 between the pixel electrodes PX and the counter electrodes CT, an electric field which is generated between them can be intensified at the liquid crystal LC side.

[Comparison of Characteristics of Respective Embodiments]

Figure 35:
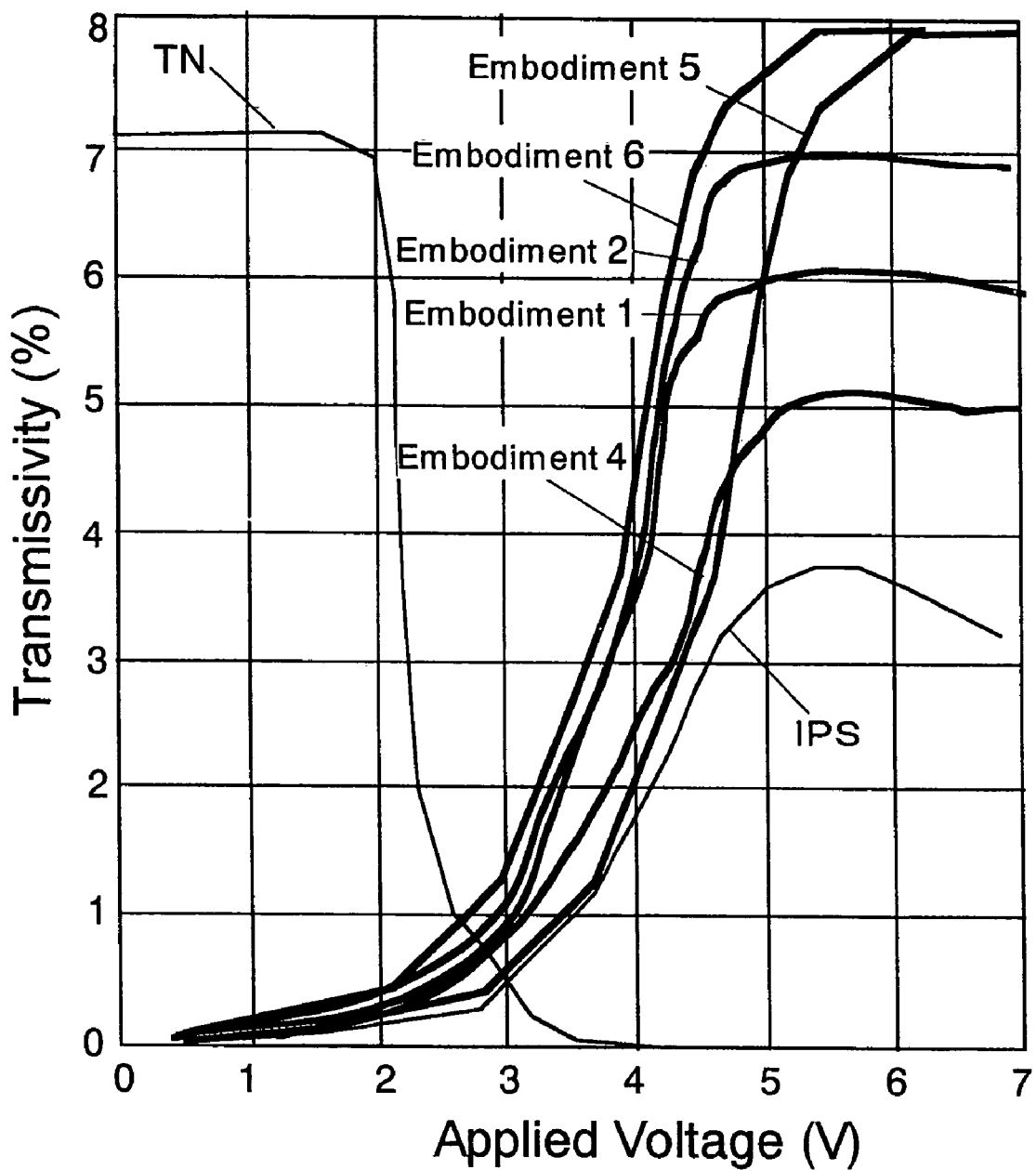
FIG. 35 is a graph showing the characteristics of applied voltage-transmissivity of the liquid crystal display devices of the above-mentioned respective embodiments.

FIG. 35 is a graph which shows characteristics of transmissivity relative to an applied voltage in respective constitutions of the above-mentioned embodiment 1, embodiment 2, embodiment 4, embodiment 5 and embodiment 6. Here, the liquid crystal display devices of respective embodiments are those which satisfy a so-called 15-type XGA Regulation, wherein the present invention is applied to devices whose width of gate signal lines GL is set to 10 μm and whose width of drain signal lines DL is set to 8 μm.

In FIG. 35, for comparison purposes, besides the characteristics of the above-mentioned embodiments, the characteristics of a TN-type TFT-LCD and an IPS-type TFT-LCD are also shown. From FIG. 35, it has been confirmed that the numerical aperture becomes 60% in the embodiment 1, the numerical aperture becomes 70% in the embodiment 2, the numerical aperture becomes 50% in the embodiment 4, and the numerical aperture becomes 80% in the embodiments 5 and 6.

The reason why the embodiments 5 and 6 exhibit particularly high numerical apertures is that these embodiments adopt the constitutions which make the black matrix, which has been conventionally used, unnecessary. Further, the reason why the embodiment 6 has a lower driving voltage compared to the embodiment 5 is that the embodiment 6 adopts the constitution in which the second protective film PSV2 is not formed in the pixel region.

The above-mentioned characteristics are those of elements which are prepared by using liquid crystal material having mainly negative dielectric anisotropy. On the other hand, when liquid crystal material having a positive dielectric anisotropy is used, although the maximum values of transmissivity of respective embodiments were decreased by 0.5% respectively, an advantageous effect is obtained in that a threshold value voltage is reduced by 0.5 V.

Embodiment 7

Figure 36:
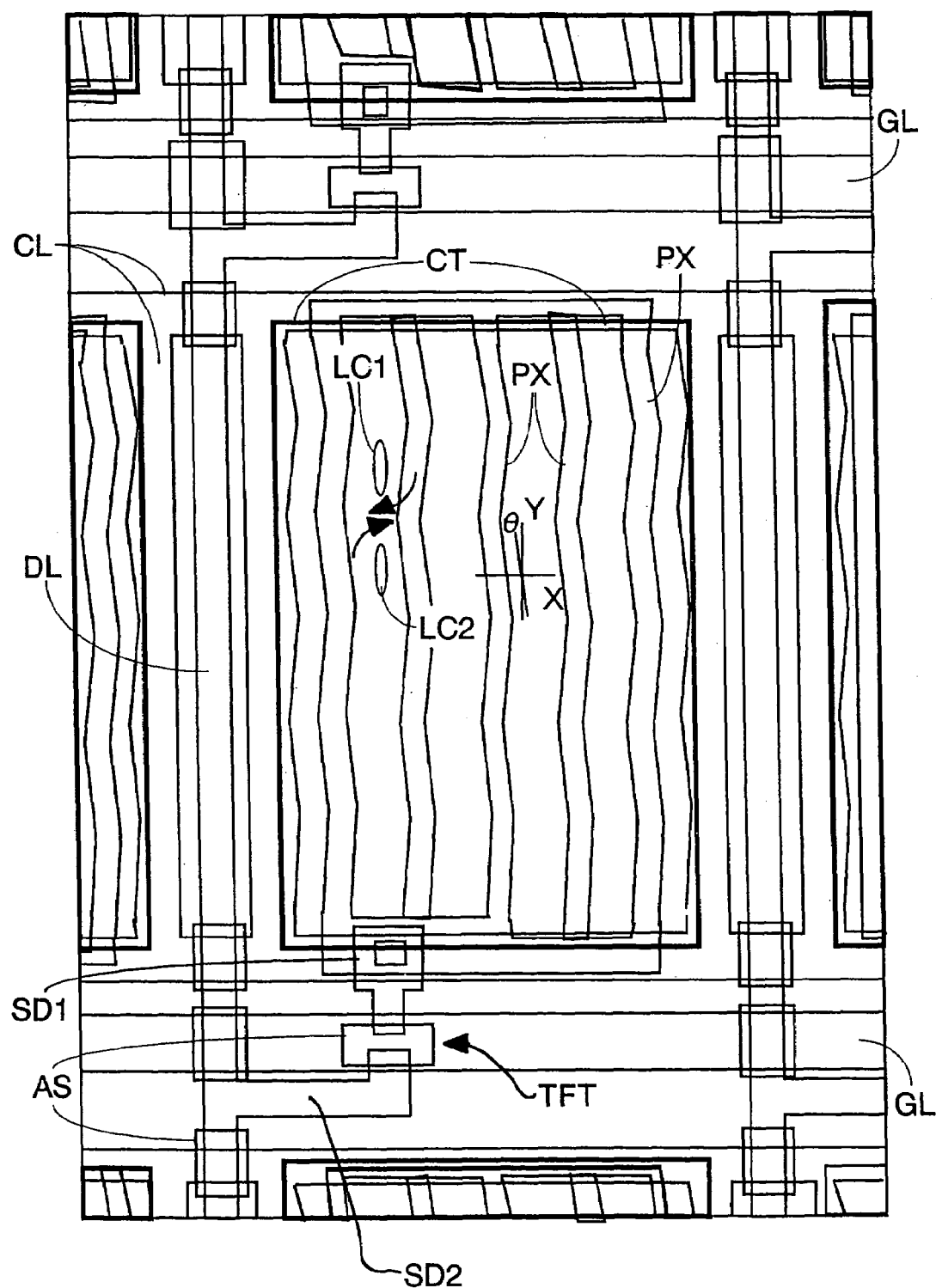
FIG. 36 is a plan view showing another embodiment of the pixel region of the liquid crystal display device according to the present invention.

FIG. 36 is a plan view showing another embodiment of the liquid crystal display device according to the present invention for a case in which the above-mentioned respective embodiments are applied to a so-called multi-domain system liquid crystal display device. Here, with respect to the multi-domain system, in an electric field (a lateral electric field) which is generated in the spreading direction of the liquid crystal, regions which differ in the direction of the lateral electric field are formed in the inside of each pixel region and by making the twisting direction of molecules of the liquid crystal in each region opposite to each other, an advantageous effect is obtained in that the coloring difference which is generated when the display region is viewed from the left and the right can be offset.

FIG. 36 constitutes a view which corresponds to FIG. 1, for example. In the drawing, respective strip-like pixel electrodes PX, which extend in one direction and are arranged in parallel in the direction which intersects said one direction, are extended while being inclined with respect to the above-mentioned one direction by an angle θ (appropriately 5–400 when the liquid crystal is P-type liquid crystal and the rubbing direction of the orientation film is aligned with the direction of the drain signal lines); and, thereafter, respective pixel electrodes PX are bent by an angle (−2θ) and are extended, and the above extensions are repeated, thus forming respective pixel electrodes PX in a zigzag shape.

In this case, by forming the counter electrode CT in a region of the pixel region excluding a periphery of the pixel region and by only arranging respective pixel electrodes PX having the above-mentioned constitution to be superposed on the counter electrode CT, it is possible to obtain the advantageous effect of the multi-domain system.

Particularly, it has been confirmed that the electric field which is generated between the counter electrode CT and the pixel electrode PX at bent portions of the pixel electrodes PX is generated exactly in the same manner between the counter electrodes CT and the pixel electrode PX at other portions of the pixel electrodes PX. Conventionally, a so-called disclination region, which defines a non-transmitting portion where the twisting directions of molecules of the liquid crystal become random, was generated.

Accordingly, it is possible to obtain an advantageous effect in that a drawback, whereby the light transmissivity is decreased in the vicinity of bent portions of the pixel electrodes PX, can be obviated.

Here, although the pixel electrodes PX are formed by extending them in the y direction, as shown in FIG. 36 in this embodiment, the pixel electrodes PX may be extended in the x direction in the drawing, and bent portions are provided to these pixel electrodes PX so as to obtain the advantageous effect of the multi-domain system. Further, in this embodiment, the advantageous effect of the multi-domain system is obtained by providing the bent portions to the pixel electrodes PX.

However, in the constitution wherein the pixel electrodes PX are formed at least on the whole area of the pixel region except for the periphery of the pixel region, and, as shown in FIG. 28, for example, the counter electrodes CT are extended in one direction and are arranged in parallel in the direction which intersects one direction, it is needless to say that bent portions are provided to the counter electrodes so as to obtain the advantageous effect of the multi-domain system.

Embodiment 8

Figure 37:
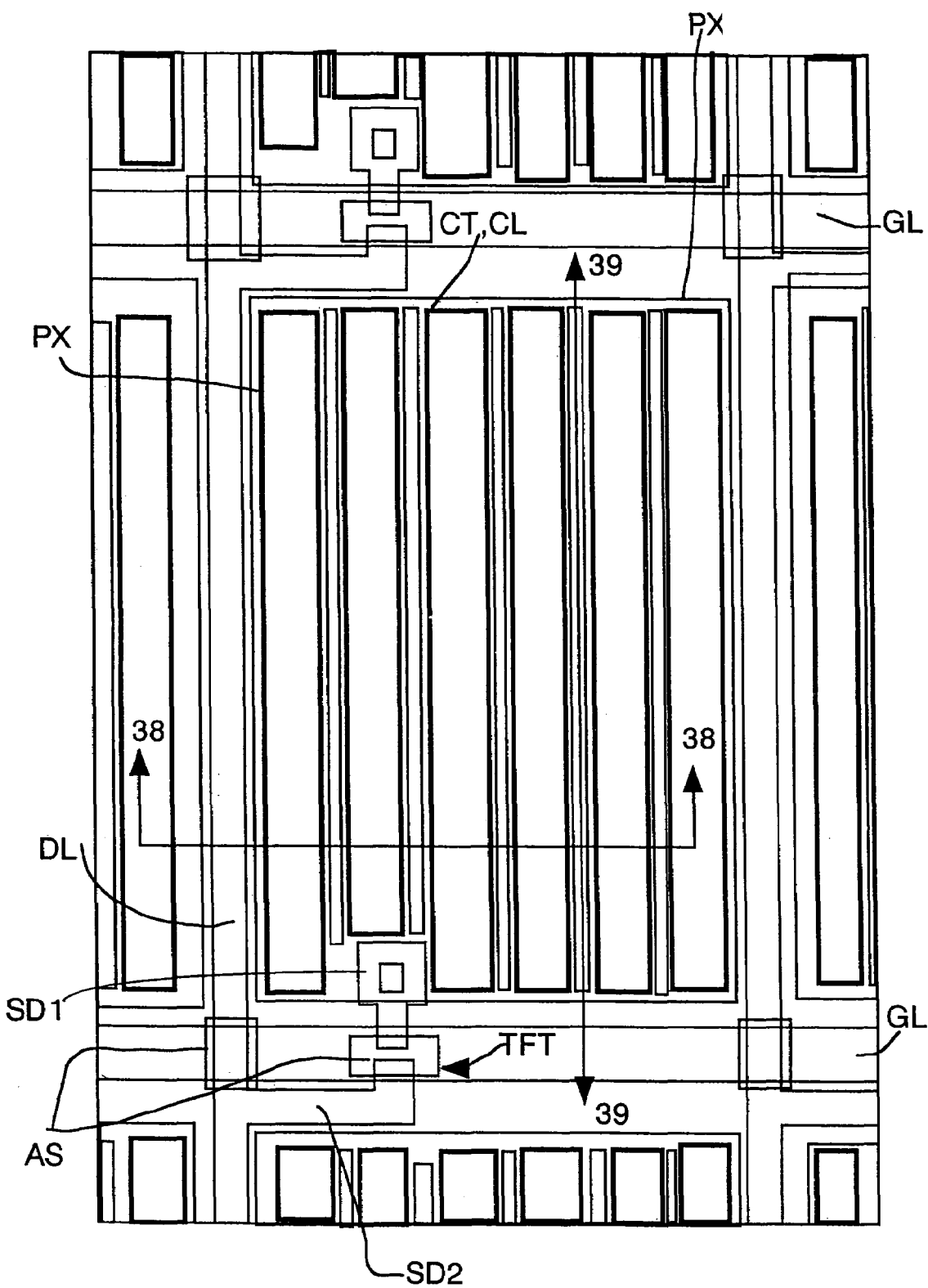
FIG. 37 is a plan view showing another embodiment of the pixel region of the liquid crystal display device according to the present invention.

FIG. 37 is a plan view showing another embodiment of the liquid crystal display device according to the present invention and constitutes a view which is similar to FIG. 27.

Figure 38:
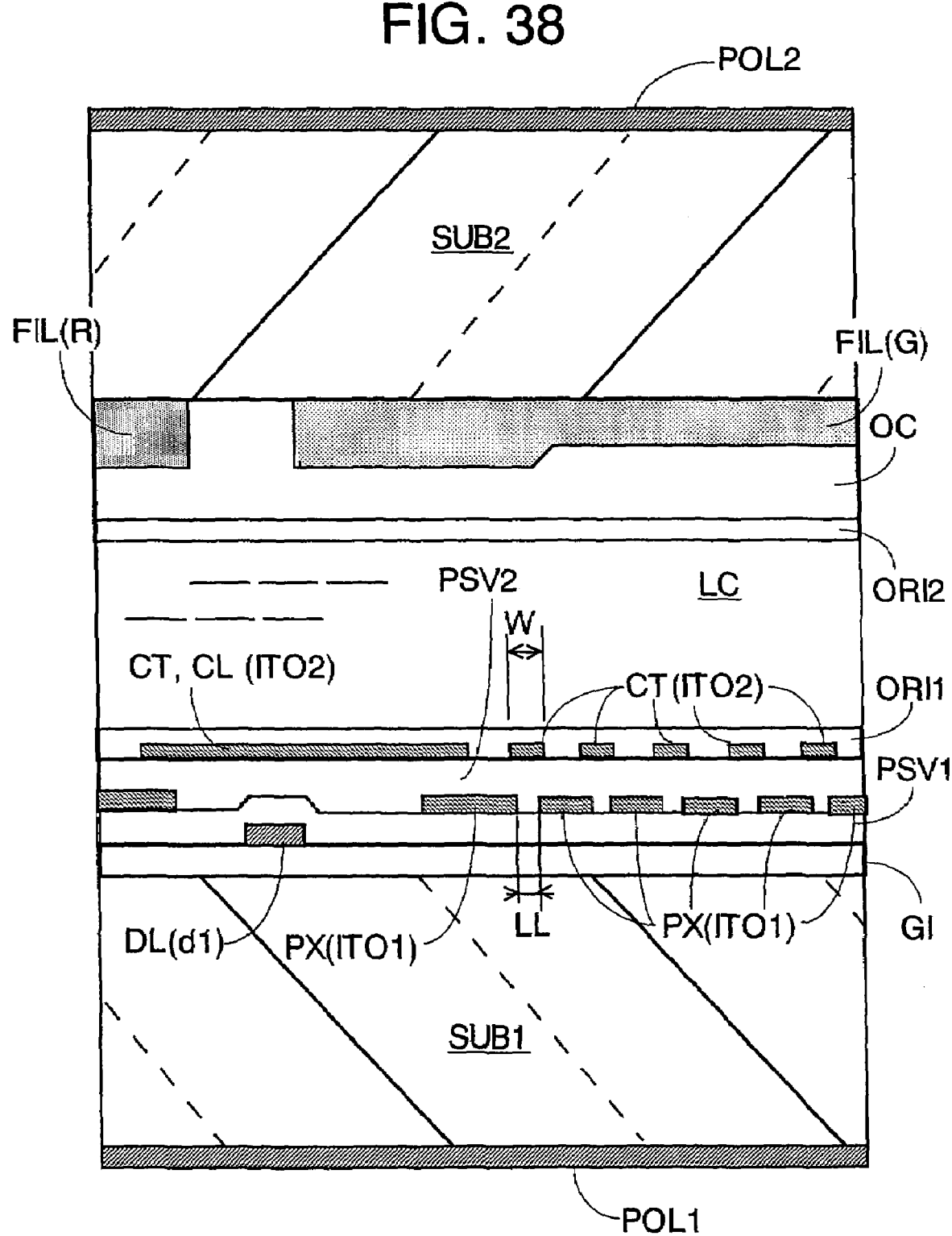
FIG. 38 is a cross-sectional view taken along a line 38—38 of FIG. 37.
Figure 39:
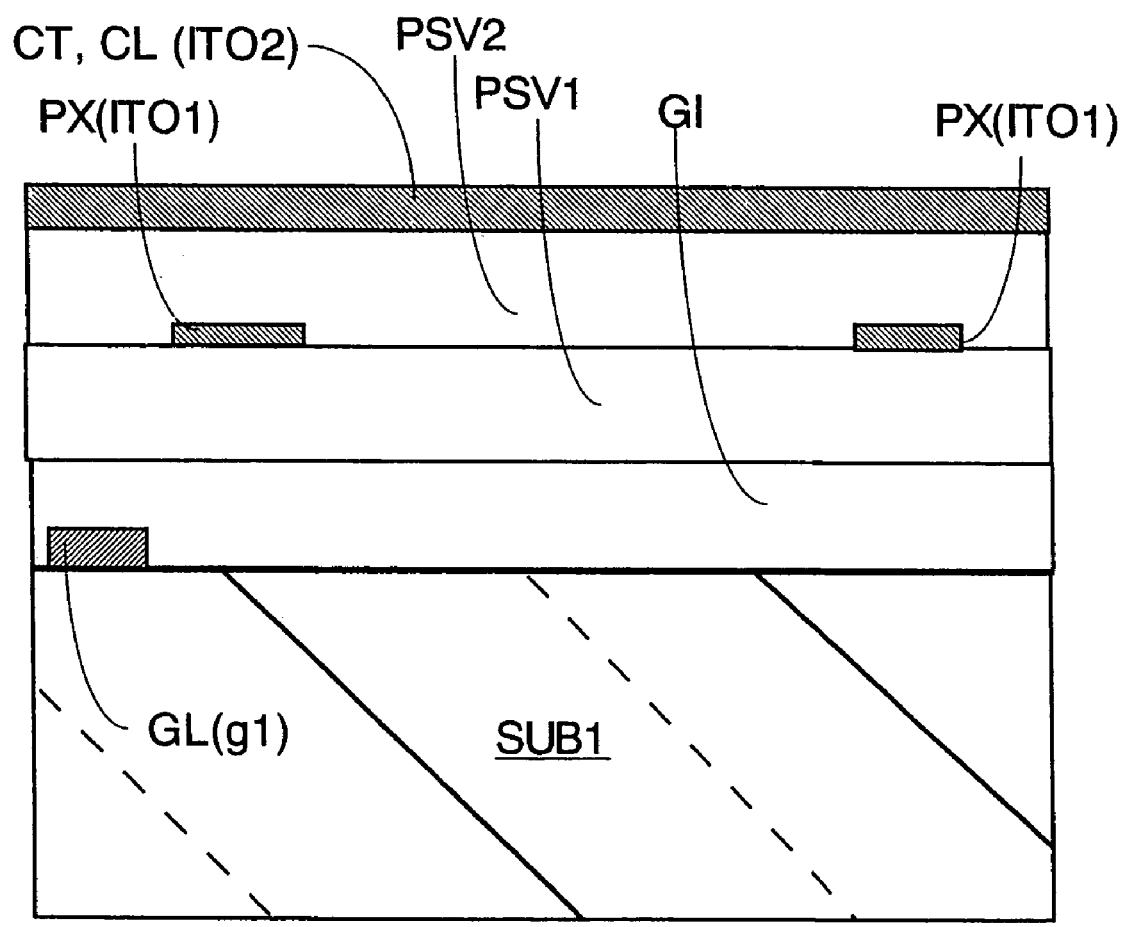
FIG. 39 is a cross-sectional view taken along a line 39—39 of FIG. 37.

Here, in FIG. 37, a cross-sectional view taken along a line 38—38 and a cross-sectional view taken along a line 39—39 are respectively shown as FIG. 38 and FIG. 39. Parts which are indicated by the same symbols as used in FIG. 27 are constituted of identical materials. The difference in constitution compared to FIG. 27 lies in the pixel electrodes PX.

The pixel electrode PX is constituted such that apertures are formed in portions which are superposed on the counter electrode CT while excluding a peripheral portion thereof. Accordingly, the center axes of the counter electrodes CT extending in one direction are substantially aligned with the center axes of the openings of the above-mentioned pixel electrode PX, wherein, assuming the width of the counter electrode CT is W, the width of the opening is set to LL, which is smaller than the width W.

In such a constitution, the distribution of the electric field which is generated between the pixel electrode PX and the counter electrodes CT can be generated exactly in the same manner as that of FIG. 27.

Accordingly, it is possible to obtain an advantageous effect in that, by forming the openings, the capacitance between the pixel electrode PX and the counter electrodes CT can be decreased by an amount corresponding to the openings.

As mentioned above, although the capacitance between the pixel electrode PX and the counter electrodes CT is necessary to some extent to store video signals supplied to the pixel electrode PX for a relatively long time, when the capacitance is excessively increased, the brightness irregularities of display derived from the delay of signals is generated. Accordingly, by giving the above-mentioned openings a suitable size, the capacitance can be set to an optimum value.

Here, in setting the value of capacitance generated between the pixel electrode PX and the counter electrodes CT due to the openings formed in the pixel electrode PX, there may be a case where a given capacitance value cannot be obtained due to the displacement of the counter electrodes CT relative to the pixel electrode PX.

In this case, as shown in FIGS. 42A and 42B, for example, a pair of side portions of the opening of the pixel electrode PX (in the drawing, the sides which are parallel in the y direction in the drawing being adopted in view of the remarkable appearance of the drawback caused by the displacement) are formed in a zigzag shape, for example, so that an opening having crest portions (projecting portions) and valley portions (recessed portions) at respective sides is formed.

When the pixel electrode PX and the counter electrode CT are arranged without the displacement as shown in FIG. 42A, the value of the capacitance is determined by an area on which they are superposed. Then, even when the counter electrode CT is displaced in the x direction with respect to the pixel electrode PX as shown in FIG. 42B, such a superposed area is not changed, so that the value of capacitance is not changed. This is because the relationship is established such that, when the crest portions of one side are retracted, the crest portions of the other side are projected.

It should be apparent that the pattern of the opening is not limited to the above-mentioned pattern. For example, with respect to the displacement of one electrode, projecting portions which are projected towards the electrode side are formed on one of the sides of the opening which intersect the direction of displacement and projecting portions which are retracted with respect to the electrode are formed on the other side of the opening.

Such a constitution does not assume the constitution of FIG. 27, as a premise thereof, and is applicable to all of the above-mentioned respective embodiments. For example, in the constitution where the counter electrodes CT are formed on the whole area of the pixel region, except for the periphery of the pixel region, the openings may be formed in portions of the counter electrode CT which are superposed on the pixel electrode PX, except for the periphery of the counter electrode CT. Further, although the openings of one electrode have the periphery thereof superposed on the other electrode, it is needless to say that the openings are not always interposed on the other electrode.

Embodiment 9

Figure 40:
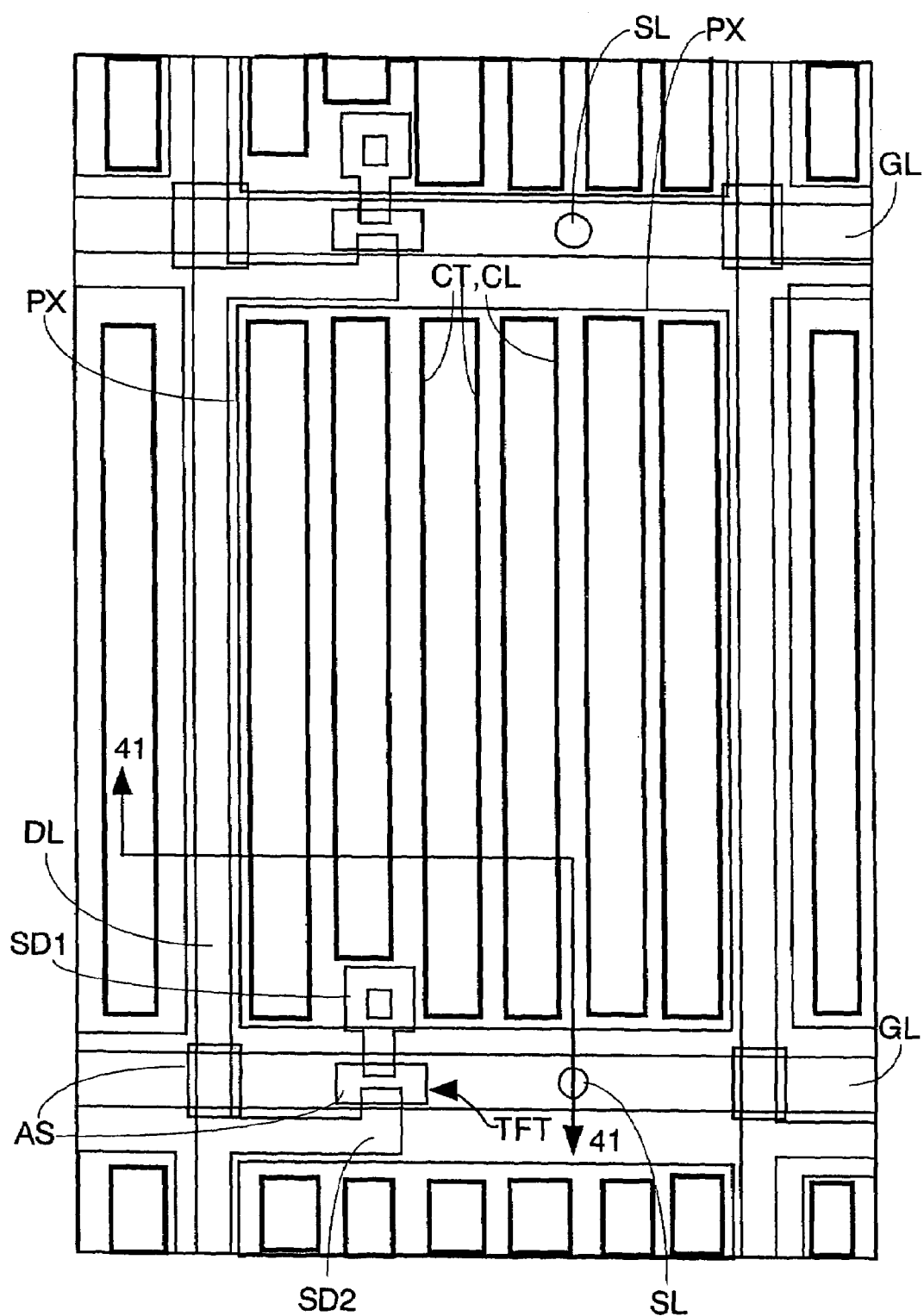
FIG. 40 is a plan view showing another embodiment of the pixel region of the liquid crystal display device according to the present invention.
Figure 41:
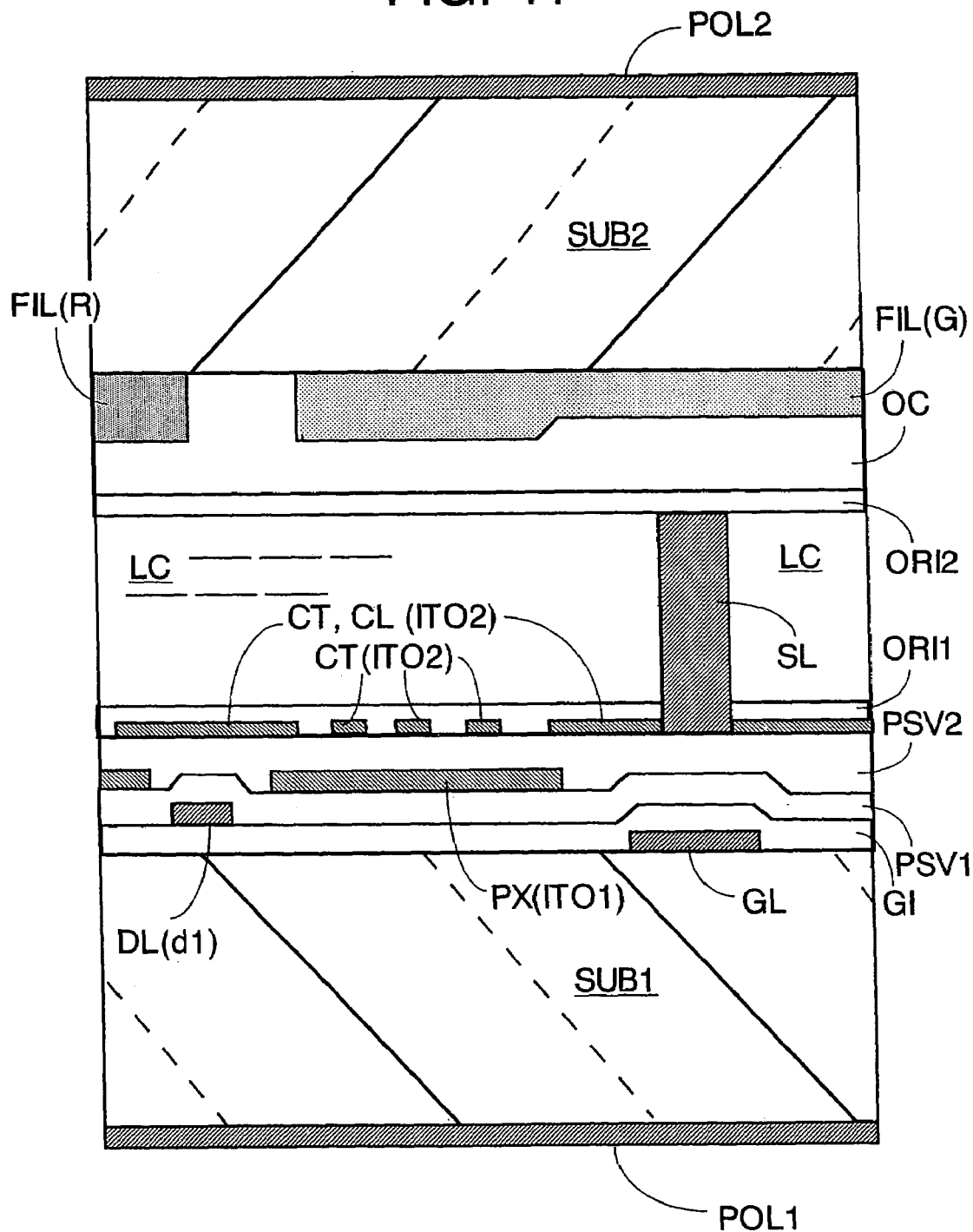
FIG. 41 is a cross-sectional view taken along a line 41—41 of FIG. 40.

FIG. 40 is a plan view showing another embodiment of the liquid crystal display device according to the present invention, and a cross-sectional view taken along a line 41—41 is shown as FIG. 41.

FIG. 40 and FIG. 41 are views which illustrate an improvement of the embodiment 5 (FIG. 27–FIG. 30), wherein a characterizing point is that a second protective film PSV2, which is constituted of a synthetic resin film, for example, serves as a spacer.

Here, the spacer consists of elements which support the other transparent substrate with respect to one transparent substrate side while maintaining an accurate gap and are required to make a layer thickness of liquid crystal uniform over the whole area of a display region.

In this embodiment, in regions are formed so as to be superposed on portions of gate signal lines GL, for example, regions where the spacers are formed, and the spacers are constituted as projecting portions which are integrally formed with the second protective film PSV2.

By setting the locations where the spacers are formed at the same places in respective pixel regions, it is possible to make the layer thickness of the liquid crystal uniform over the whole area of the display region. This is because the spacers are provided at the same places, the laminar structures of these portions become the same structure.

The spacers are formed such that, at the time of forming the second protective film PSV2, for example, first of all, a photosensitive synthetic resin film is formed with a film thickness which adds a height of the spacers, and, thereafter, light is selectively irradiated such that strong light is irradiated to the spacer forming regions and weak light is irradiated to the regions, other than the spacer forming regions and then a developing step is performed.

With respect to respective spacers formed in this manner, the spacers having the same height can be obtained with high accuracy so that it is possible to maintain the gap between respective transparent substrates uniform over the whole area of the display region.

Although it is necessary to form the counter electrodes after the spacers are formed in this embodiment, even when material of the counter electrodes remains on top surfaces of the spacers, since the electrodes are not arranged at the so-called filter substrate side, no drawback is derived from the constitution.

Further, although this embodiment is characterized as an improvement of the embodiment 5, it is needless to say that the present invention is not limited to this embodiment.

This is because, when it is necessary to form a synthetic resin film as a layer which is disposed close to the liquid crystal, it is possible to obtain an advantageous effect in that the spacers can be formed integrally with the synthetic resin film. Even when it is unnecessary to form such a synthetic resin film, the formation of spacers which are fixed to either one of the transparent substrates can make the gap between respective transparent substrates uniform with high accuracy.

Embodiment 10

Figure 43:
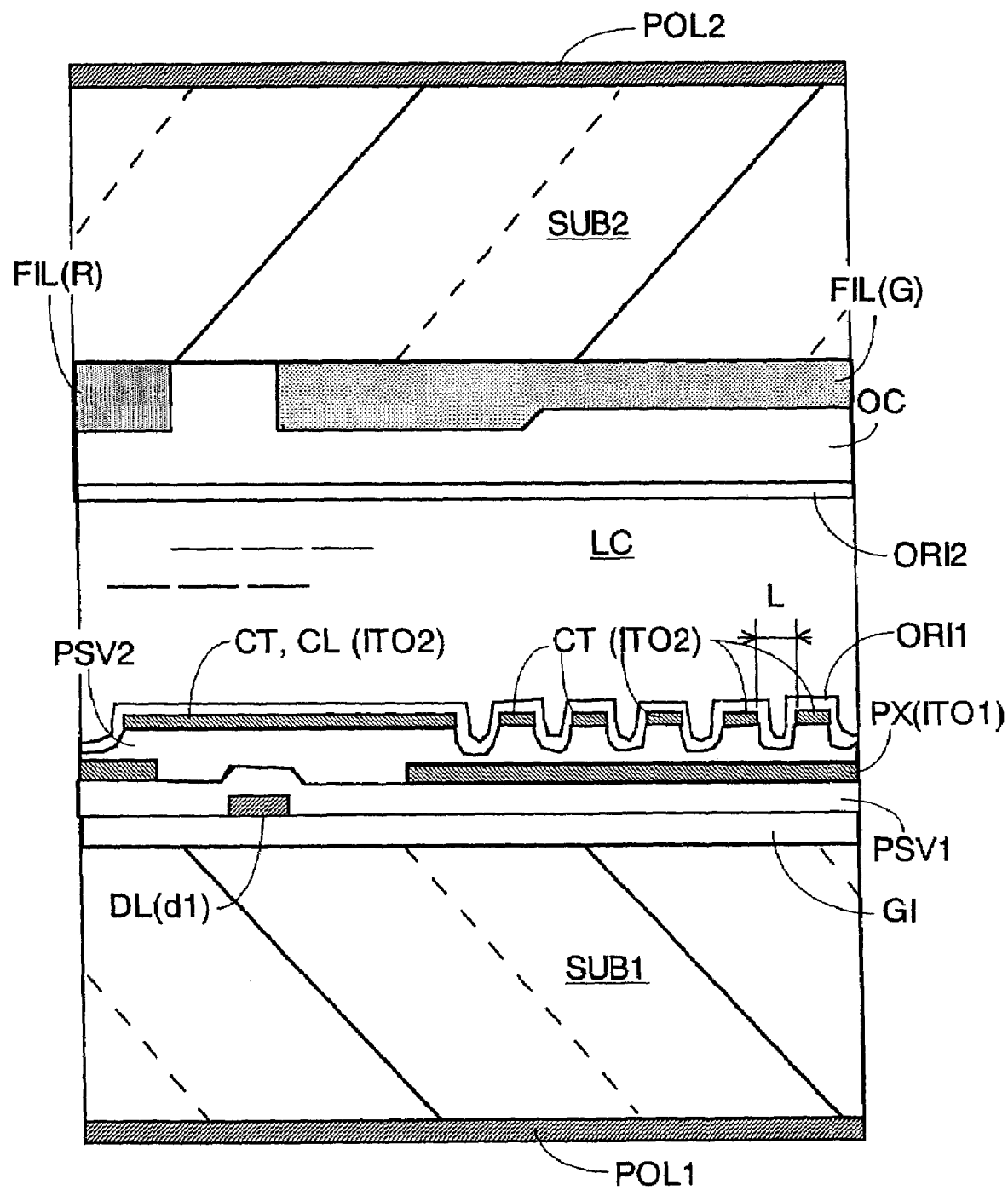
FIG. 43 is a cross-sectional view showing another embodiment of the pixel region of the liquid crystal display device according to the present invention.

FIG. 43 is a cross-sectional view showing another embodiment of the liquid crystal display device according to the present invention. FIG. 43 shows a further improved constitution compared to the embodiment 5 and is another cross-sectional view taken along a line 28—28 of FIG. 27.

A planer view which shows a pixel region adopts the same constitution as FIG. 27 of the embodiment 5.

The difference in constitution compared to the embodiment 1 lies in that, first of all, a protective insulation film PSV2, which is disposed below counter electrodes CT and separates pixel electrodes PX in an insulating manner, is machined such that they are dug using counter electrodes CT or counter voltage signal wirings CL as masks. Due to such a machining, the insulation film PSV2 disposed between a drain signal line DL and the counter voltage signal line CL can be made thick and, in the same manner, the insulation film on an area where the counter electrode CT and the pixel electrode PX are directly superposed can be formed with a thick film thickness, while the insulation film PSV2 at a distance portion between the counter electrodes CT is formed with a thin film thickness.

As an advantageous effect of the above-mentioned machining, the insulation film which is formed with a thick film thickness provides a reduced capacitance as a load of the thin film transistor TFT or the load capacitance of the drain signal line DL can be reduced.

On the other hand, the insulation film PSV2 formed with a thin film thickness results in a decrease in the voltage drop derived from the insulation film between the pixel electrode PX and the counter electrode CT, so that it is possible to supply a sufficient voltage to the liquid crystal and a threshold voltage of the liquid crystal can be reduced.

Further, the machining of the insulation film PSV2 is performed using the counter electrodes CT as masks, and hence, the insulation film PSV2 is machined in a self-aligned manner with the counter electrode CT so that the display irregularities are hardly generated at all.

As can be clearly understood from the explanation with reference to the embodiments 1 to 10, according to the features of the present invention, a liquid crystal display device of extremely high performance can be obtained.

Embodiment 11

Figure 44:
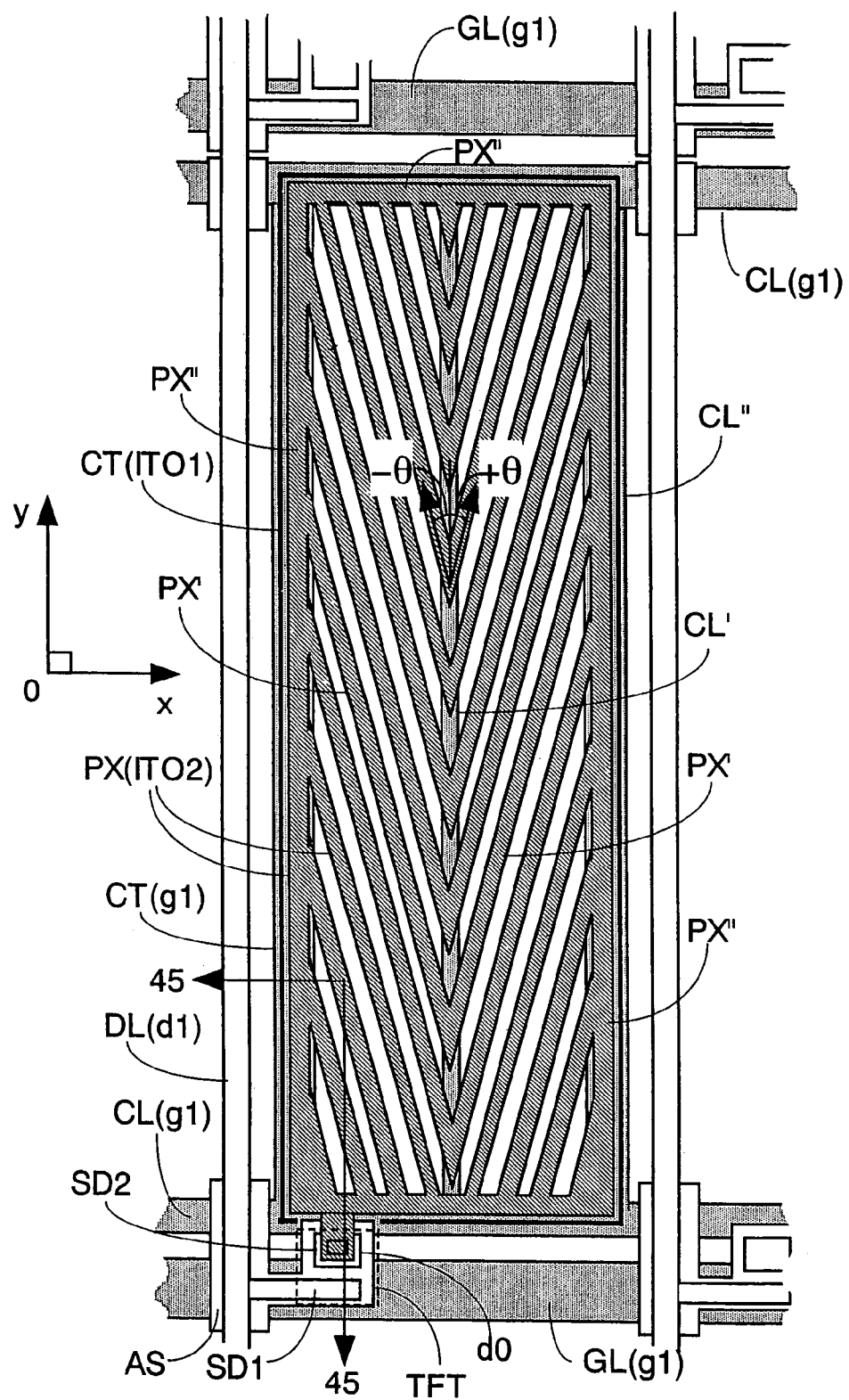
FIG. 44 is a plan view showing another embodiment of the pixel region of the liquid crystal display device according to the present invention.
Figure 45:
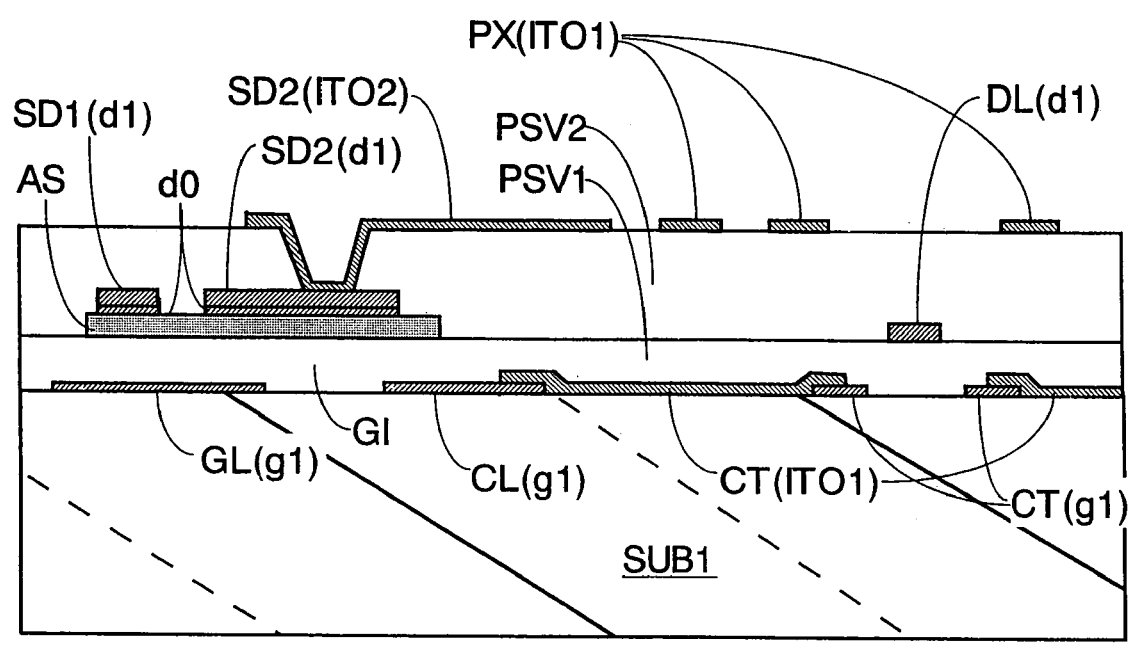
FIG. 45 is a cross-sectional view taken along a line 45—45 of FIG. 44.

FIG. 44 is a plan view of a pixel region of another embodiment of the liquid crystal display device according to the present invention as seen by viewing one transparent substrate of a pair of transparent substrates which are arranged to face each other from the liquid crystal side by interposing liquid crystal between them. Further, FIG. 45 is a view showing a cross section taken along a line 45—45 of FIG. 44.

First of all, in FIG. 44, gate signal lines GL, which extend in the x direction and are arranged in parallel in the y direction in the drawing, are formed on the transparent substrate SUB1 using chromium (Cr), for example. The gate signal lines GL form rectangular regions together with drain signal lines DL, which will be explained later, and these regions constitute pixel regions.

In the pixel region, along with the gate signal line GL, a counter voltage signal line CL is formed, such that the connection of the counter voltage signal line CL with the gate signal line GL and the superposition of the counter voltage signal line CL on the gate signal line GL and the drain signal line DL (formed in a later step) are avoided. Since the counter voltage signal line CL can be formed of the same material as that of the gate signal line GL, the counter voltage signal line CL is formed by the same step used for forming the gate signal line GL. As shown in FIG. 44, the counter voltage signal line CL is constituted of a strip-like conductive layer CL' which runs in the y direction in the drawing at the center of the pixel region and a frame-like conductive layer CL" which is connected with the conductive layer and is formed along the periphery of the pixel region. Such a counter voltage signal line CL is connected with the counter voltage signal lines CL in left and right pixel regions which interpose this pixel region through the counter voltage signal lines CL, which extend in the x direction. Although the counter voltage signal line CL functions as a signal line which supplies counter voltage signals to a counter electrode CT, which will be explained later, the is counter voltage signal line CL is also formed to function as a light shielding film. The function of the counter voltage signal line CL as a light shielding film will be explained in detail later.

Further, over the whole area of a central portion of the pixel region, except for a trivial peripheral portion of the pixel region, the counter electrode CT, which is made of ITO (Indium-Tin-Oxide), for example, and constitutes a transparent conductor, is formed. In this embodiment and embodiments 12 to 15, which will be explained later, a profile of the counter electrode CT (ITO1) which is formed of a transparent conductor mounted on a substrate main surface side is depicted with a bold line. The counter electrode CT (ITO1) is partially covered with other transparent conductor films (pixel electrodes PX (ITO2)) which are disposed away from the main surface of the substrate. As the transparent conductor, in place of ITO used in this embodiment, a conductive film which is formed such that the film can irradiate an incident light with a sufficient intensity (for example, a film which is capable of transmitting at least 60% of an incident light), such as a metal thin film made of IZO (Indium-Zinc-Oxide) or formed by ion coating, for example, may be used.

The counter electrode CT is formed such that a peripheral portion of the counter electrode CT is directly superposed on an inner peripheral portion of the frame-like conductive layer of the above-mentioned counter voltage signal line CL. Due to such a constitution, the counter voltage supplied from the counter voltage signal line CL is applied to the counter electrode CT. An insulation film GI, which is made of SiN, for example, is formed on the whole area of an upper surface of the transparent substrate SUB1 such that the insulation film GI also covers the gate signal lines GL, the counter voltage signal lines CL and the counter electrodes CT. The insulation film GI is configured to function as an interlayer insulation film between the counter voltage signal lines CL and the gate signal lines GL with respect to the drain signal line DL, which will be explained later, to function as a gate insulation film of the thin film transistors TFT, which will be described later, in regions where the thin film transistors TFT are formed, and to function as a dielectric film in regions in which capacitive elements Cstg, which will be described later, are formed.

As shown at a left lower portion of FIG. 44, on the above-mentioned insulation film GI at a portion of the thin film transistor TFT which is partially superposed on the gate signal line GL, a semiconductor layer AS made of a-Si, for example, is formed.

By forming a source electrode SD2 and a drain electrode SD1 on an upper surface of the semiconductor layer AS, an MIS-type transistor having an inverse stagger structure, which uses a portion of the gate signal line GL as the gate electrode, is formed. Then, the source electrode SD2 and the drain electrode SD1 are formed simultaneously with the drain signal line DL.

That is, the drain signal lines DL, which extend in the y direction and are arranged in parallel in the x direction in FIG. 44, are formed, and a portion of the drain signal line DL is extended over a surface of the above-mentioned semiconductor layer AS so as to constitute the drain electrode SD1 of the thin film transistor TFT.

Further, at the time of forming the drain signal lines DL, the source electrodes SD2 are formed, and these source electrodes SD2 are extended over portions in the inside of the pixel regions, so that contact portions which connect the source electrodes SD2 and the pixel electrodes PX, which will be explained later, are integrally formed with the source electrodes SD2.

Here, on an interface between the above-mentioned source electrode SD2 and drain electrode SD1 of the semiconductor layer AS, contact layers d0 which are doped with n-type impurity, for example, are formed. The contact layers d0 are formed such that an n-type impurity doping layer is formed on the whole area of the surface of the semiconductor layer AS, the source electrode is SD2 and the drain electrode SD1 are formed; and, thereafter, by using the respective electrodes as masks, the n-type impurity doping layer on the surface of the semiconductor layer AS, which is exposed from these respective electrodes, is etched.

Here, in this embodiment, the semiconductor layers AS are formed not only in the regions where the thin film transistors TET are formed, but also at portions where the gate signal lines GL and the counter voltage signal lines CL intersect each other with respect to the drain signal lines DL. This constitution is provided for strengthening the function of the semiconductor layers AS as an interlayer insulation film.

Then, on the surface of the transparent substrate SUB1 on which the thin film transistors TFT are formed, a protective film PSV made of SiN, for example, is formed such that the protective film PSV also covers the thin film transistors TFT. The protective film PSV is provided for avoiding direct contact of the thin film transistors TFT with the liquid crystal LC.

Further, on an upper surface of the protective film PSV, pixel electrodes PX, which are formed of transparent conductive films made of ITO (Indium-Tin-Oxide), for example, are formed. The pixel electrode PX has a portion thereof connected to an extension portion of the source electrode SD2 of the thin film transistor TFT through a contact hole formed in the above-mentioned protective film PSV.

The pixel electrode PX is constituted of a plurality of first electrodes PX' having bent portions on the counter voltage signal line CL', which extends in the y direction, as seen in the drawing, at substantially the central portion of the pixel region and a frame-like second electrode PX" which respectively connects respective ends of these first electrodes PX'. In other words, these electrodes are configured such that the first electrodes PX' are arranged at an equal distance in the y direction, as seen in the drawing having an inclination of (−0:θ<45°) with respect to the counter electrode signal line CL' in one pixel region side defined by the counter electrode signal line CL'; and, the first electrodes PX' are arranged at an equal distance in the y direction, as seen in FIG. 44, having an inclination of (+0: θ<45°) with respect to the counter electrode signal line in the other pixel region side, and corresponding electrodes in respective pixel regions are connected to each other on the counter electrode signal line CL'.

The provision of the bent portions to the first electrodes CLÆ means that the liquid crystal display device adopts the multi-domain system in which the directions of electric fields which the pixel electrodes having one inclination (−0) and the pixel electrodes having the other inclination (+θ)

respectively generate with respect to the counter electrodes CT are different from each other, so that the twisting directions of the liquid crystal molecules are opposite to each other, whereby it is possible to obtain an advantageous effect in that the coloring difference which is generated when the display region is respectively viewed from the left and right sides can be offset.

Respective bent portions of the first electrodes PX' are positioned such that the bent portions are superposed on the signal line CL', which extends in the y direction at the center of the pixel region out of the above-mentioned counter voltage signal line CL.

In the vicinity of bent portions of the first electrodes PX', the directions of the electric fields become random so that an opaque region (hereinafter this region is referred to as "disclination region") is generated, to which a strict lateral electric field is not applied. Accordingly, this embodiment adopts the constitution which shields the region from light by using the signal line CL'.

Further, with respect to the above-mentioned first electrode PX', an opening angle of electrodes with respect to the bent portions as the center is set to 2θ (<90°), and hence, the opening angle assumes an acute angle.

In such a case, a relatively strong electric field is liable to be generated between the first electrodes PX' and the counter electrode CT at these bent portions so that the liquid crystal molecules are rotated at a high speed. Accordingly, using these bent portions as starting points, a high-speed of rotation of the liquid crystal molecules can be propagated to peripheries of the bent portions, as well as to the whole area of the pixel region, whereby it is possible to obtain an advantageous effect in that a display which can promote a rapid response is achieved.

Further, out of the pixel electrodes PX, the second electrode PX" is constituted of a frame-like electrode PX", which is superposed on the inner peripheral portion of the signal line CL", which is formed in a frame-like shape out of the above-mentioned counter voltage signal line CL. The second electrode PX" is connected with extending ends of the above-mentioned first electrodes PX'.

Between portions of the second electrode PX", which extends in the y direction, as seen in FIG. 44, and the drain signal lines DL, which are disposed adjacent to these portions, the above-mentioned counter voltage signal lines CL" are formed such that they extend in the y direction, as seen in the drawing.

The counter voltage signal lines CL" are formed with a wide width, such that gaps between the drain signal lines DL and the counter voltage signal lines CL" can be made as small as possible. In other words, gaps formed between the electrodes PX" which extend in the y direction, as seen in FIG. 44, out of the pixel electrodes PX, and the drain signal lines DL, which are disposed adjacent to the electrodes PX", are shielded from light by means of the counter voltage signal lines CL".

Such a constitution is adopted for the following reasons. That is, an electric field is generated from the drain signal line DL in response to video signals which are supplied to the drain signal line DL. This electric field is terminated at the counter voltage signal line CL" side and the light transmission due to the change of the light transmissivity of liquid crystal, which is changed by the electric field, is shielded.

The pixel electrodes PX having such a constitution can achieve the following advantageous effects.

First of all, since the regions, which differ in the directions of electric fields generated between the pixel electrodes PX and the counter electrodes CT, are formed by dividing the pixel region into halves, each pixel electrode PX (first pixel electrode PX') has one bent portion, so that the total number of bent portions will become equal to the number of the first pixel electrodes PX'.

In a conventional liquid crystal display device, for example, respective pixel electrodes, which extend in the y direction and are arranged in parallel in the x direction, as seen in FIG. 44, are inclined on the right side along the longitudinal direction and then are inclined on the left side along the longitudinal direction, and these inclinations are repeated to form pixel electrodes having a zigzag shape. Compared to such a conventional liquid crystal display device, this embodiment can provide a constitution which largely reduces the bent portions of the electrodes. Accordingly, it is possible to largely reduce the generation of the disclination region at the bent portions of the electrodes PX'.

Further, by newly providing the second electrode PX", which is arranged in the frame shape in the periphery of the pixel region, besides the above-mentioned first electrode PX', the pixel electrode PX can generate a lateral electric field also between the second electrode PX" and the counter electrodes CT.

Conventionally, with respect to pixel electrodes having a zigzag shape, a small space and a large space are alternately formed between the pixel electrode and the drain signal lines disposed close to the pixel electrode; and, hence, so-called dead spaces where a sufficient lateral electric field is not generated have been formed in the large spaces. Accordingly, by adopting the constitution of this embodiment, the above-mentioned generation of the dead spaces can be suppressed so that it is possible to achieve substantial enlargement of the pixel region.

Here, the second electrode PX" also has a function of supplying video signals to respective first electrodes PX' through the source electrode SD2 of the thin film transistor TFT. Accordingly, it is needless to say that, so long as this function is satisfied, it is not always necessary to form the second electrode PX" in a frame-like shape along the periphery of the pixel region.

For example, with respect to the second electrode PX" of FIG. 44, even when the upper-side (side opposite to the thin film transistor TFT) portion in the drawing, out of the portions extending in the x direction in parallel, as seen in the drawing, is not particularly formed, it is possible to obtain a sufficient advantageous effect. On the surface of the transparent substrate SUB1 on which the pixel electrodes PX are formed in this manner, an orientation film (not shown in FIG. 44 and FIG. 45, see embodiment 1) is formed such that the orientation film also covers the pixel electrode PX. This orientation film is a film which is subjected to rubbing treatment in the y direction, as seen in the drawing, and is brought into direct contact with a liquid crystal LC so that the orientation film can determine the initial orientation direction of the liquid crystal LC.

Although the pixel electrodes PX are constituted as transparent electrodes in the above-mentioned embodiment, the pixel electrodes PX need not always be transparent and may be formed of an opaque metal material, such as Cr, for example. This is because, although the numerical aperture is slightly decreased due to such a constitution, this gives rise to no defects in driving of the liquid crystal LC.

The transparent substrate SUB1 having such a constitution is referred to as a so-called TFT substrate, and the transparent substrate which is arranged to face this TFT substrate in an opposed manner while sandwiching the liquid crystal LC therebetween is referred to as a filter substrate. On a liquid-crystal-side surface of the filter substrate, first of all, a black matrix is formed so as to define respective pixel regions, and filters are formed such that the filters cover opening portions of the black matrix which substantially determine the pixel regions. Then, an overcoat film made of a resin film, for example, is formed such that the overcoat film covers the black matrix and the filters, and an orientation film is formed on an upper surface of the overcoat film. The details of these components are exactly as same as those described with reference to the embodiment 1.

Embodiment 12

Figure 46:
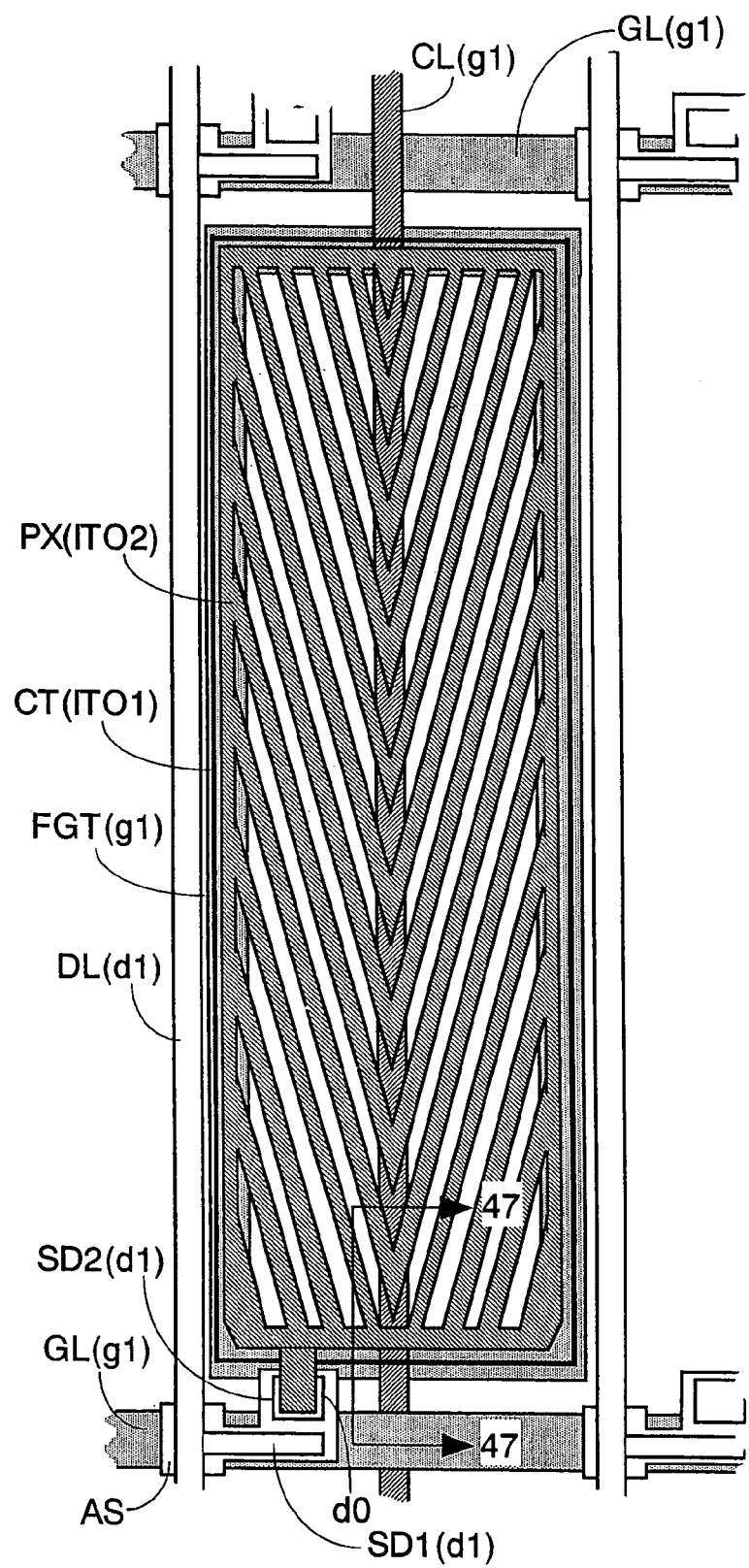
FIG. 46 is a plan view showing another embodiment of the pixel region of the liquid crystal display device according to the present invention.
Figure 47:
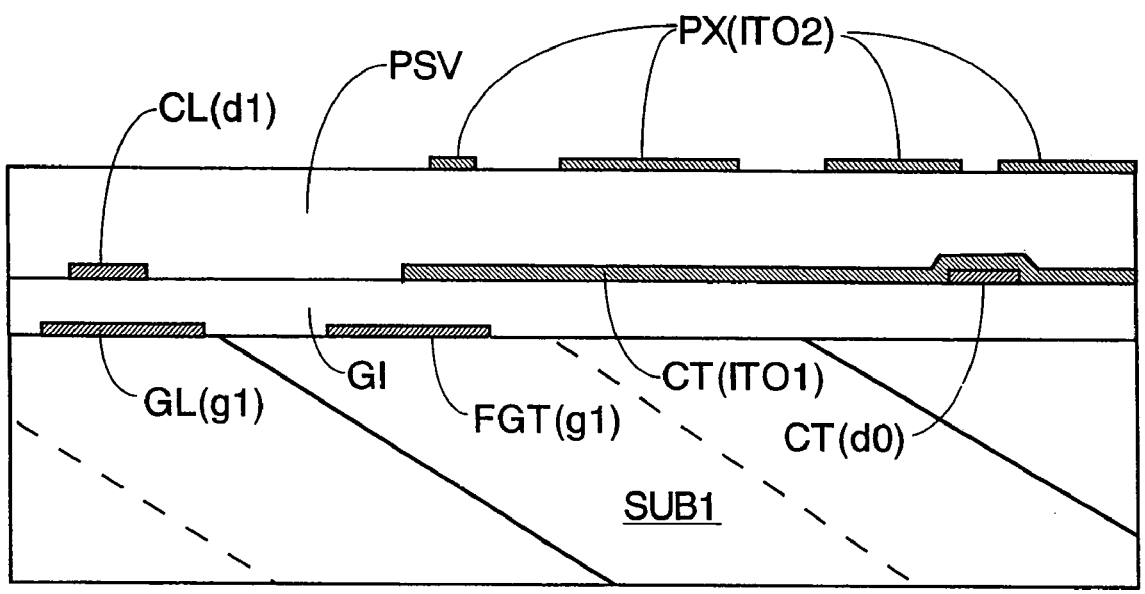
FIG. 47 is a cross-sectional view taken along a line 47—47 of FIG. 46.

FIG. 46 is a plan view which shows another embodiment of the liquid crystal display device according to the present invention, and it constitutes a view which corresponds to FIG. 1. Further, FIG. 47 is a view which shows a cross-section taken along a line 47—47 in FIG. 46.

This embodiment differs from the constitution shown in FIG. 44 in that, first of all, as a member which shields portions in the vicinity of bent portions of pixel electrodes PX having the bent portions from light, a conductive layer CL which is formed along with drain signal lines GL is used (accordingly, the conductive layer CL uses the same material as the signal lines).

The conductive layer CL constitutes a counter voltage signal line LC; and, hence, a counter electrode CT, which is constituted of a transparent electrode, is formed in a super-posed manner on an upper layer (or on a lower layer if necessary) of the counter voltage signal line LC.

Further, since the conductive layer GL' is formed such that the conductive layer GL' runs in the y direction at the approximate center of the pixel region, the conductive layer GL' can be formed without any fear of being short-circuited with respective drain signal lines GL which are positioned at both sides of the conductive layer GL'.

Embodiment 13

Figure 48:
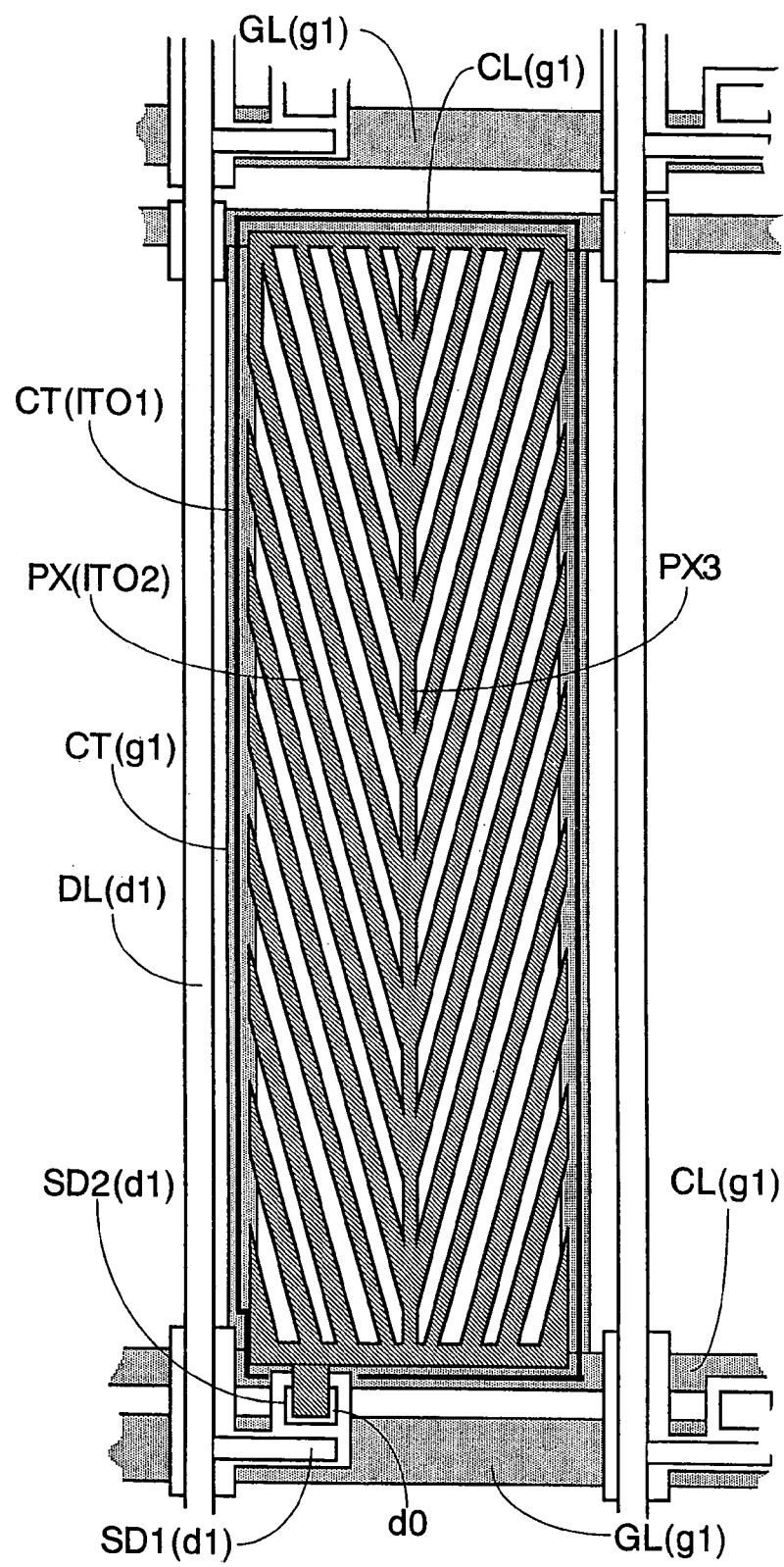
FIG. 48 is a plan view showing another embodiment of the pixel region of the liquid crystal display device according to the present invention.

FIG. 48 is a plan view which shows another embodiment of the liquid crystal display device according to the present invention, and it constitutes a view which corresponds to FIG. 44.

The difference in constitution between this embodiment and the embodiment shown in FIG. 44 lies in the constitution of pixel electrodes PX, wherein, in place of portions of a frame-like second electrode PX", to which respective end portions of a plurality of first electrodes PXÆ having bent portions are respectively connected and extend in the y direction, as seen in the drawing, a third electrode PX3 is provided so as to extend in the y direction in the drawing, at the center portion of the pixel electrode.

Even when the liquid crystal display device is constituted in such a manner, it is possible to form the pixel electrodes over the whole area of the pixel region without dead spaces.

Embodiment 14

Figure 49:
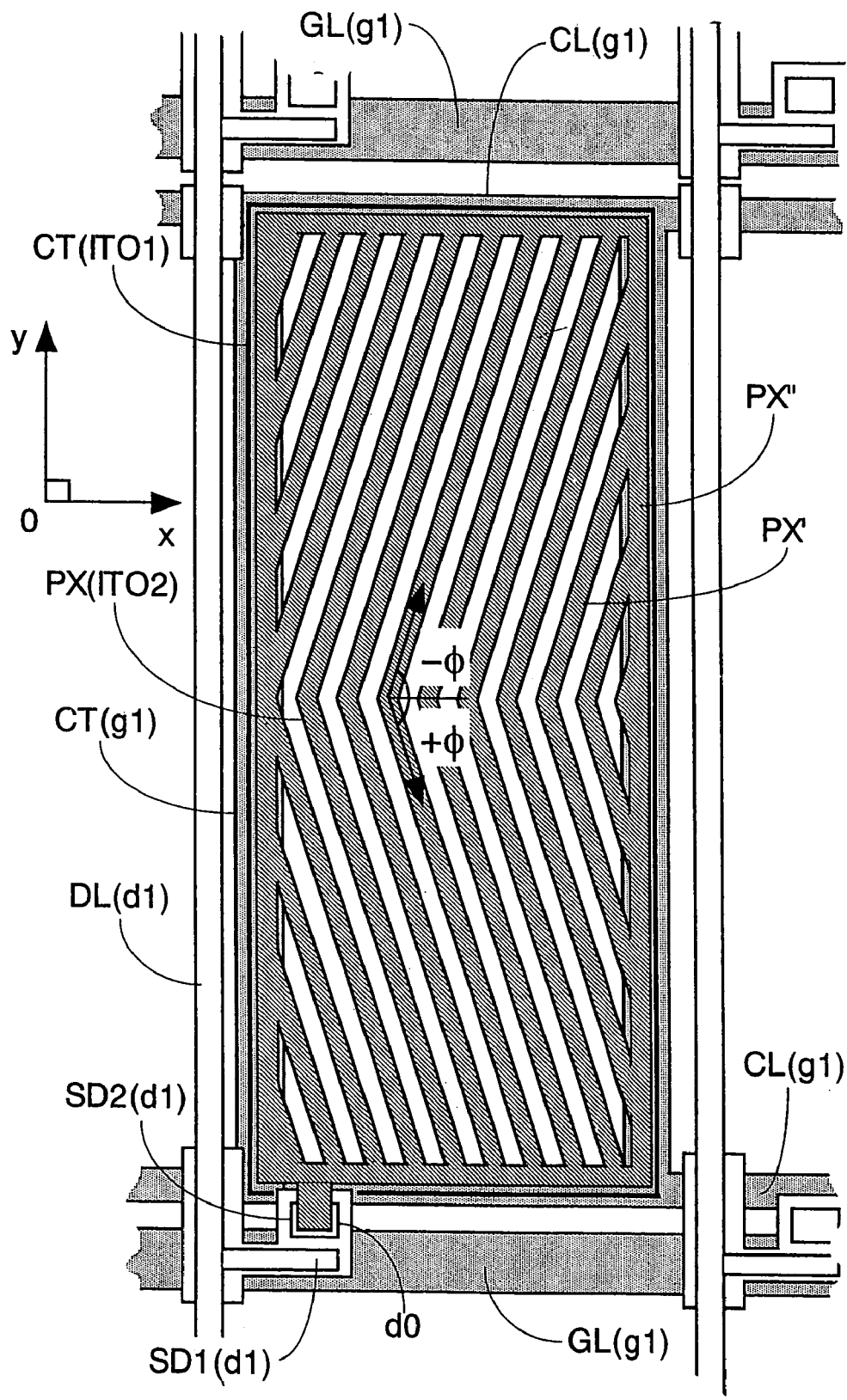
FIG. 49 is a plan view showing another embodiment of the pixel region of the liquid crystal display device according to the present invention.

FIG. 49 is a plan view showing another embodiment of the liquid crystal display device according to the present invention, and it constitutes a view which corresponds to FIG. 44.

This embodiment differs from the embodiment of FIG. 44 in that the pixel region is divided into halves to form regions which differ in the direction of the electric field by a boundary which is parallel to the x direction, as seen in the drawing.

Accordingly, this embodiment adopts a pattern in which pixel electrodes PX (first electrodes PX') having bent portions are arranged with an angle of (−φ:φ>45°) with respect to the x direction, as seen in the drawing, in one pixel region, and the pixel electrodes PX are arranged with an angle of (+φ:φ>45°) with respect to the x direction, as seen in the drawing, in the other pixel region, and the corresponding pixel electrodes are connected to each other at the boundary portion.

Even in such a case, it is possible to narrow the dead spaces and to decrease the number of the bent portions of the first electrodes PX' of the pixel electrodes.

Further, in such a case, in view of the optimum setting of the initial orientation direction (the y direction in the drawing) of an orientation film and the directions of respective electric fields, the opening angle (2φ) at the bent portions of the first electrodes can be set to an obtuse angle. Accordingly, it is possible to decrease the generation of so-called disclination regions at the bent portions of the pixel electrodes (first electrodes).

As described above, in this embodiment, although light shielding means are not provided to the bent portions of respective pixel electrodes, it is needless to say that light shielding means may be provided to achieve the complete prevention of generation of the disclination regions.

Here, it is needless to say that, in FIG. 49, with respect to the second electrode PX", even when the upper side (the side opposite to the thin film transistor TFT) portion in the drawing among portions which are positioned parallel to the x direction in the drawing is not particularly formed, a sufficient advantageous effect can be obtained.

Embodiment 15

Figure 50:
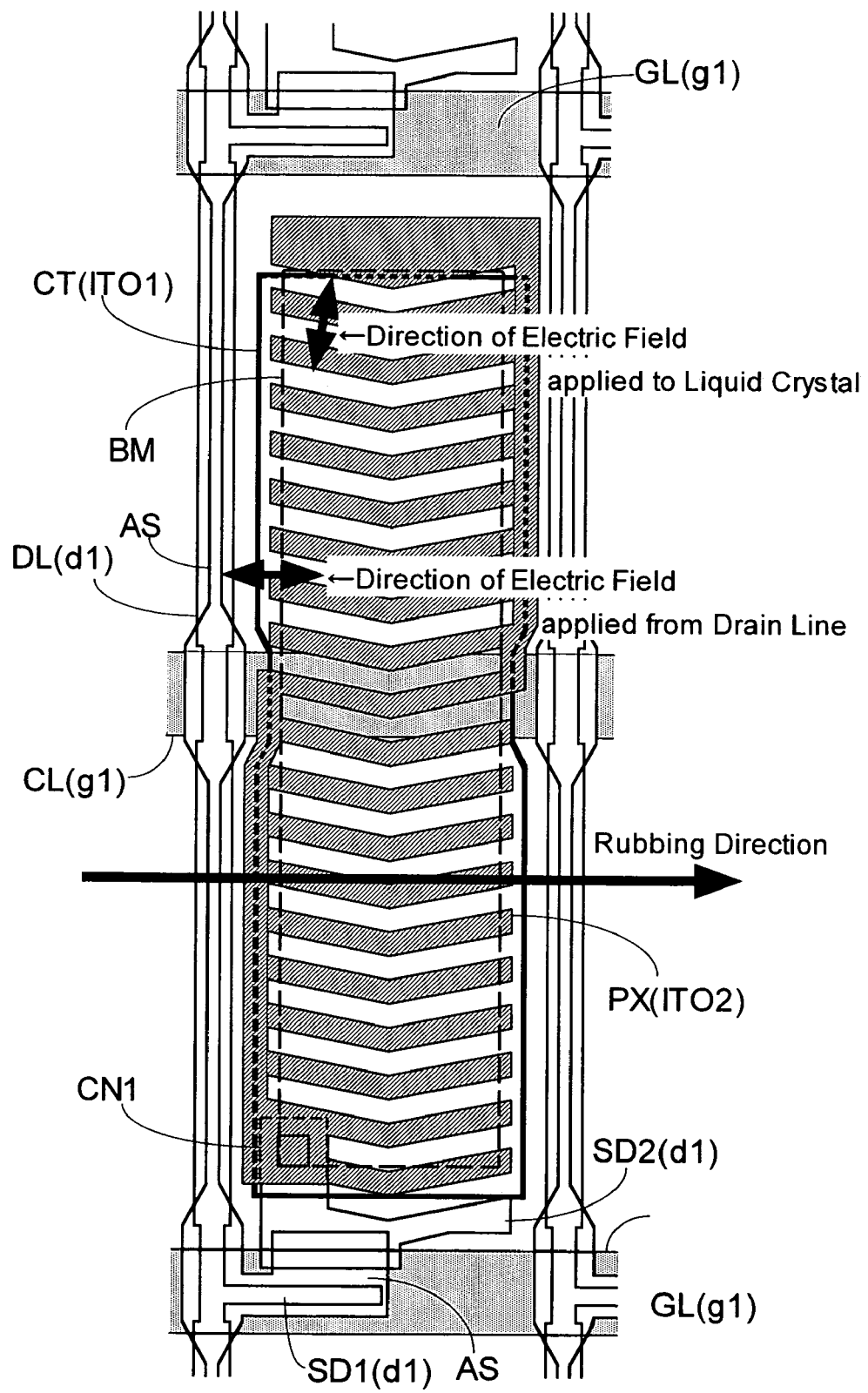
FIG. 50 is a plan view showing another embodiment of the pixel region of the liquid crystal display device according to the present invention.

FIG. 50 is a plan view showing another embodiment of the liquid crystal display device according to the present invention, and it constitutes a view corresponding to FIG. 44.

The difference between this embodiment and the embodiment of FIG. 44 in constitution lies in the connection of a counter voltage signal line CL and the counter electrode CT. In this embodiment, gate signal lines GL use a chromium (Cr) based alloy, wherein after forming the gate signal lines GL on a substrate by patterning, the counter electrodes CT (ITO1) are formed before forming a gate insulation film GI made of SiNx. For example, in FIG. 13, the step (B) comes before the step (A) (the order of the step (A) and the step (B) is reversed). ITO films which constitute the counter electrodes CT are directly brought into contact with Cr films which constitute the counter voltage signal lines CL at the centers of the pixels defined by openings of the black matrix BM (profiles thereof being indicated by broken lines).

In FIG. 50, the direction of an electric field which rotatably drives liquid crystal molecules for modulating the light transmissivity of a liquid crystal layer, the direction of the electric field which is leaked from a drain signal line (also referred to as a video signal line, a data line) to the above-mentioned pixel (the region surrounded by a frame indicated by a broken line BM), and the advancing direction of a rubbing roller (so-called rubbing direction) at the time of performing the rubbing treatment on an orientation film (not shown in the drawing) which covers the illustrated electrode structure are respectively indicated by arrows of bold lines.

In this embodiment, the electric field which rotatably drives the liquid crystal molecules is applied in the up-and-down direction of the drawing (the extension direction of the drain signal line DL). Accordingly, the influence which the electric field (lines of electric force) which is leaked from the drain signal line to the pixel in the left-and-right direction in the drawing gives to the rotation driving of the liquid crystal molecules is reduced so that the degradation of the image quality derived from longitudinal smear can be suppressed. The larger the angle which is formed by the intersection of the direction of the electric field which rotatably drives the liquid crystal molecules (arrow of "electric field applying direction to the liquid crystal") and the direction of the electric field which is leaked from the drain signal line DL to the pixel (arrow indicating "electric field direction from the drain line"), the more efficiently the above-mentioned generation of longitudinal smear can be suppressed. When this intersecting angle is small, it is necessary to shield the leaking of the electric field from the drain signal line DL to the pixel by providing a counter electrode CT or a pixel electrode PX along the drain signal line DL between the drain signal line DL and the pixel. However, in this embodiment, since the pixel electrodes PX (ITO2) which are arranged in a comb shape are arranged to intersect the drain line with a sufficiently large angle, such a shielding structure is unnecessary. This feature is observed at a left upper portion and a right lower portion of the pixel shown in FIG. 50 and serves to increase the aperture ratio of the pixel per se (area which can transmit light modulated by the rotation driving of the liquid crystal molecules).

Further, according to this embodiment, it is possible to increase the degree of freedom of design of the electrode structure which is constituted of the other transparent conductive film ITO2 (also referred to as "upper ITO layer" in view of the cross-sectional structure thereof), which is formed apart from one transparent conductive film ITO1, as viewed from a main surface of the substrate. Accordingly, it is possible to design the whole pixel such that the voltage signals supplied from the drain signal line DL can be applied to the pixel electrodes PX along the line which intersects (preferably intersecting at a right angle) the extension direction of the drain signal line DL.

In this embodiment, since the extension direction of combs of the pixel electrodes PX does not intersect the drain signal line DL at a right angle, the rubbing direction (the liquid crystal molecules which are in the state that the electric field is not applied to the liquid crystal modules being oriented in the direction along this direction) can be set to a direction which intersects the drain signal line at a right angle.

In the above-mentioned embodiments 11 to 14, the counter electrode CT is formed such that the counter electrode CT extends over the whole area of the central portion of the pixel region, except for the trivial periphery of the pixel region.

However, even when the counter electrode CT is not formed at portions which are superposed on the pixel electrodes PX, this does not exert any influence on the operation of the liquid crystal. Accordingly, it is needless to say that the counter electrode CT can be formed in this manner.

Further, in the above-mentioned respective embodiments, the transparent electrode which is formed over the whole area of the central portion of the pixel region, except for the trivial periphery of the pixel region, is formed as the counter electrode CT, and the electrodes provided with the bent portions are formed as the pixel electrodes PX. However, the present invention is not limited to such a constitution. That is, it is needless to say that the transparent electrode which extends over the whole area of the central portion of the pixel electrode, except for the trivial periphery of the pixel region, is formed as the pixel electrode PX, and the electrodes provided with the bent portions are formed as the counter electrodes CT.

As can be clearly understood from the explanation which has been made with reference to the embodiments 11 to 14, according to the liquid crystal display device of the present invention, the display of images having an excellent quality can be realized.

What is claimed is:

1. A liquid crystal display device comprising:
   first and second substrates with a liquid crystal layer therebetween;
   a plurality of gate signal lines and a plurality of drain signal lines;
   a plurality of counter voltage signal lines;
   a plurality of pixel regions defined by neighboring gate signal lines and drain signal lines; and
   a counter electrode and a pixel electrode being formed on the first substrate in each pixel region and enabling an electric field to be formed therebetween;
   wherein the counter electrode is of planar shape, the pixel electrode is of planar shape with a plurality of slits and being overlapped with the counter electrode and an insulating layer being provided therebetween, both the counter electrode and the pixel electrode being made of a transparent conductor, and the counter voltage signal line being made of metal extends in a center region in each pixel region and is directly connected to the counter electrode; and
   wherein the plurality of slits of the pixel electrode have portions which do not extend in parallel to an extending direction of the drain signal lines and an extending direction of the gate signal lines.

2. A liquid crystal display device according to claim 1, wherein the counter voltage signal line crosses the gate signal lines.

3. A liquid crystal display device according to claim 1, wherein the counter voltage signal line crosses the drain signal lines.

4. A liquid crystal display device according to claim 1, wherein the extending directions of the plurality of slits of the pixel electrode on one side of the counter voltage signal line are different from the extending directions of the slits of the pixel electrode on another side of the counter voltage signal line.

5. A liquid crystal display device comprising:
   first and second substrate with a liquid crystal layer therebetween;
   a plurality of gate signal lines and a plurality of drain signal lines;
   a plurality of counter voltage signal lines;
   a plurality of pixel regions defined by neighboring gate signal lines and drain signal lines; and
   a counter electrode and a pixel electrode being formed on the first substrate in each pixel region and enabling an electric field to be formed therebetween;
   wherein the counter electrode is of planar shape, the pixel electrode is of planar shape with a plurality of slits and being overlapped with the counter electrode and an insulating layer being provided therebetween, both the counter electrode and the pixel electrode are made of a transparent conductor, and the counter voltage signal line being made of metal extends in each pixel region and is directly connected to the counter electrode, and the counter electrode exists at opposite sides of the counter voltage signal line in the pixel region when viewed in plane view; and
   wherein the plurality of slits of the pixel electrode have portions which do not extend in parallel to an extending direction of the drain signal lines and an extending direction of the gate signal lines.

* * * * *